(12) United States Patent
Sullivan

(10) Patent No.: US 9,879,963 B2
(45) Date of Patent: Jan. 30, 2018

(54) SYSTEMS TO MEASURE YAW, SPIN AND MUZZLE VELOCITY OF PROJECTILES, IMPROVE FIRE CONTROL FIDELITY, AND REDUCE SHOT-TO-SHOT DISPERSION IN BOTH CONVENTIONAL AND AIRBURSTING PROGRAMMABLE PROJECTILES

(71) Applicant: NOSTROMO HOLDINGS, LLC, Alexandria, VA (US)

(72) Inventor: Kevin Michael Sullivan, Kennebunk, ME (US)

(73) Assignee: NOSTROMO HOLDINGS, LLC, Alexandira, VA (US)

( * ) Notice: Subject to any disclaimer, the term of this patent is extended or adjusted under 35 U.S.C. 154(b) by 0 days.

(21) Appl. No.: 15/200,023

(22) Filed: Jul. 1, 2016

(65) Prior Publication Data
US 2017/0097216 A1 Apr. 6, 2017

Related U.S. Application Data

(63) Continuation-in-part of application No. 14/829,839, filed on Aug. 19, 2015, which is a
(Continued)

(51) Int. Cl.
*G06F 19/00* (2011.01)
*F42B 35/00* (2006.01)
(Continued)

(52) U.S. Cl.
CPC .............. *F42B 35/00* (2013.01); *F42B 12/22* (2013.01); *F42B 12/387* (2013.01)

(58) Field of Classification Search
CPC ... F41J 5/06; G05B 19/00; G06G 7/80; G06G 7/32; F41G 3/06
(Continued)

(56) References Cited

U.S. PATENT DOCUMENTS

| 3,019,073 A | 1/1959 | Hall |
| 3,633,212 A | 1/1972 | Cooper |

(Continued)

FOREIGN PATENT DOCUMENTS

| CA | 2082448 C | 4/2002 |
| DE | 3603521 A1 | 8/1987 |

(Continued)

*Primary Examiner* — Karl D Frech
(74) *Attorney, Agent, or Firm* — Karl F. Milde, Jr.; Eckert Seamans Cherin & Mellott, LLC

(57) ABSTRACT

Kits or sub-systems that include sensors to measure a projectile's condition at muzzle exit. The kits or sub-systems are coupled to ballistic calculators or fire control systems that calculate aiming and programming solutions to improve shot placement, reduced dispersion and improve terminal performance. Where airburst munitions are used, the projectile is programmed when reaching a programming station beyond the barrel and the projectile is programmed with a solution that adjusts the burst location based on the measured muzzle velocity. Sub-systems, processes and subroutines optimize "post-shot" programming using certain non-linear methods that are incorporated into fire control systems and ballistic calculators. These non-linear subroutines are useful in establishing the optimum terminal effect of such airburst projectiles. The sub-systems are used separately or are incorporated into the weapons, to reduce dispersion and improve the terminal effects of the projectiles.

8 Claims, 68 Drawing Sheets

Related U.S. Application Data continuation-in-part of application No. 14/227,054, filed on Mar. 27, 2014.

(60) Provisional application No. 61/805,534, filed on Mar. 27, 2013.

(51) Int. Cl.
    *F42B 12/22*     (2006.01)
    *F42B 12/38*     (2006.01)

(58) Field of Classification Search
    USPC ............................... 235/404, 400, 417
    See application file for complete search history.

(56) References Cited

U.S. PATENT DOCUMENTS

| | | | |
|---|---|---|---|
| 3,659,201 A | 4/1972 | Vogelsang | |
| 4,228,397 A | 10/1980 | Schmidt | |
| 4,342,961 A | 8/1982 | Zimmermann et al. | |
| 4,483,190 A | 11/1984 | Cornett | |
| 4,486,710 A | 12/1984 | Schmidt | |
| 4,524,323 A | 6/1985 | Schmidt | |
| 4,677,376 A | 6/1987 | Ettel et al. | |
| 4,818,104 A | 4/1989 | Hartman | |
| 4,864,815 A | 9/1989 | Deck | |
| 4,928,523 A | 5/1990 | Muhrer et al. | |
| 5,026,158 A * | 6/1991 | Golubic | F41G 1/38 356/252 |
| 5,159,396 A | 10/1992 | Yuhas | |
| 5,233,901 A | 8/1993 | Nilsson et al. | |
| 5,267,502 A | 12/1993 | Gent et al. | |
| 5,685,504 A | 11/1997 | Schneider et al. | |
| 5,827,958 A | 10/1998 | Sigler | |
| 6,615,739 B2 | 9/2003 | Gibson et al. | |
| 6,644,111 B2 | 11/2003 | Cytron et al. | |
| 6,666,089 B2 | 12/2003 | Dilz, Jr. | |
| 6,752,137 B2 | 6/2004 | Brunette et al. | |
| 6,898,971 B2 | 5/2005 | Dilz, Jr. | |
| 8,305,071 B2 | 11/2012 | Frick | |
| 2005/0241203 A1 * | 11/2005 | Lizotte | F41A 21/12 42/1.01 |
| 2009/0289619 A1 | 11/2009 | Frick | |
| 2011/0297742 A1 | 12/2011 | Sullivan et al. | |
| 2012/0085162 A1 | 4/2012 | Furch et al. | |
| 2012/0125092 A1 | 5/2012 | Downing | |

FOREIGN PATENT DOCUMENTS

| | | |
|---|---|---|
| DE | 19719977 C1 | 10/1998 |
| EP | 0108973 B1 | 1/1987 |
| WO | 2008048116 A1 | 4/2008 |
| WO | 2010108917 A1 | 9/2010 |
| WO | 2012131548 A1 | 10/2012 |

\* cited by examiner

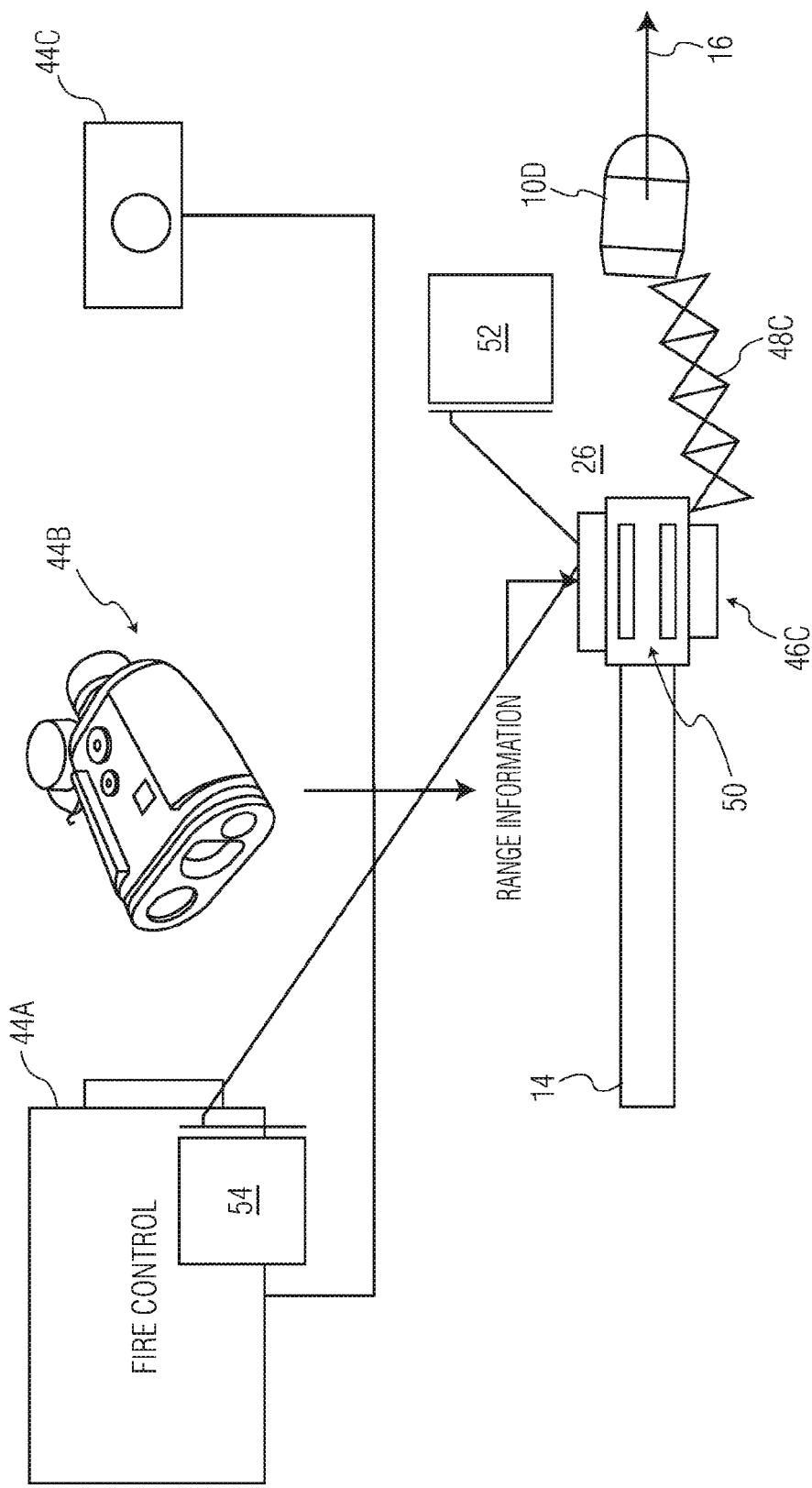

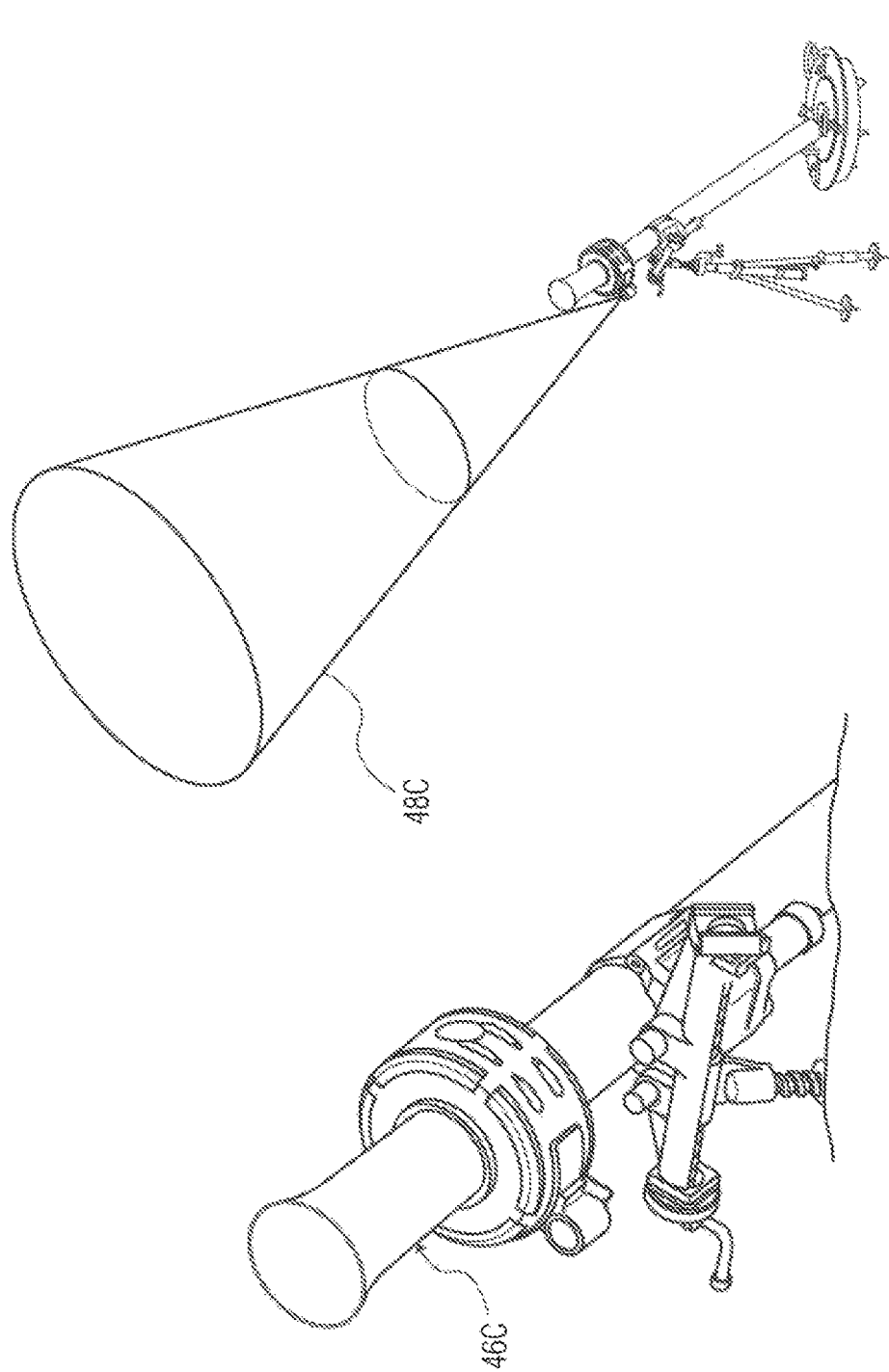

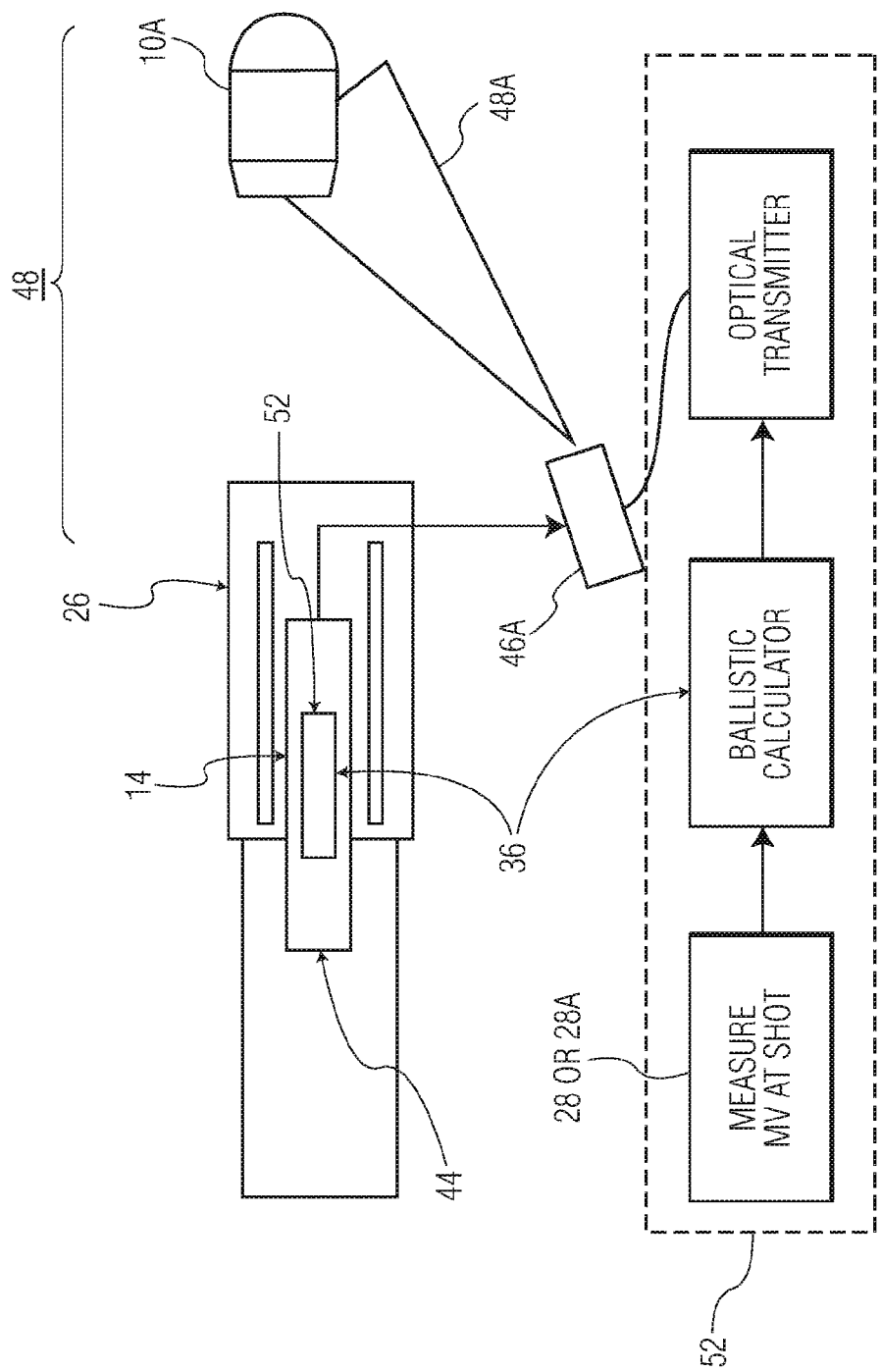

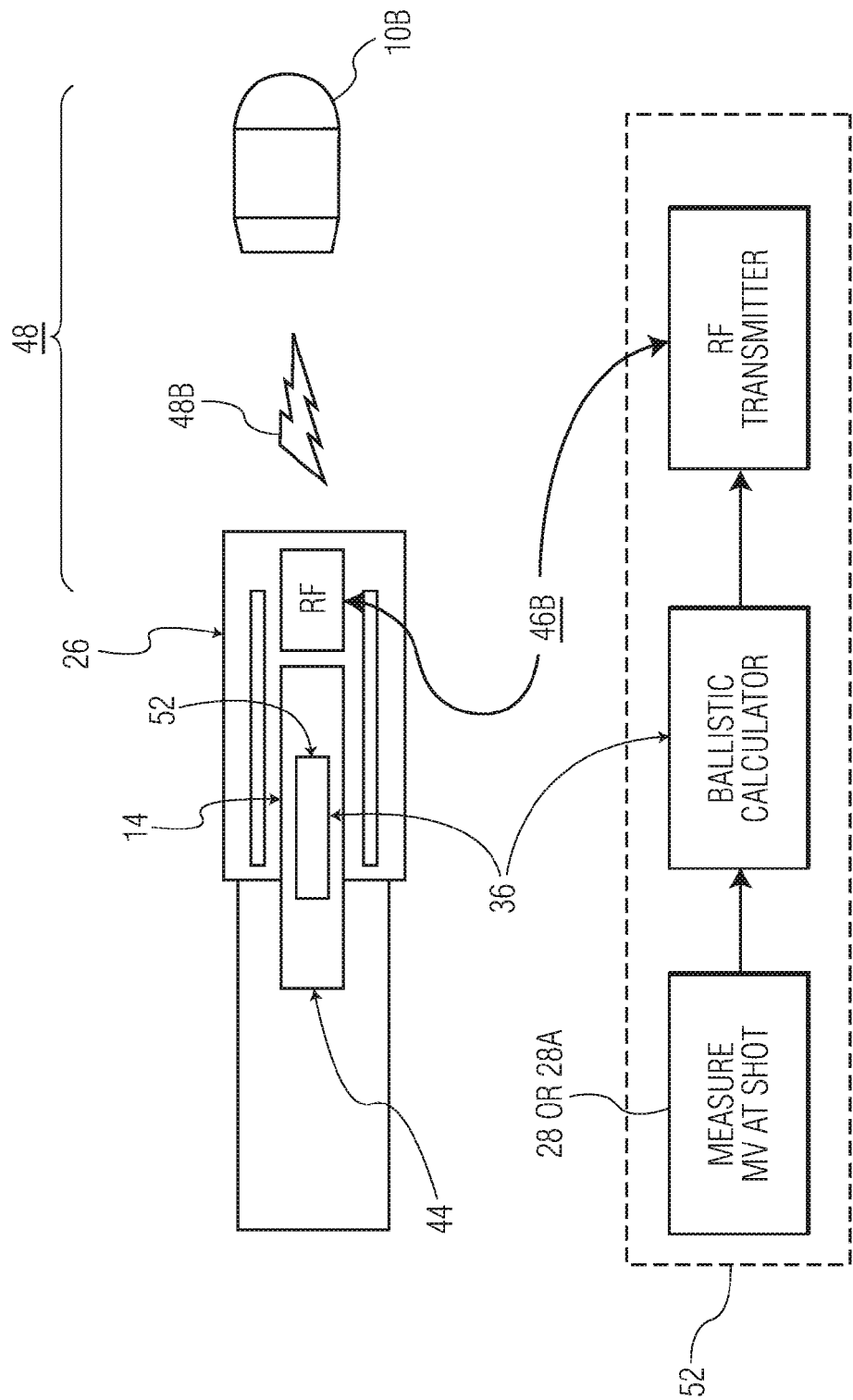

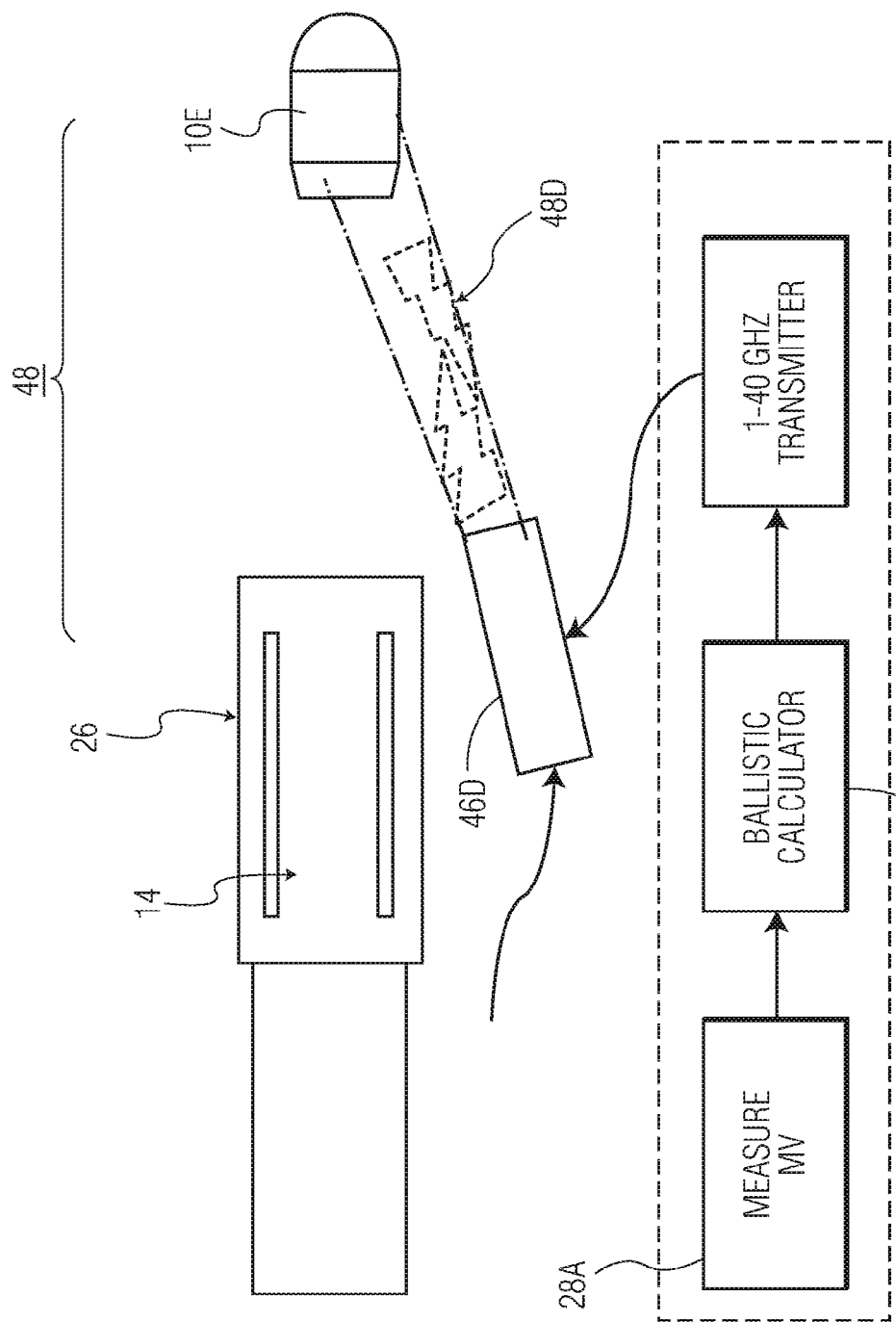

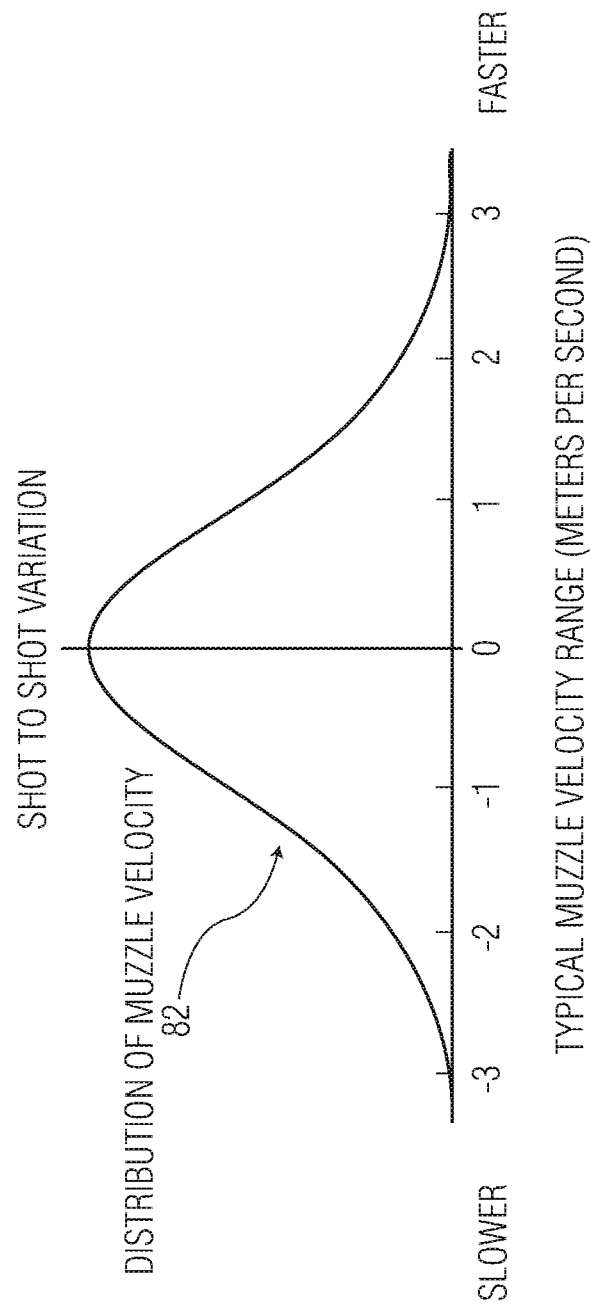

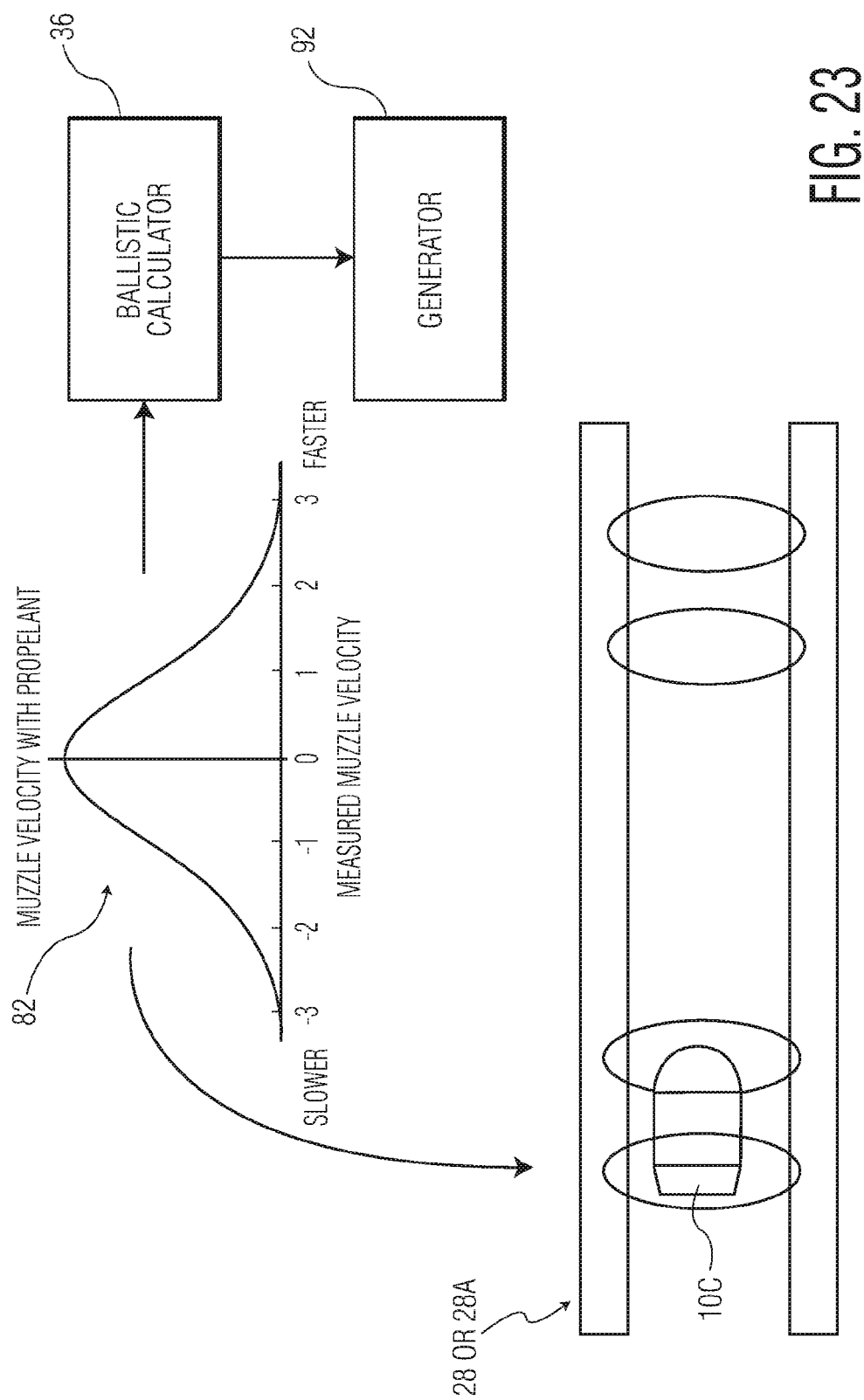

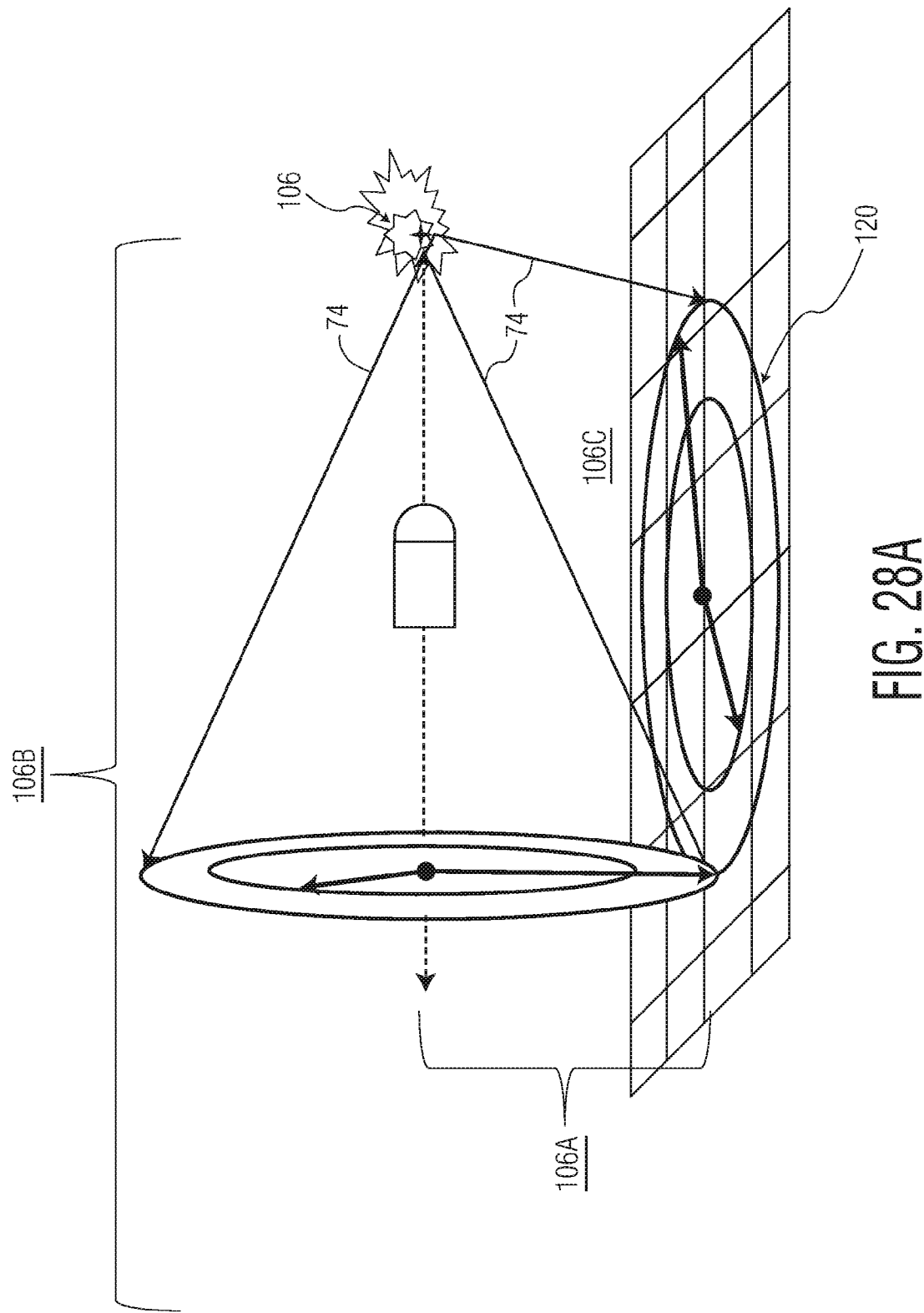

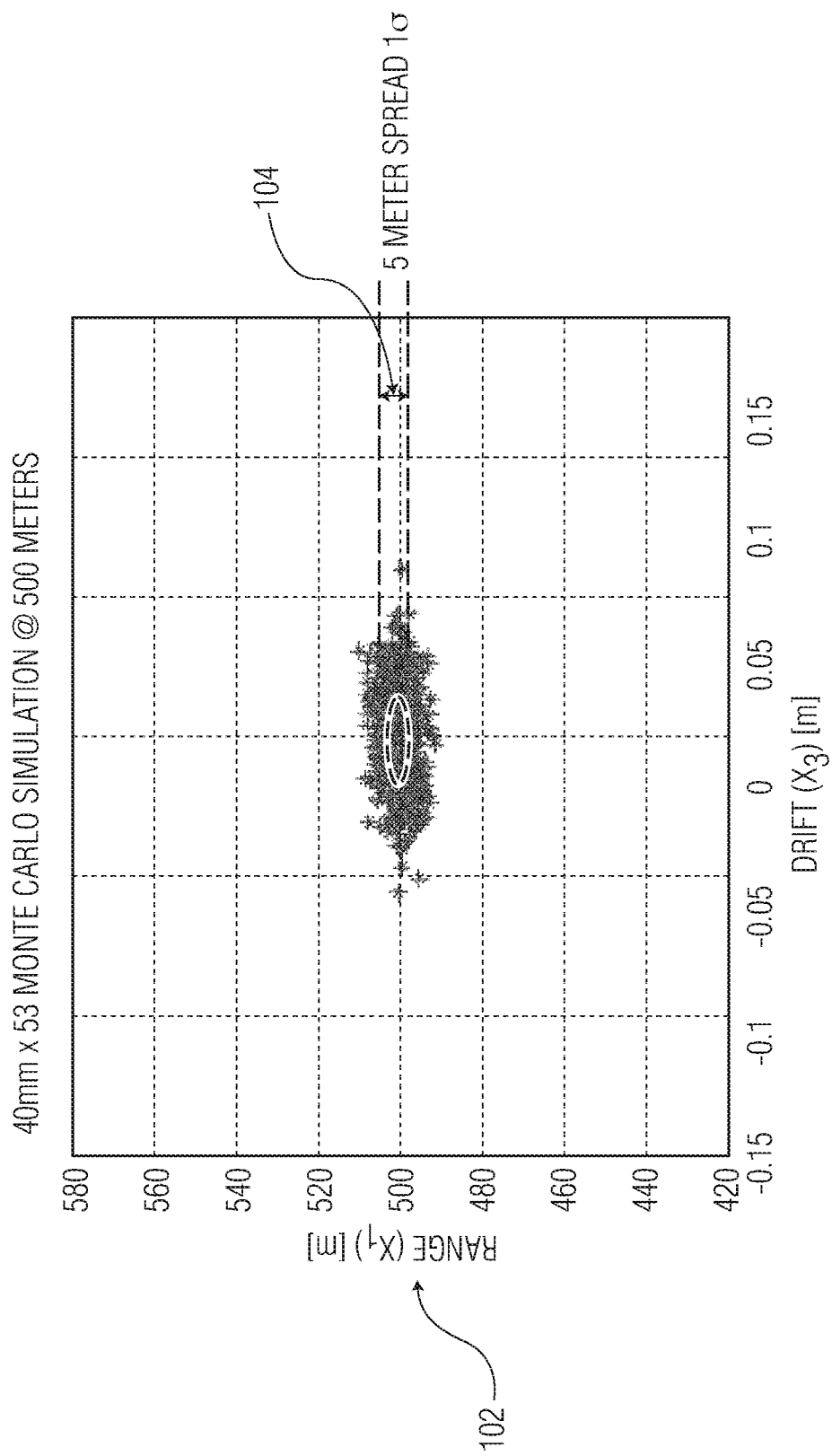

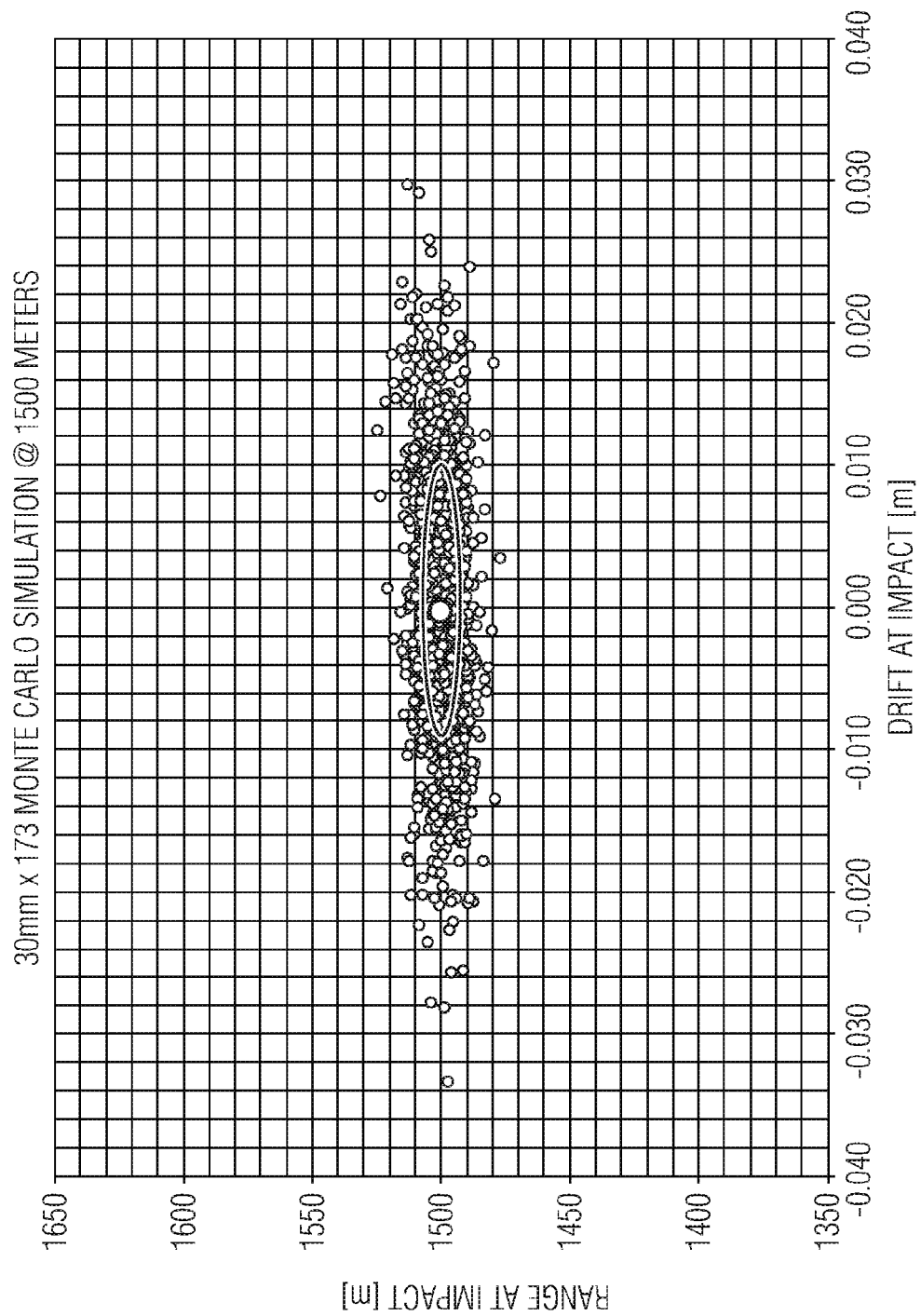

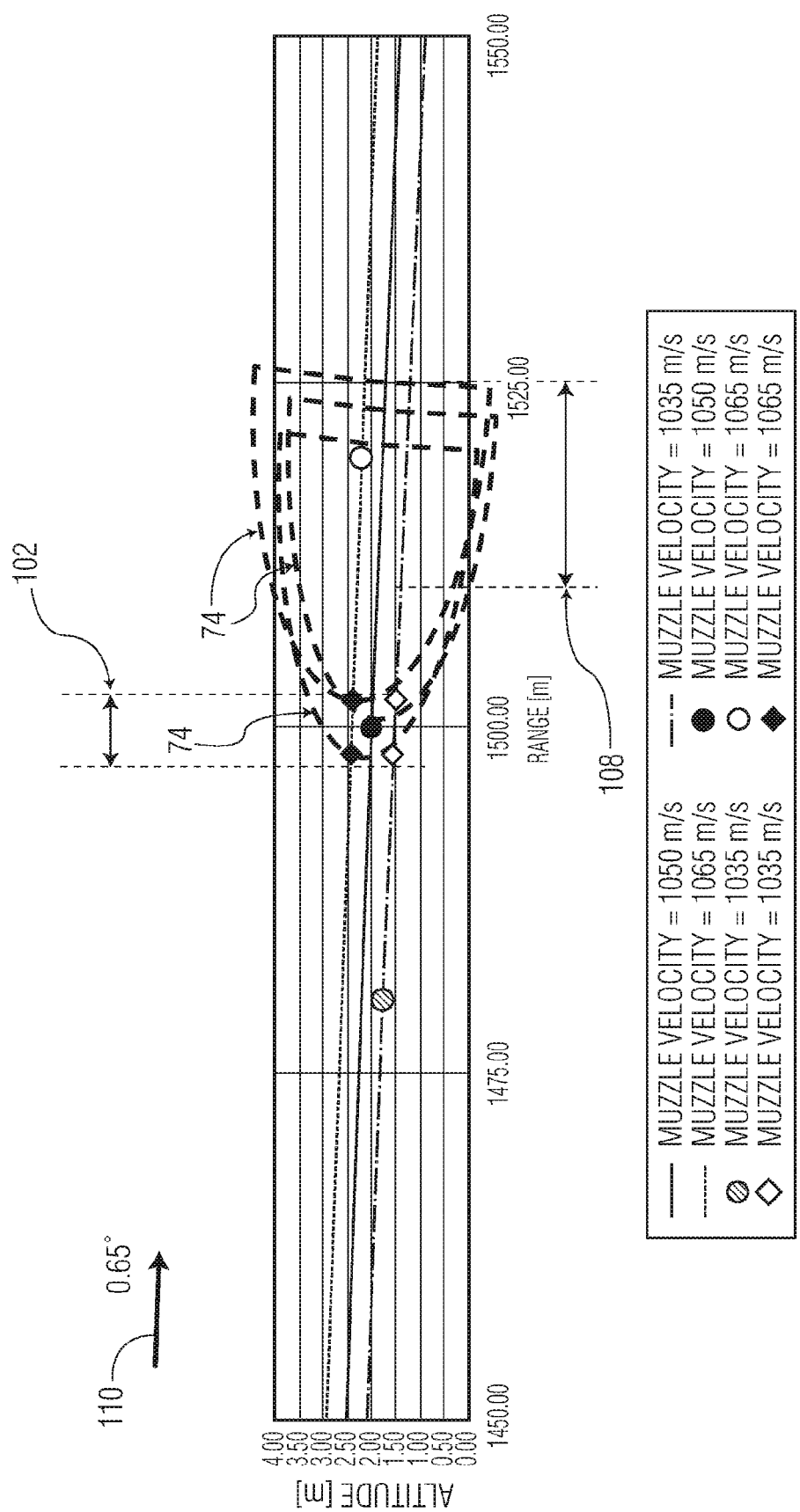

SYSTEMS TO MEASURE YAW, SPIN AND MUZZLE VELOCITY OF PROJECTILES, IMPROVE FIRE CONTROL FIDELITY, AND REDUCE SHOT-TO-SHOT DISPERSION IN BOTH CONVENTIONAL AND AIRBURSTING PROGRAMMABLE PROJECTILES

CROSS-REFERENCE TO RELATED APPLICATIONS

This application is a continuation-in-part of U.S. patent application Ser. No. 14/829,839, filed Aug. 19, 2015 (published as US2016/0055652) which application, in turn, is a continuation-in-part of U.S. application Ser. No. 14/227,054, filed Mar. 27, 2014. This application claims priority from the aforementioned parent and grandparent applications and from the U.S. Provisional Application No. 61/805,534 filed Mar. 27, 2013.

BACKGROUND OF THE INVENTION

While fire control systems have improved as sensor fidelity, electronic miniaturization and improvements in computational capabilities have come of age, the inability to measure exit conditions, adjust aiming and optimize terminal effect remains an hurdle to improving and optimizing terminal effect of certain munitions.

Specialized high-speed imaging and laboratory methodologies and equipment which are presently used to determine and measure yaw cannot be readily incorporated into firearms and weapons used in the field.

As a projectile exits a barrel enters a "dirty" environment that obscures simple detection due to the wash of gases from the propellant (smoke, powder residue, un-burnt powder and bright illumination from the propellant burn). This situation adds to the difficulty of measuring projectile yaw and/or determining projectile motion parameters such as velocity and spin.

As a consequence, no practical or effective solution is presently available for firearms and weapons (hereinafter collectively referred to as "weapons") to measure initial flight parameters where projectiles are fired from weapons. The measurement of initial flight parameters allows fire control systems to record repeatable bias errors which include yaw and muzzle velocity. Sensors can measure lot performance and use predictive algorithms to improve the precision delivery of certain gun fired munitions.

Numerous methods of chronographic measurement of muzzle velocity are known in the art. The rate of change of velocity (acceleration/de-acceleration) is not normally measured, however, because it must be based upon multiple measurements of projectile velocity.

Variations in projectile spin create some variation in shot-to-shot precision but the magnitude of spin variation, as compared to the effect of yaw, does not significantly affect the flight ballistics in a way that can be translated into aiming improvements. Therefore, spin has also rarely been measured, even in the laboratory.

Beyond articulating new methodologies and measurement devices that can provide improved measurement fidelity, it is useful to incorporate muzzle velocity measurement subsystems into weapon kits to further optimize a weapon system's overall effectiveness. In this regard, it is instructive to first discuss some recent history regarding the use of muzzle velocity measurement and airburst programming technology fitted to military platforms.

Measuring Muzzle Velocity:

First, one should recognize that radar has been used to measure flight parameters of projectiles in flight since the Second World War. Today, the US Army has incorporated Doppler muzzle velocity radars as standard equipment fitted to the Army's new 155 mm US Army Paladin and 155 mm M777A1. The artillery fire control computers then use regressive algorithms in ballistic computers to progressively adjust and refine the firing solutions. While radars and advanced fire control algorithms are "standard stuff" in modern artillery systems, the cost of Doppler radars and the threat posed by anti-radiation missiles precludes wider use of radar on smaller ground platforms. While radar costs may reach a cost point where the devices can be incorporated into smaller weaponry, it is possible to use alternative measurement methodologies and modify the time of burst or actual muzzle velocity for improved terminal effect.

Measuring Muzzle Velocity and Programming Ammunition:

In the 1990s, Oerlikon invented the "AHEAD" technique of programming ammunition by measuring the velocity of an ammunition projectile passing through a muzzle break and, thereafter modulating an electro-magnetic signal to program ammunition passing through a muzzle break with an airburst time optimized for the actual measured muzzle velocity of that projectile. This technique was disclosed in U.S. Pat. No. 5,814,756. The resulting product revolutionized gun based air-defense guns and is incorporated into the Rheinmetall Skyguard Air Defense system. There are two drawbacks of the AHEAD system: (1) The energy requirements (amperage) required to program a shot make it difficult to transition this technology to dismounted ground infantry systems, and (2) the muzzle break is bulky with large conductive rings. The AHEAD technology has proven successful in the air defense system, and the technology has been successfully incorporated into the BAE Hagulunds CV 9035 system used by the military in Denmark and the Netherlands.

Fire Control, Remote Weapon Stations and Remote Turrets:

During the 1980s and 1990s armored vehicles and tanks acquired sophisticated fire control systems. Militaries worldwide have made increasing use of overhead weapon stations and remote turrets. In the United States, the initial fielding of the Kongsberg M151 Remote Weapon Stations took place on the US Striker vehicle program. Later, the same Remote Weapon System was adopted as the Common Remote Weapon Stations (CROWS) that was fielded throughout the US military inventory. The fire control systems built and fielded in this period were designed to range targets, calculate vertical and horizontal aim adjustments based on firing tables and atmospheric sensors. The fire control solutions and algorithms of this era were based on calculations that relied on the mean ammunition muzzle velocities of ammunition lots retained in a very large reserve ammunition stock. Systems of this era typically used "look up tables" where the fire control referenced and adjusted aim points based on established firing tables. As ammunition stocks age, muzzle velocities change and eventually ammunition increasing muzzle velocity variations necessitate that the Army destroy stocks of ammunition or accept continued use of ammunition that varies from the standard established when the ammunition and firing tables were originally established.

In-Bore Ammunition Programming:

In the first decade of the $21^{st}$ century, NAMMO's MK285 cartridge introduced the first airburst programmable 40 mm cartridge that was exclusively fired from the MK47 system.

The MK47 was a package with an improved video based fire control and a weapon with a breach to accommodate "in bore" galvanic programming as taught in the Larson U.S. Pat. Nos. 6,138,547 and 6,170,377. This system was acquired and fielded in SOCOM. During this period, other "in bore" techniques were also patented and developed by IMI, Rheinmetall and Picatinny Arsenal. The technical reasons that "in bore programming" techniques were initially favored was that the "in bore" approach provided bi-directional interfaces and certain electronic limitations in the 1990s influenced the system designers of that period to favor galvanic connections that accommodated (a) relatively high amperage levels, (b) capacitors with limited storage, and (c) reserve battery designs with slow power rise times. Yet, while there were benefits to "in bore programming" in the 1990s, one significant issue created a barrier to wide adoption of the technology: The cost associated with modifying firing platforms and fire controls proved to be significant and the establishment of standards based on "in bore" programming has ultimately created an almost insurmountable barrier to adoption of in-bore airburst ammunition. During the recent war in Afghanistan, the USMC modified a limited number of their M1A1 tanks with "in bore" programming and fielded Rheinmetall's DM11 for restricted use in combat operations. The USMC made a decision that they did not have enough funding to modify all of the M1 tank breaches to fire DM11 Ammunition. The US Army is now pushing forward with an ambitious XM1069 AMP program where General Dynamics is using DM11 technology in their candidate AMP projectile. If the program succeeds the Army will start the expensive process of modifying all of their M1A1 and A2 tanks to a newer configuration.

Post-Shot Programming Kit for Programmable Airburst Ammunition:

Again, one should recognize that the AHEAD system was the first "post-shot programming" device fielded but, as noted previously, power demands and the cumbersome mass of the muzzle device precluded use of the system in dismounted weapons. As the defense industry entered the new millennium of the 21$^{st}$ century, Moore's law continued to drive advancements and the electronic components advancements made "post-shot programmable ammunition" practical and affordable with the added benefit of being simpler to integrate into weapon platforms. In the second decade of the 21$^{st}$ century, wireless RF and optical devices became ubiquitous in homes and businesses so the apprehension regarding wireless solutions faded. With wireless RF and optical solutions, system integration costs fell and the costs associated with upgrading systems to incorporate airburst technology have fallen. Most development activity in airburst has been focused on the 40 mm×53 High Velocity product family. NAMMO (Norway) and STK (Singapore) have introduced "post-shot" RF programming. Rheinmetall Waffe and Munitions GmbH (Germany) have introduced their DM131, which uses an optical (IR) based programming as described in their U.S. Pat. No. 8,499,693. The DM131 is now qualified for use in Germany and The Netherlands. Junghans Microtech GmbH and their South African partner, DoppTech (Pty) Limited, are now commercially introducing Extended Range Magnetic Induction (eXMI) which transmits an un-jammable magnetic modulation in the 200 KHz range. All of the above techniques allow for post shot programming, but no advancement in fire control or kits has been forthcoming. Neither NAMMO, Rheinmetall, Junghans Microtech nor Singapore have yet considered introducing kits to measure muzzle velocity and then calculate an optimum burst point 11. The above airburst cartridges use a time of flight where a time-of-flight (TOF) corresponds to a range. While the programming of a desired time of flight has been the current standard approach incorporated into airburst munition fuzes from Europe and Asia, it will be possible—in the not too distant future—to program a distance to burst (DTB) measurement. ATK developed a "spin count" fuze where the cumulative spin of a projectile corresponds to distance and a distance to burst (DTB) corresponds to range. Beyond spin count, other approaches may include a fuze coupled with an accelerometer in the projectiles fuze can measure total elapsed drag with a corresponding distance. Hence, an air burst fuze is programmed using either a TOF or DTB methodology.

In generally duration of flight after passing the programming station) for fuze function, but more advanced solutions may also use "on board" sensors to calculate distance traveled to imitate airburst function. Accordingly, TOF and DTB are used throughout this document to denote the elapsed time from passing the programming station to initiation of function after the programming station.

Z-Range Velocity Measurement and Post-Shot Airburst Programming Kit:

In configurations where programmable "airburst" ammunition is fired and where "post-shot programming" is used, the programming of a uniquely optimized time-of-flight for a fired projectile can provide military forces with distinct operational advantages. The introduction of a "post-shot programming" kit that includes a muzzle velocity measurement device, ballistic calculator and programmer (or transmitter) affords military customers the ability to construct a system where the individual muzzle velocity of each shot is measured and used by a ballistic calculator to compute an optimized flight time to airburst, which is then transmitted to a projectile. By utilizing such a kit, military personnel can minimize the "range error" associated with muzzle velocity variation, improve precision, improve terminal effects and reduce ammunition expenditures in defeating targets. To illustrate the benefit of using non-linear sub-routines to adjust and shape airburst programming time of flight or distance to burst, one can look at a 40 mm×53 projectile with a high apogee trajectory where the benefits become apparent. Generally, a 40 mm×53 grenade lot will exhibit 5-10 meter per second muzzle velocity variation within a sample. A 40 mm grenade fired at a range corresponding to 1500 meters would have 9.5 seconds of flight time. With a mean muzzle velocity variation of +/−5 meters per second multiplied by the grenade's 9.5 seconds of flight time, a volley of ammunition will generally fall at range distance 90 meters apart. The value of a post-shot programming kit is apparent upon examining the terminal effect where a volley of such 40 mm×53 high airburst grenades are fired with a fixed airburst time of flight. FIGS. 31B, 31D, 33B and 33D illustrate how a volley of projectiles programmed with an actual measured muzzle velocity perform. A large percentage of a volley will fall short of the target and a significant portion of fired projectiles will function ineffectively beyond the target. In contrast, FIGS. 31C, 31E, 33C and 33E illustrate how projectiles, programmed with a ballistic algorithm that measures muzzle velocity and further incorporates other sub-routines to calculate a more precise TOF or DTB, provide improved and effective terminal effects at all ranges.

The difference in optimizing an optimized terminal effect (a detonation point) is the terminal angle of fall and velocity. A 40 mm projectile travels at one quarter the speed of a 30 mm×173 projectile. Hence a 40 mm projectile's "rearward throw," where fragments are ejected at detonation from the slow moving 40 mm projectile provides good terminal lethality. When optimizing terminal effect in a 30 mm system, the forward velocity and forward kinetic energy of fragments are lethal. Thus, in the case of a 30 mm ABM system "fragment throw" is optimized both downward and forward. In providing a device that (1) measures the actual muzzle velocity, (2) given a range, determines an optimized "z" range burst point, and (3) programs the ammunition "post-shot" to detonate at (a) a calculated distance or (b) after a prescribed flight duration incorporated into a weapon kit, is an advancement in terminal effect for airburst munitions.

Z-Range Muzzle Velocity Measurement and Regulation Kit:

Current propellant and mechanical technology limits the repeatability of ammunition muzzle velocity which varies in both lot-to-lot and shot-to-shot conditions. Environmental parameters further complicate the repeatability of muzzle velocity, as it is well known that the temperature of an ammunition propellant influences a projectile's muzzle velocity. At distance, projectiles with a higher muzzle velocity travel farther and hit vertical targets at a higher elevation when compared to slower traveling projectiles. Muzzle velocity affects both the range "z" error and the vertical target impact "y" error. Like range "z" error programming, it is possible to use a projectile's actual measured muzzle velocity and, with a kit, consistently reduce or increase the muzzle velocity of projectiles to a standardized slower velocity and improve the shot-to-shot performance of a weapon system. In significantly reducing or increasing the variation in muzzle velocity to a target velocity, a weapon system's precision can be increased. Some ammunition families use projectiles that are metallic and are subject to the influence of magnetic forces. Solenoids are well known to create mechanical force actuators whereby electric current applied to a coil creates a magnetic force which, in turn, creates a mechanical force. A kit composed of a device that (1) measures the actual muzzle velocity in the barrel or in a flash suppressor, (2) given known magnetic characteristics of a bullet design or model, calculates a unique force to apply to each specific projectile transiting from a muzzle into a flash suppressor or muzzle break, and (3), with a force applied after measurement, reduces the velocity to a standardized and repeatable velocity for a given type of ammunition. A kit adapted or incorporated into a weapon, configured accordingly, could deliver ammunition traveling at highly repeatable muzzle velocities and reduce shot-to-shot dispersion thus improving the precision of the entire weapon system.

New kits measuring muzzle velocity, precisely programming unique airburst duration or kits adjusting muzzle velocity to a repeatable target velocity are relevant as currently available fire control platforms are only optimized for x and y (lateral and vertical) error correction and are not configured to correct muzzle velocity and program z (range) error. As discussed herein the modification of existing fire-control sub-systems with new algorithms, new electronics and sensors can prove to be complex and costly. Accordingly, kits that modify existing fire controls are to be considered.

SUMMARY OF THE INVENTION

A principal objective of the present invention, therefore, is to provide a flight parameter measurement system, for use in the field with an operational weapon, that can determine projectile muzzle velocity, spin and yaw at a plurality of points during projectile's initial flight after barrel exit through a measurement device housed in a flash suppressor or muzzle break.

It is a further objective of the present invention to provide a flight parameter measurement system for use with an operational weapon that can determine the rate of change of muzzle velocity, spin and yaw.

It is a further objective of the invention to provide methodologies and kits that militaries can incorporate into weapons systems to reduce shot-to-shot dispersion and optimize terminal effects of airburst function. By measuring muzzle velocity using either prior art techniques or the new techniques taught herein, and by incorporating the measurement systems into a kit, militaries can improve the precision and terminal effects of weapon systems. Where airburst programmable ammunition is used, a device can program ammunition "post-shot" after muzzle exit with updated, optimized, time-of-flight programming data.

It is a still further objective of the invention, where standard projectiles contain ferrous materials, to provide a device can measure muzzle velocity and subsequently slow or increase the velocity of projectiles to eliminate the projectile's muzzle velocity variation, thus improving the impact precision and associated overall terminal effect of fired munitions.

These objects, as well as still further objects which will become apparent from the discussion that follows, are achieved, in accordance with one aspect of the present invention, by providing an otherwise conventional ammunition projectile with a plurality of marks arranged in at least one circular row around the projectile body, with the row of marks extending perpendicular to the longitudinal axis of the projectile and being of such character as to be seen by an optical detector while exiting the barrel.

Method and Apparatus for 6DOF Measurement at Barrel Exit:

Preferably at least some of the marks on a projectile have distinctive patterns such that the optical detector can discriminate between marks with different patterns.

Alternatively or in addition, at least some of the marks have distinctive colors such that the optical detector can discriminate between marks with different colors.

Alternatively or in addition, at least some of the marks are luminescent.

All of the marks on a projectile may have the same shape, or some of the marks may have a different shape than others. For example, at least some of the marks may be in the shape of a cross.

Based on the use of such an ammunition projectile, the present invention provides a projectile flight parameter measurement system which is usable with a weapon to accomplish the objectives described above. This system preferably includes the following components:

(a) a tubular housing which is configured to be attached to the weapon with its longitudinal axis aligned with the central longitudinal axis of the gun barrel, so as to receive launched projectiles as they leave the muzzle end of the barrel;

(b) at least one light beam emitter arranged in the housing for illuminating the projectiles with their markings as they pass through the housing;

(c) at least one electronic imager arranged in the housing for viewing the projectile markings that are illuminated by the emitter, and for producing electronic signals representing digital images of the projectiles with their markings; and (d) an electronic computational logic device, coupled to the electronic imager(s), for processing the electronic signals to determine one or more initial flight parameters of a projectile that has passed through the housing of the measurement system. According to the invention, these projectile flight parameters comprise one or more of the following:

(1) projectile muzzle velocity;
(2) projectile spin;
(3) projectile yaw;
(4) projectile rate of change of muzzle velocity;
(5) projectile rate of change of spin; and
(6) projectile rate of change of yaw.

The present invention makes it possible to measure the asymmetrical gas expansion forces on the base of a projectile that is exiting a barrel. When utilizing induced fluorescence, laser or LED light can be used to detect the relative movement and position of the projectile with respect to the centerline of the barrel so as to measure the asymmetric expansion (leakage) of gases as it exits the barrel.

The beam emitter provides strobe illumination and the electronic imager captures images of the projectiles with their markings as they are illuminated by the emitter. In particular, the emitter strobes the illumination and the imager captures stop-action images at the instants of illumination.

Preferably, imagers capture two or more successive views of the projectiles as they pass through the housing. For example, the imager may capture views at different angles around a circumference of the projectiles as they pass through the housing or they may capture images at the same angle at successive points along the flight path.

According to a preferred embodiment of the invention, the system emits a radiation beam. The radiation beam may be in one of the UV, visual and/or IR spectral bands, for example.

According to another preferred embodiment of the invention, the weapon includes an aiming device for the gun barrel, and the logic device is coupled with the aiming device for adjusting the aim of the barrel in dependence upon the flight parameters.

The apparatus according to the invention thus utilizes short-duration strobe illumination of a projectile that has special marks on its surface. As the strobe illuminates the projectile, the relative position and attitude of the projectile is observed.

Advantageously, the projectile markings are imprinted with specialized dyes that are visible when exposed to illumination (strobes) at certain wavelengths. This facilitates optical tracking of the index marks on the projectiles exiting the barrel and traveling through a flash suppressor or muzzle break.

It is desirable to use laser or LED light and "induced fluorescence" obtained from different colored fluorescent dyes used for the markings imprinted on the projectile, denoting the indexed rotation position of the projectile, to increase the visibility of the markings. This technique provides for a high signal-to-noise ratio which is very useful when using electronic and signal processing equipment to detect movements of the projectile in a "dirty" environment. As previously noted, the environment for observation is "washed" with smoke, un-burnt powder residue, burnt powder residue and burning propellant so that it is difficult, if not impossible, to determine the position and attitude of the projectile by viewing only its outline.

When utilizing induced fluorescence, laser or LED light can be used to detect the relative movement and position of the projectile with respect to the centerline of the barrel so as to measure the asymmetric expansion (leakage) of gases when a projectile exits a barrel.

Generally speaking, projectiles do not undergo a complete rotation in a distance less than 250-300 millimeters. If a yaw and muzzle velocity device was devised to observe a complete rotation, it would probably become too long and bulky for rifleman. Accordingly, multiple viewing points and differentiated indexing points on a projectile allow for a precise measurement of yaw and muzzle velocity over a short distance, allowing the device to have an optimum compact nature.

The following Table illustrates the relationship of the muzzle velocity and spin to measurement distance for three different weapon systems.

TABLE 1

| .338 Data (Rifle System) | | | |
|---|---|---|---|
| 2890 rotation/second | 3.66 | rotations/meter | |
| 790 meters/second | 273 mm | 1 rotation | 360° degrees |
| Measurement Length | 91 mm | ⅓ rotation | 120° degrees |
| .50 Cal Data (12.7 mm) (Machine Gun) | | | |
| 2707 rotation/second | 3.18 | rotations/meter | |
| 850 meters/second | 314 mm | 1 rotation | 360° degrees |
| Measurement Length | 105 mm | ⅓ rotation | 120° degrees |
| 40 mm × 53 Data (HV) (Automatic Grenade Launcher) | | | |
| 200 rotations/second | 0.83 | rotations/meter | |
| 240 meters/second | 1200 mm | 1 rotation | 360° degrees |
| Measurement Length | 200 mm | ⅙ rotation | 60° degrees |

To measure the motion parameters (muzzle velocity, spin and axis rotation (yaw) as well as acceleration/de-acceleration of the projectile, the projectile is illuminated two or more times as it exits the barrel through the muzzle of the weapon. After each illumination and image capture, the positions of the projectile's indexing marks are determined and stored. The illumination sequence is repeated at known elapsed times following barrel exit. As a result, this process allows for accurate determination of the yaw, spin and muzzle velocity, as well as any acceleration/de-acceleration of the projectile in a compact device.

Recorded projectile measurements are then transmitted to a fire control system (internal or external to the flash suppressor or muzzle break). This allows the fire control computer to classify the projectile's performance in the particular individual weapon system. This can be done as part of a registration methodology or for improved prediction of aiming points. Since ammunition muzzle velocity, spin and yaw vary from ammunition lot-to-lot and from gun-to-gun, the detection of changes in rotational axis, yaw and muzzle velocity for each individual weapon provided with the system of the present invention result in continuous improvements in aiming precision in azimuth (x) and elevation (y).

The forgoing measurement system makes it possible to measure the precise muzzle exit velocity, spin and yaw of the projectile while at two or more positions while still transiting a flash suppressor or muzzle break. The system can also provide the individual weapon with a sensor input leading to better precision and ballistic prediction and aiming precision when the measurements are incorporated into fire control computations.

Method and Apparatus for Post-Shot Programming Airburst Ammunition Utilizing Actual Muzzle Velocity Measurements:

where programmable ammunition has a "post-shot programming" capability, a the system according to the present invention (1) measures the actual muzzle velocity, (2) given an external range signal, calculates the "z" ballistic range error and a corresponding optimized TOD or DTB with an off-board ballistic calculator, and (3) programs the ammunition that has exited the muzzle to detonate at a prescribed flight duration. A Doppler radar may also be used to measure the muzzle exit velocity of projectiles fired from HV cannons. The system uses a methodology to (a) measure a projectile's muzzle exit velocity, (b) calculate an optimum program time for the measured velocity, (c) calculate when a projectile reaches a programming station, and (d) send a transmission with an optimum TOF or DTB for the programmable projectile. An optimum target range is acquired from an external range finder, a fire control or dial-a-range input device. The measurement system and calculator is in an optimum configuration incorporated into a muzzle break, flash hider or flash suppressor. Some configurations will include alignment of the transmitter with post-shot line-of-site to the projectile's programming station. The programming station is a physical location outside of the barrel, at a set range from the muzzle, where a programming time signal is transmitted to an airburst-programmable projectile. An optical programming method is disclosed in U.S. Pat. No. 8,499,693, which patent is incorporated herein by reference. RF methodologies have been established by NAMMO to program their 40 mm air-burst ammunition. A method of extended magnetic induction (eXMI) has been developed by the DoppTech company in South Africa and has been incorporated into certain fuzes. And while Doppler radars have been incorporated into artillery fire control systems to measure muzzle velocity and then calculate an improved firing solution for follow-on shots, the present invention provides a methodology and kit to incorporate use of a Doppler radar to first measure the muzzle exit velocity in a distance before the programming station and then, in a $2^{nd}$ step, emit a signal with an updated programmed airburst time to a programming station in the 1 GHz to 40 GHz frequency range. Each programming technique has a corresponding optimized programming station. eXMI and RF technology have a relatively short signal transmission range. Both the Optical and 1-40 GHz microwave transmission have much longer transmission ranges where programming stations can be set at further distances from the muzzle. A 1-40 GHZ programming station can be located beyond the point where the Doppler radar is able to measure a muzzle velocity. Hence, eXMI and RF programming have programming stations that are relatively close to a barrel's muzzle, while optical and 1-40 GHz microwave programming stations can be at greater distances beyond the muzzle.

Terminal Ballistics, Algorithms for Airburst Solutions and Non-Linear Methodologies:

While the measurement of exit conditions such as muzzle velocity coupled with post shot programming of a unique time-of-flight (TOF) distance to burst (DTB) solution is useful, an optimum solution for terrestrial targets will use non-linear algorithms to further shape the terminal effect for optimum performance. This methodology employs non-linear algorithms to $1^{st}$ calculate e barrel elevation and then calculate TOF or DTB optimized for terminal effect against a terrestrial target. Non-linear algorithms for terrestrial targets will utilize ballistic sub-routines to adjust TOF or DTB considering (1) the specific fragment throw of a projectile, (2) height of projectile burst, (3) target location and (4) geometry of the projectiles "fall". This approach can be incorporated into kits or the technique can be used in a more traditional weapon systems where the fire-control device calculates a solution using the aforementioned non-linear techniques and produces a wave form that initiates transmission from a post shot programmer.

Method and Apparatus for Regulating the Muzzle Velocity of Fired Projectiles:

In cases where the ammunition includes projectiles having specific magnetic characteristics, and where such a projectile transits the weapon's barrel and muzzle break, a device according to the invention that surrounds the barrel or muzzle break generates a magnetic force that acts on the projectile to reduce its velocity. A device of this type employs a functional methodology that (1) measures the actual muzzle velocity in the barrel or in a flash suppressor, (2) given the known magnetic characteristics of the projectiles, calculates a unique force to apply to each specific projectile transiting from a muzzle into a flash suppressor or muzzle break, and (3) applies the force after measurement to reduce the velocity to a slower "regulated" velocity. The measurement device and calculator is, in an optimum configuration, incorporated into a muzzle break, flash hider or flash suppressor. The ammunition must have ferrous metal properties that allow magnetic forces to act on the projectile at barrel exit. Accordingly, a weapon with such a kit will fire ammunition with a highly repeatable muzzle velocity reducing the "y" dispersion observed in ammunition at extended ranges.

Kits Formed Using Specific Projectile Characteristics, Muzzle Exit Measurements, Ballistic Calculators and Weapon System Effects:

The three sub-systems or kits disclosed hereinafter can be used in numerous configurations to upgrade or improve the performance of weapons firing ammunition with specialized characteristics. All kits include a ballistic calculator using acquired muzzle exit information. The system according to the invention includes a $1^{st}$ sub-system that provides a methodology where uniquely marked ammunition and optical sensors measure 6DOF data at muzzle exit. A $2^{nd}$ sub-system then programs the airburst-programmable ammunition, using muzzle velocity measurements to calculate a precise flight time and transmits that unique precise flight time to a projectile from a programming station external to the muzzle break. A $3^{rd}$ sub-system, after measuring muzzle velocity, then acts on any ferrous projectile, to slow or accelerate the projectile to a constant target velocity.

The following table illustrates the relationship of sub-systems whereby a sub-system initially measures a projectile's unique exit conditions (which, as a minimum include the muzzle velocity at exit). According to the present invention a unique 6DOF measurement sub-system is preferably used. The $2^{nd}$ and $3^{rd}$ sub-systems can use the new disclosed 6DOF sub-system or a sub-system using prior art techniques to either program or regulate ammunition:

To program airbursting projectiles a sub-system and method uniquely programs airburst munitions with a flight time (duration) using measured muzzle velocity post muzzle exit.

To regulate ammunition fired from a weapon the sub-system adjusts the muzzle velocity of ammunition exiting a barrel by inducing acceleration or deceleration on a ferrous projectile prior to muzzle exit.

The sub-systems all require (a) ammunition with a unique nature, (b) all sub-systems acquire muzzle exit information to include muzzle velocity, and (c) all sub-systems use a ballistic calculator that utilizes muzzle exit data to varying purposes. The new, unique measurement of 6DOF information is used with a ballistic calculator in a fire-control system to improve the placement and aiming for horizontal and vertical targets. The new, unique sub-system to program ammunition with updated TOF or DTB instructions, where programmable ammunition is used, forms a $2^{nd}$ kit. A $3^{rd}$ sub-system consists of a method to regulate the exit velocity of ammunition. A $4^{th}$ sub-system relates to the use of a non-linear algorithim into fire controls for certain high apogee projectiles fired at certain ranges. Certain parameters and techniques are used and the systems effect a reduction in shot-to-shot dispersion by various means. Each sub-system uses unique methodology and the sub-systems allow for production of kits that will improve the performance of weapon systems.

TABLE 2

Table 2: Measurement - Projectile - Parameter - Technique and System Effect

| Measurement Approach | Ammunition Projectile | Sub-system Parameter and Technique | System Effect |
| --- | --- | --- | --- |
| (New) Optical High Speed Processed Image Measurement or Prior Art Muzzle Velocity | Coordinate Marking | Measure 3 Initial Flight Parameters | Post-Shot Ballistic Aim Improvement (Horizontal x and Vertical y) |
| | Airburst RF or Optical "Post-Shot Programmable" | Using muzzle velocity measurements, a ballistic calculator computes a corrected time of flight (time to detonate) using RF, optical, eXMI or Microwave programming of a projectile's time of flight is programmed "post-shot" | Post-Shot programming transmits and exact flight time for a exiting projectile (Range Error) with an effect that reduces Shot-to-shot Range Error "z" range dispersion. |
| | Conventional Ferrous | Using muzzle velocity measurements, a computer calculates a force to be imparted on a projectile that reduces (Regulates) Shot Dispersion by inducing a magnetic field to slow or accelerate ammunition) to a target velocity. | Regulate Muzzle Velocity of exiting projectiles (Range Error) with an effect that reduces Shot-to-shot Range Error "z" range dispersion. |
| | High Apogee Air-Burst Projectiles | Using Non Linear Algorithm in a sub-routine coupled with muzzle velocity measurement of a projectile, a ballistic calculator computes a corrected TOF or DTB AND transmits a programming signal with RF, optical, eXMI or Microwave programming where the non-linear sub-routines to adjust TOF and DTB (1) fragment throw, (2) HOB, (3) Target placement location and (4) geometry of "fall" | Minimizes ground burst (with sub-optimal effect) of projectiles fired at below average velocities AND Minimizes (ineffective) air-bursts where a programmed projectiles velocities exceeds the average velocity and the uncorrected HOB exceeds the incapacitating fragment range for a projectile. |

New kits measuring muzzle velocity and an optimum airburst programming are relevant and useful. Kits with an ability to adjusting the muzzle velocity are also relevant as currently available fire control platforms are only optimized for x and y (lateral and vertical errors) correction and are not configured to correct muzzle velocity and program z (range error). As discussed herein the modification of existing fire-control sub-systems with new algorithms, new electronics and sensors can prove to be complex and costly. Accordingly, kits that modify existing fire controls should be considered.

For a full understanding of the present invention, reference should now be made to the following detailed description of the preferred embodiments of the invention as illustrated in the accompanying drawings.

BRIEF DESCRIPTION OF THE DRAWINGS

FIG. 18D depicts a kit with an extended magnetic induction (eXMI) programmer.

FIG. 18G shows additional detail of the methodology to measure muzzle velocity in bore and program a projectile post shot with an eXMI programmer.

FIGS. 20A and 20B depict a "kit" for implementing the system of FIG. 17 using optical and RF signals, respectively, to transmit programming to the projectile.

FIG. 20D depicts a methodology to measure muzzle velocity (MV) of a projectile with a Doppler radar and produce a post-shot programming signal to an airburst projectile. The method uses a Doppler radar, calculates a corrected time of flight (TOF), then encodes and transmits a 1-40 GHz signal to a projectile.

airburst

FIG. 22 is a graph showing a typical distribution of muzzle velocities for projectiles fired from a weapon.

FIG. 23 is a representational diagram showing the measurement of muzzle velocity using magnetic coils.

FIGS. 28A and 28B illustrate how detonation ejects or throws fragments into a beaten zone.

FIG. 29C depicts a Monte Carlo Simulation of the burst location of 40 mm×53 projectiles fired to 500 meters with muzzle velocity measurement and post shot programming.

FIG. 34C depicts a Monte Carlo Simulation of the burst location of 30 mm×173 projectiles fired to 1500 meters with muzzle velocity measurement and post-shot programming.

FIG. 34E depicts the trajectory and Defilade Fragment Plot of a 30 mm×173 projectile fired to 1500 meters with an uncorrected TOF or DTB.

DESCRIPTION OF THE PREFERRED EMBODIMENTS

Figure 1:
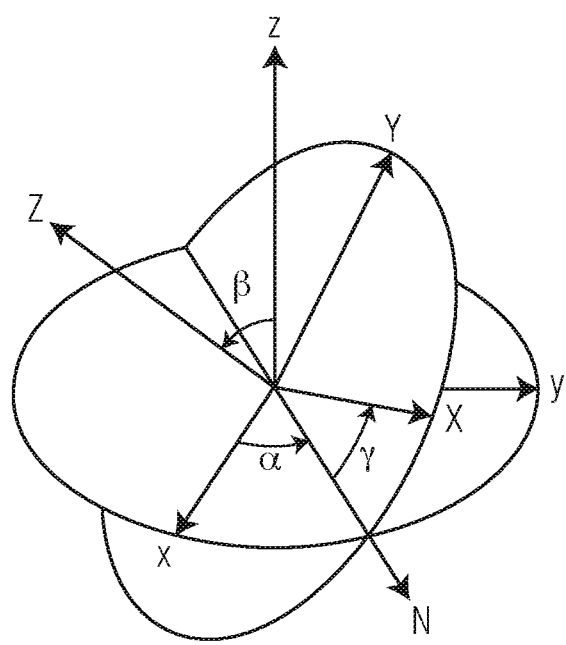
FIG. 1 is a Cartesian coordinate diagram showing various angles of yaw.

The preferred embodiments of the invention will now be described with reference to FIGS. 1-34E of the drawings. Identical elements in the various figures have been designated with the same reference numerals.

The system according to the invention utilizes the following components:

Projectiles provided with high contrast markings (e.g. color dyed) which may include luminescent characteristics.

An emitter, such as an IR, optical or UV radiation strobe, or an ion beam emitter, illuminates of the projectiles as they exit the barrel of a gun and pass through a flash suppressor or muzzle break.

Imagers that capture positions of the projectile markings. Three measurement points are desired so that the rates of change of the parameters can be measured. The measurements are captured and recorded, preferably from multiple angles to confirm the rotation axis.

A computer with a signal processor, coupled to the imagers, that determines the locations of the projectile markings at successive instants of time and computes and records the yaw, spin and muzzle velocity and the rates of change in these parameters.

Generally, for integration into a weapon system it is advantageous to incorporate the illumination and image detection into a flash suppressor or muzzle break. By incorporation of these elements into a robust housing, additional spill-light is not transmitted. The illumination of the projectile coincides with the light resulting from propellant burn, commonly known as "muzzle flash". By incorporating the illuminators and electronic imagers into a common robust housing it is possible to utilize the flow of un-burnt powder in a manner that optimizes recording of the projectile yaw, spin and muzzle velocity. Integration of the system into a flash suppressor or muzzle break provides for simple upgrading or retrofitting of operational weapons.

FIG. 1 shows two Cartesian coordinate systems, x,y,z and X,Y,Z, arranged along the barrel axis N of a weapon. The two systems have are angularly displaced with respect to each other by angles $\alpha$, $\beta$ and $\gamma$. The figure demonstrates the many degrees of freedom of a projectile in space which result in variations in ballistic flight.

Figure 2:
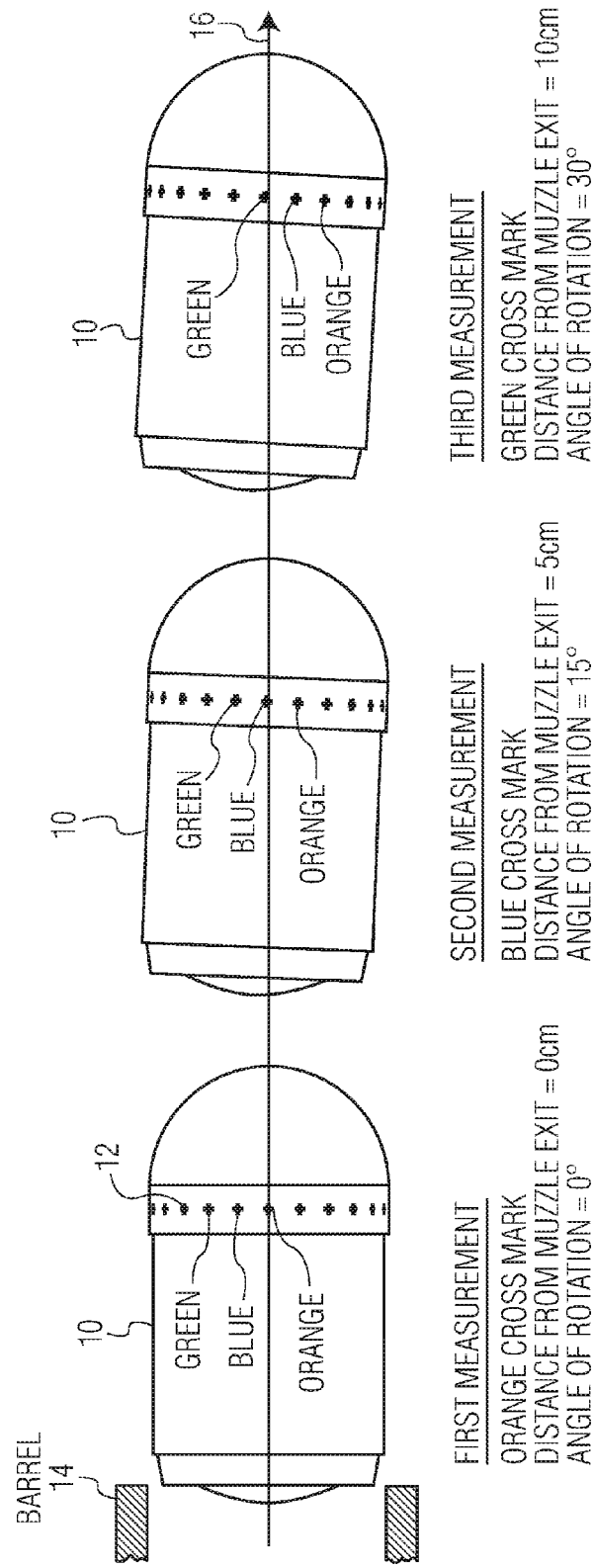
FIG. 2 is a time sequence diagram showing a projectile, provided with markings according to the invention, leaving the barrel of a weapon.

FIG. 2 shows a projectile 10 provided with markings 12 according to the present invention. The projectile is shown leaving the barrel 14 of a weapon and progressing along the path of the barrel axis 16 where it is viewed at three successive moments in time.

The marks 12 on the projectile are arranged in a circular row around projectile body transverse to the projectile axis. In this case, the marks are cross-shaped, making identification easier by character (pattern) recognition. The marks can also have other various distinctive patterns and shapes so that the system can discriminate between the different marks.

In the projectile of FIG. 2 some of the marks have distinctive colors such that an optical detector can discriminate between the marks of different color.

For better visibility amid the muzzle flash, the marks may be imprinted with a dye that is luminescent when illuminated by radiation of a particular frequency.

As may be seen in the diagram, three measurements are made by viewing the projectile at successive instants of time. By viewing angular positions of the colored markings it is possible to determine the projectile spin. By determining the successive distances from the barrel it is possible to determine the muzzle velocity.

Figure 3:
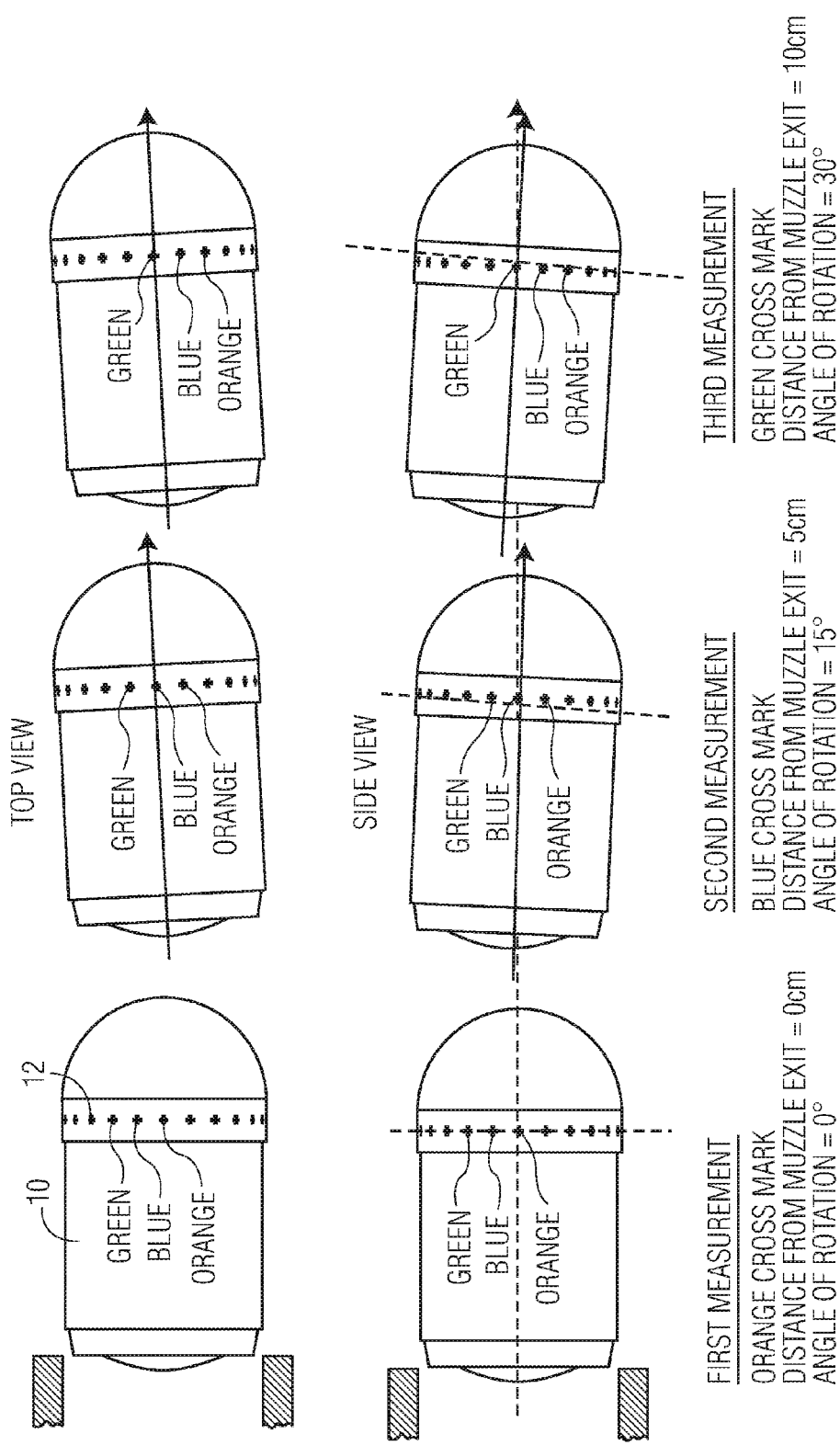
FIG. 3 is a top and side view of the projectile of FIG. 2 showing rotational axis changes.

FIG. 3 is a diagram, similar to FIG. 2, which shows the projectile from two vantage points that are angularly spaced by 90°; that is, a top view and a side view. By means of this additional point of view it is possible to more completely determine the projectile yaw at the successive instants of time.

By determining the yaw, spin and muzzle velocity at successive instants of time it is possible to determine the rate of change of these parameters.

Figure 4:
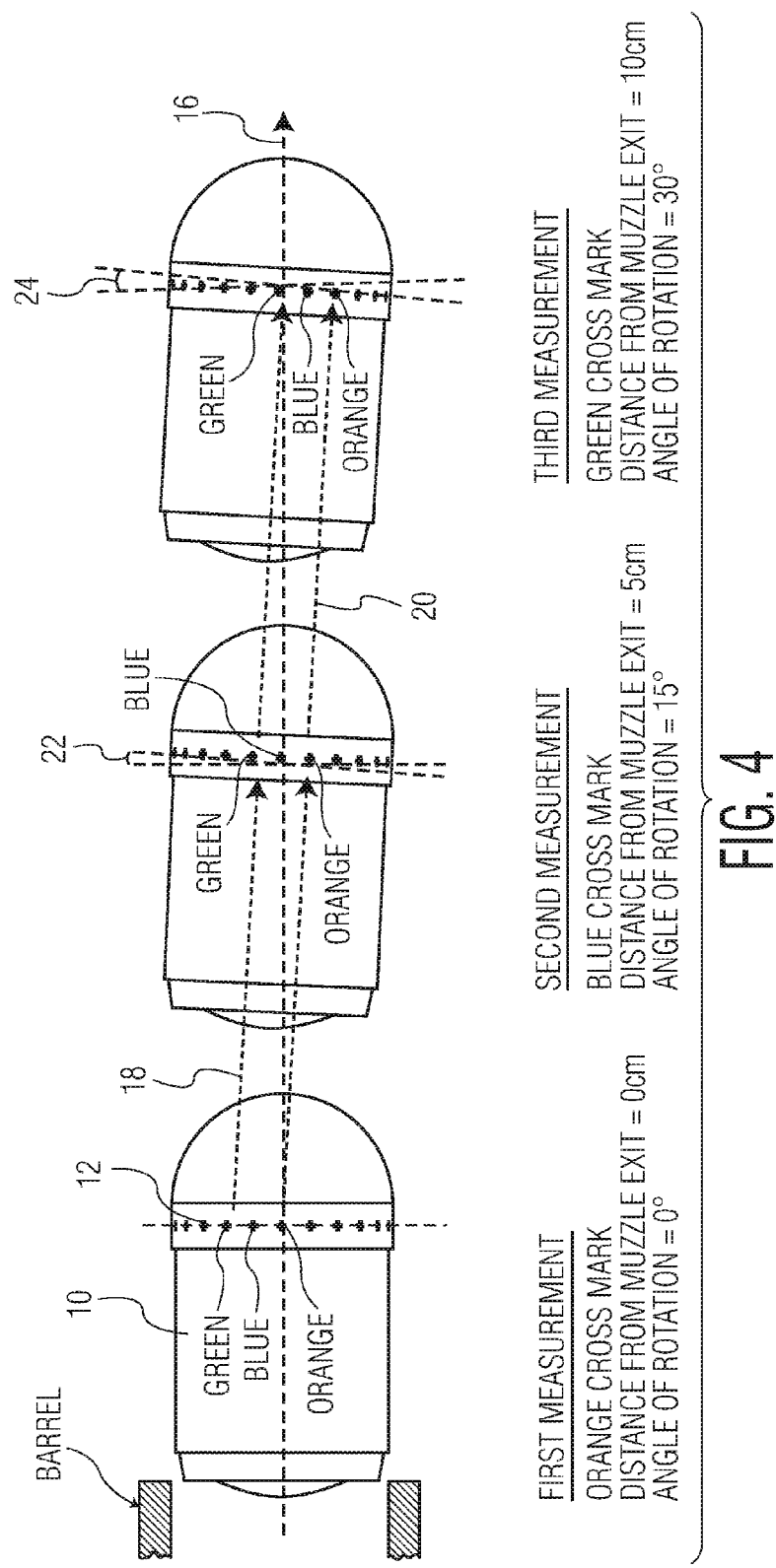
FIG. 4 is a side view of the projectile of FIG. 2 showing successive angles of yaw.

FIG. 4 is still another diagram showing the projectile 10 with markings 12 viewed in three successive instants of time. The spin of the projectile may be seen by observing the marks 12 which rotate, as indicated by the dashed line 18, which intersects a common mark in the three images, and 20 which intersects another. In addition, the yaw may be observed by comparing the positions of a line intersecting all the marks on each projectile with a line transverse to the central axis 16. In FIG. 4, the angle of yaw is seen to be increasing from the first image (no angle of yaw), to the second (small angle 22) and to the third (larger angle 24).

Figure 5:
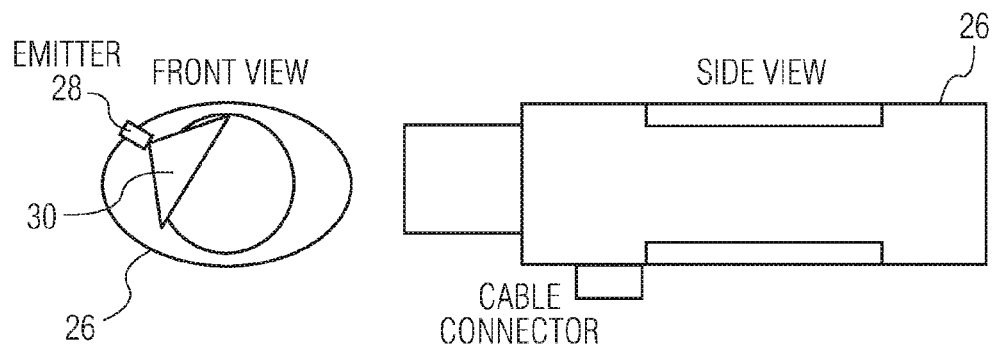
FIGS. 5 and 6 are front and side views of a flash suppressor for RWS and 40 mm AGLs incorporating an emitter (FIG. 5) and an optical detector (FIG. 6) according to the invention.
Figure 6:
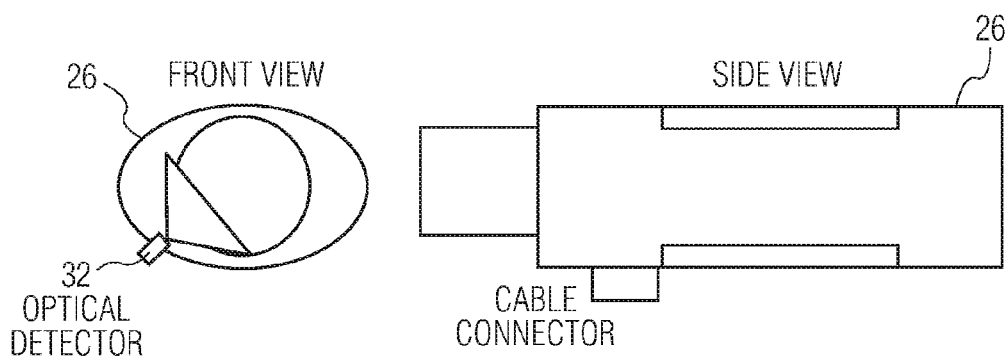
Figure 7:
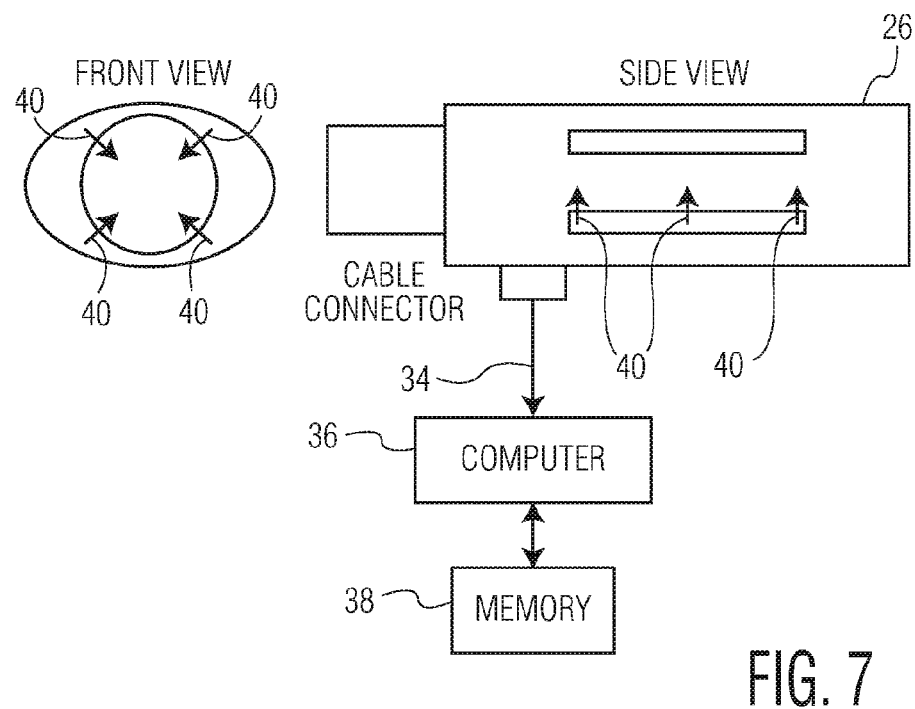
FIG. 7 is a block diagram of the system according to the invention incorporated into a flash suppressor for a 40 mm AGL.

A system for measuring the three projectile parameters—yaw, spin and muzzle velocity—as well as the rates of change of these parameters, is represented in FIGS. 5-7.

FIGS. 5 and 6 are representational diagrams of a flash suppressor 26 for a 40 mm automatic grenade launcher (AGL) showing both front and side views in cross-section.

In FIG. 5 an emitter 28 emits a momentary flash illumination 30 as the projectile passes through, electronically triggered by the firing mechanism of the weapon. The emitter repeats the flash illumination one or more times (preferably resulting in three flashes altogether) thus "freezing" the projectile at successive instants of time.

In FIG. 6 one or more optical detectors 32 capture an image of the projectile at the successive instants of time. The optical detector is preferably a COD camera which is triggered to view the projectile during successive windows of time that overlap with the instants of flash illumination. Advantageously, three separate cameras may be aligned in spaced positions along the central axis to capture images as shown in FIG. 2, but a single camera may suffice to capture all three images.

Advantageously one or more additional cameras 32 may be aligned along the central axis to view the projectile from a different vantage point and capture images of a different side of the projectile as shown in FIG. 3.

FIG. 7 illustrates a complete system comprising a flash suppressor 26 incorporating one or more emitters 28 and one or more optical detectors 32, coupled via a cable connector 34 to a computer 36 with an associated memory 38. By way of example, positions of the emitters 28 and detectors 32 are shown by arrows 40 in both the front view and side view of the suppressor.

In operation, signals representing the digital images captured by the detectors 32 are passed to the computer for processing. The computer performs character recognition on the markings of each projectile and calculates the yaw, spin and muzzle velocity of the projectile. The results are recorded in the memory 38 for use by the fire control system which then calculates the expected ballistic path of the next projectile to be launched.

The operation of the system according to the invention will now be described with reference to FIGS. 8-14. These figures are all representative diagrams of a flash suppressor at different stages while a projectile passes through.

Figure 8:
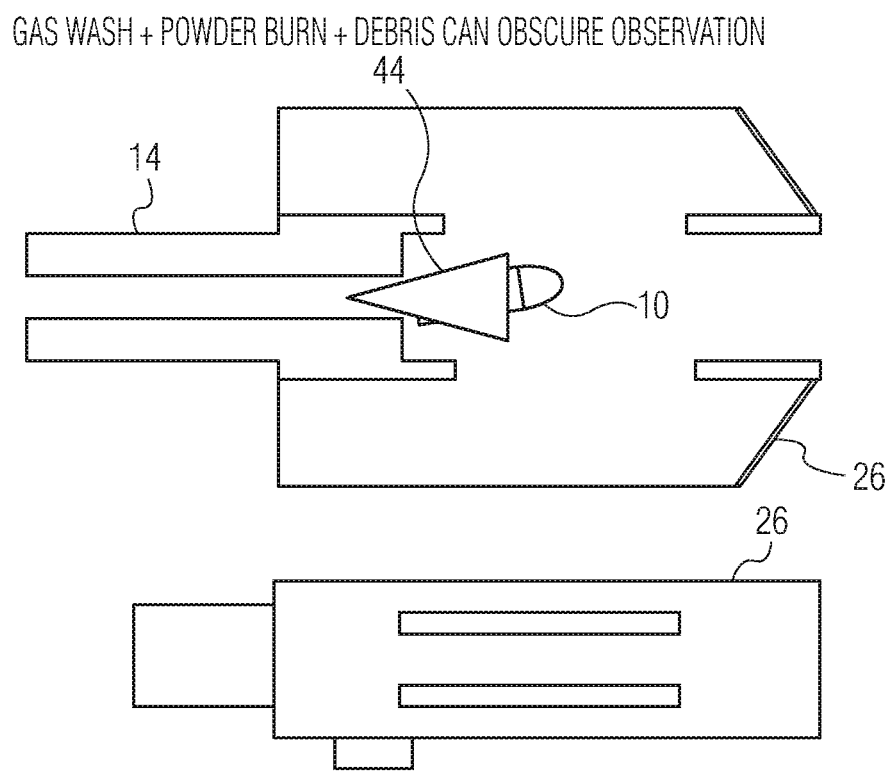
FIG. 8 is a schematic view of a flash suppresser showing gas wash, powder burn and debris that obscures observation of the fired projectile.

FIG. 8 shows a flash suppressor 26 attached to the barrel 14 of a gun at the moment a projectile 10 emerges from the muzzle. When this occurs, gas wash, burned powder and other debris emerge with it, obscuring visibility in the suppressor chamber.

Figure 9:
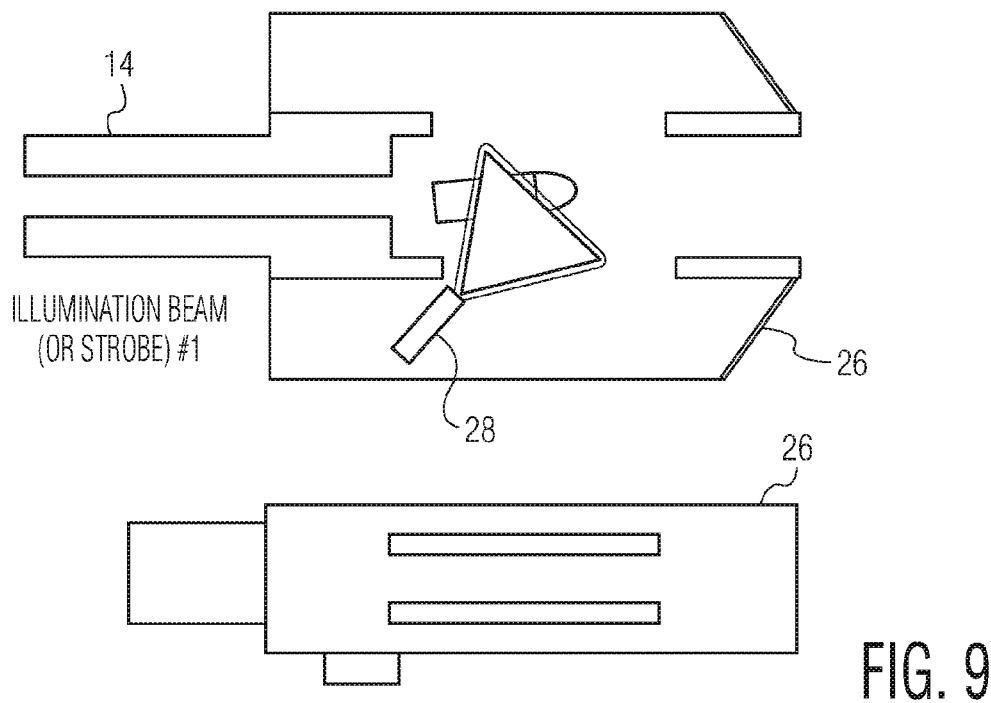
FIG. 9 is a schematic view of a flash suppresser showing the flash illumination of a projectile in first position.
Figure 10:
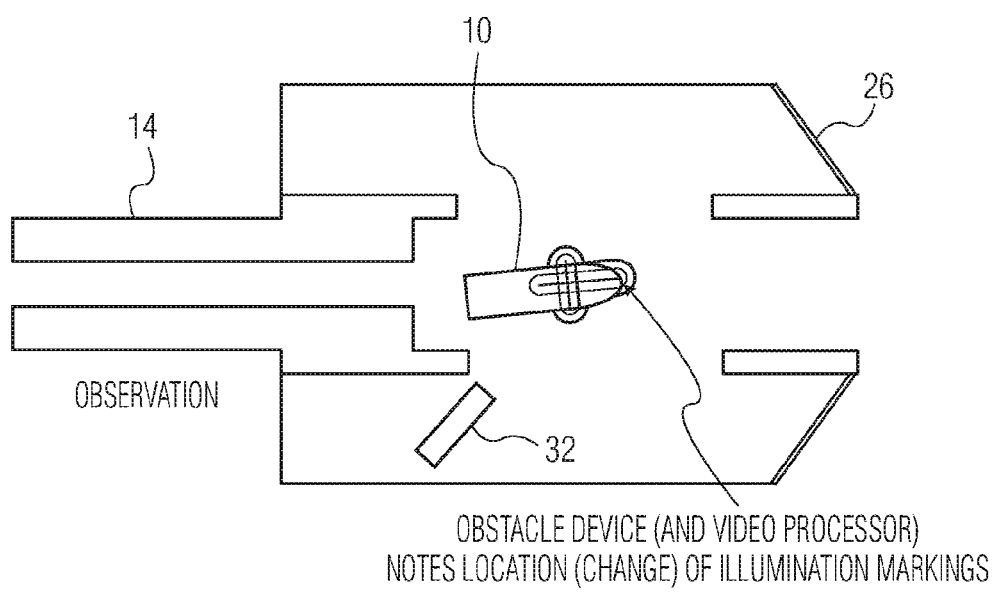
FIG. 10 is a schematic view of the flash suppresser of FIG. 11 showing the image capture of markings on the projectile in the first position.

FIGS. 9 and 10 illustrate capturing an image of the projectile using the stop-action flash photography. The image capture occurs a short time after the initial launch, illustrated in FIG. 9, when the blast of debris has passed by the projectile 10, leaving the projectile visible to an electronic imager 32 when illuminated by an emitter 28.

Figure 11:
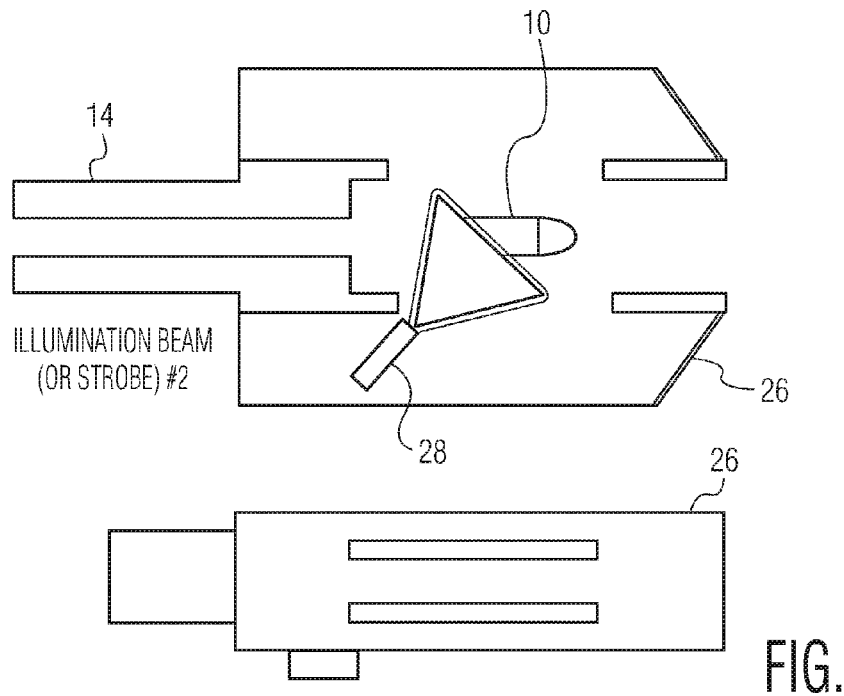
FIG. 11 is a schematic view of a flash suppresser showing the flash illumination of a projectile in a second position.
Figure 12:
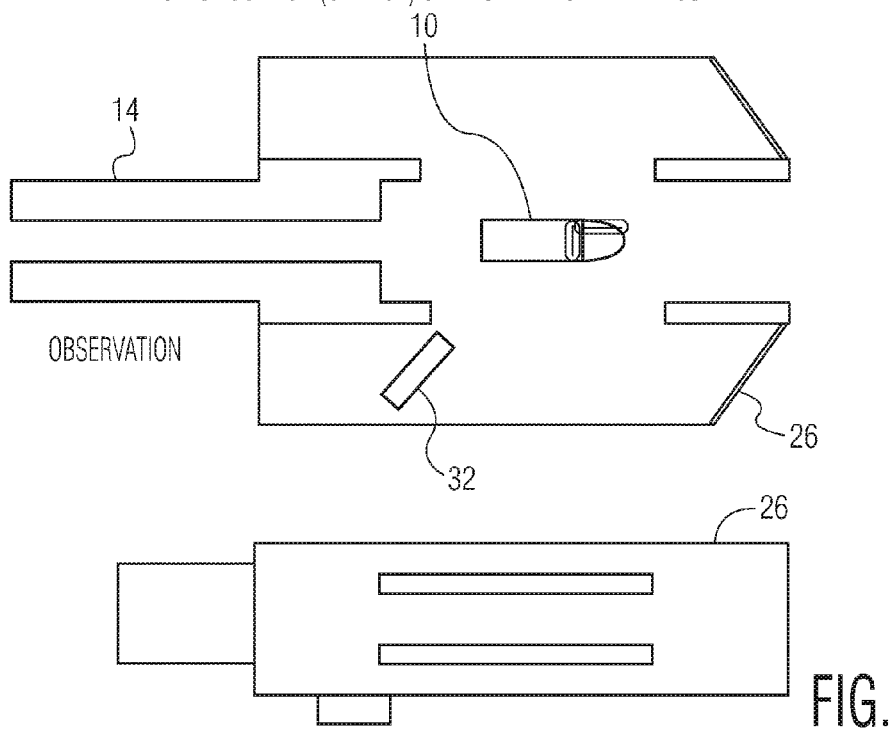
FIG. 12 is a schematic view of the flash suppresser of FIG. 13 showing the image capture of markings on the projectile in the second position.
Figure 13:
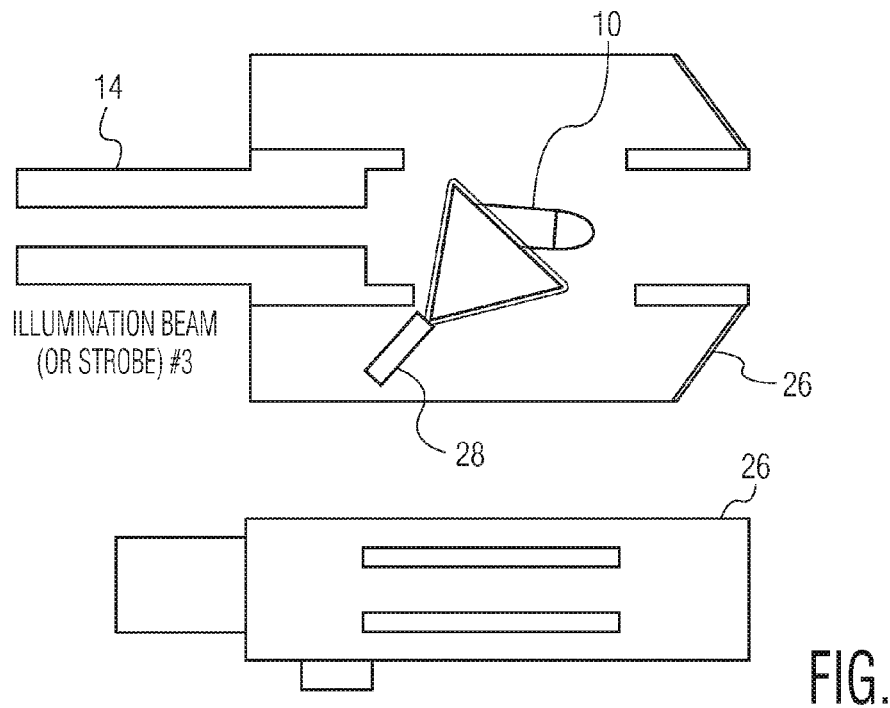
FIG. 13 is a schematic view of a flash suppresser showing the flash illumination of a projectile in a third position.
Figure 14:
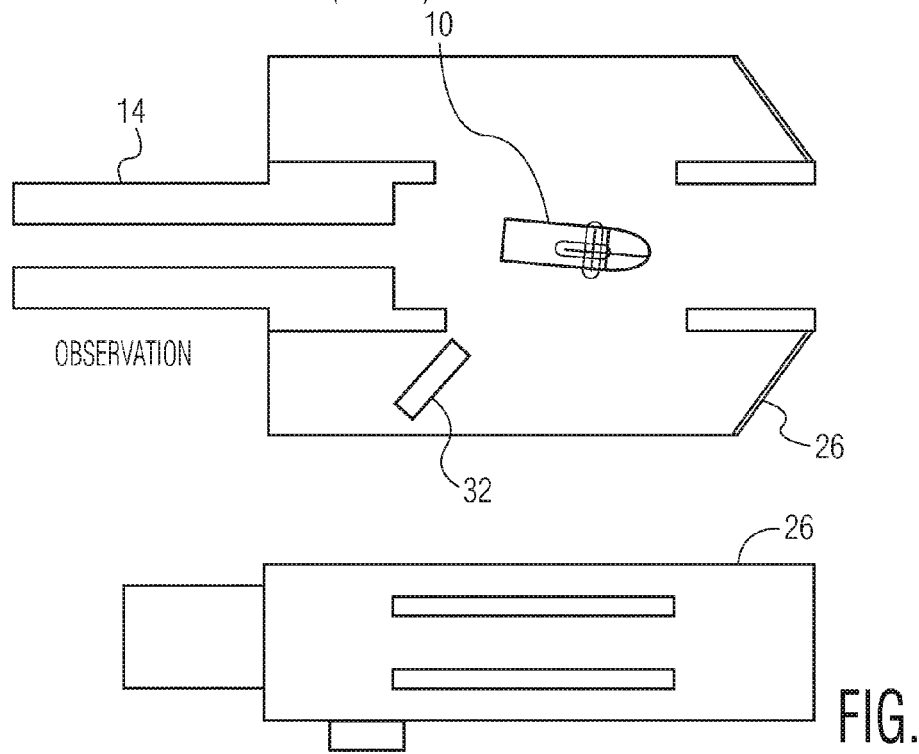
FIG. 14 is a schematic view of a flash suppresser of FIG. 15 showing the image capture of markings on the projectile in the third position.

FIGS. 11 and 12 illustrate the capture of a second image of the projectile at a second, successive instant of time. Similarly, FIGS. 13 and 14 illustrate the capture of a third image at a third successive instant of time. The markings on the projectile are recognized and their positions from one instant to the next are compared in the computer to determine the projectile's yaw, spin and muzzle velocity.

Figure 15A:
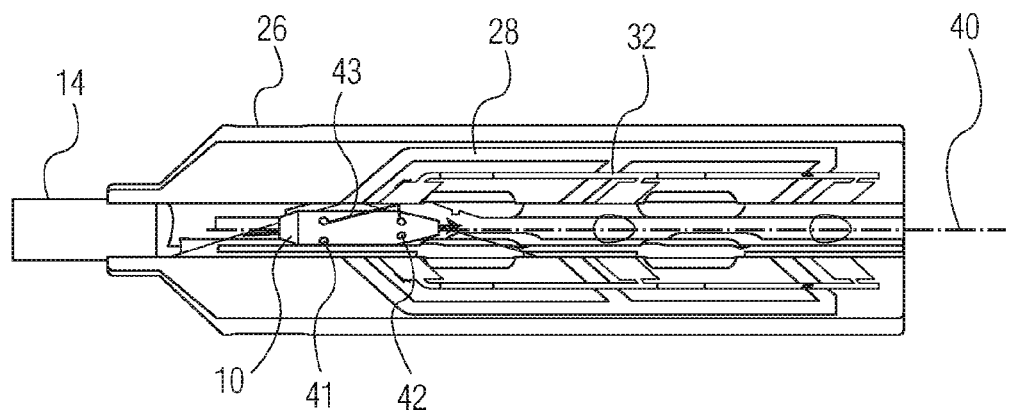
FIGS. 15A, 15B, 15C and 15D are cutaway views of a flash suppresser at successive instants of time as a projectile is launched and imaged as it passes through the device.
Figure 15B:
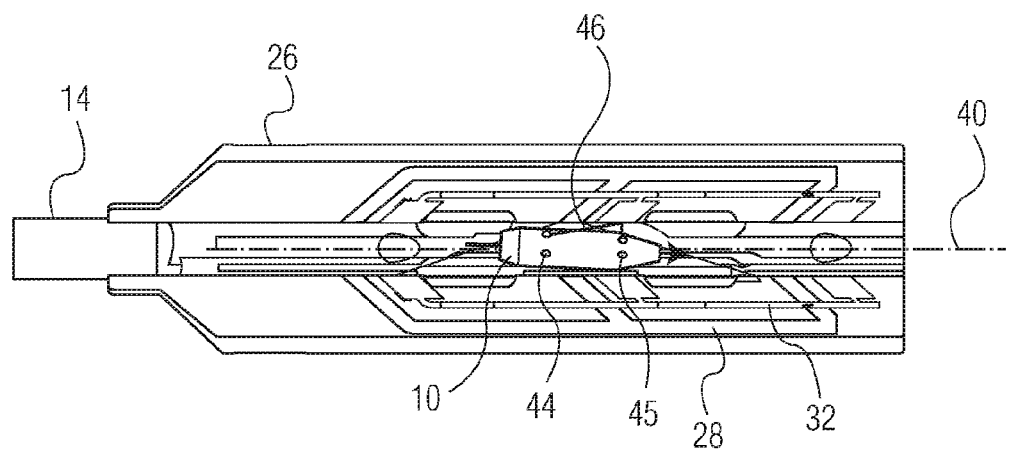
Figure 15C:
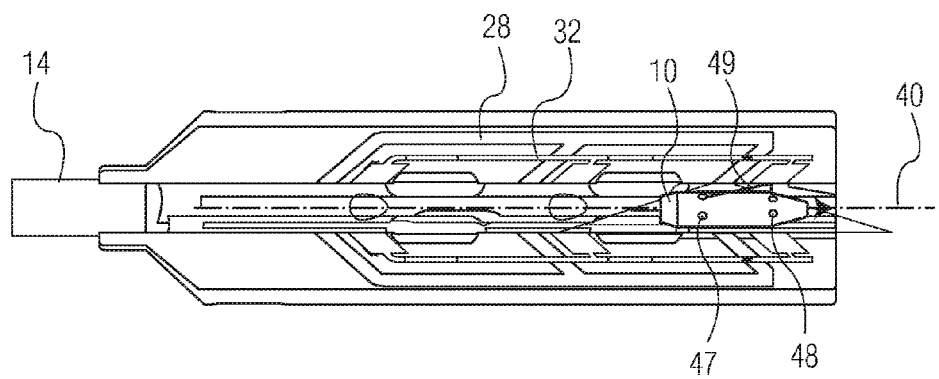
Figure 15D:
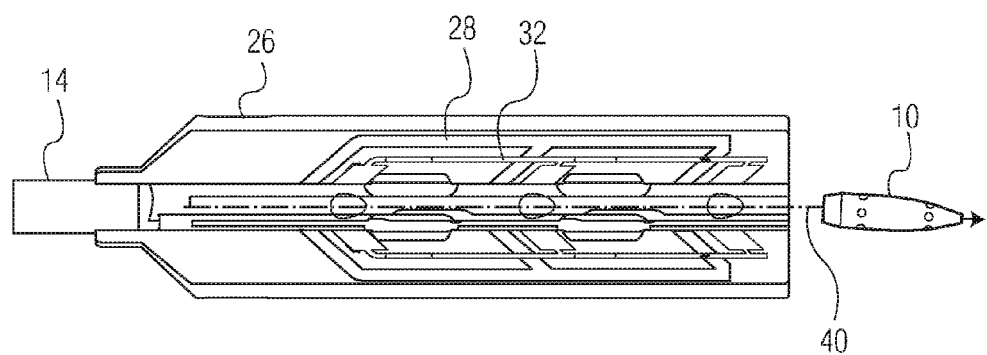

FIGS. 15A through 15D show the flash suppressor 26 incorporating the system of the present invention at successive instants of time as a projectile 10 passes through it along a central axis 40. In FIG. 15A the projectile is seen leaving the barrel 14 of the gun and being imaged in a first strobe flash. The positions of markings 41 and 42 near the front and the rear, respectively, of the projectile are captured and identified as indicated by the arrow 43. In FIG. 15B markings 44 and 45 are identified as indicated by arrow 46 and in FIG. 15C markings and 48 are identified as indicated by arrow 49. FIG. 15D shows the projectile 10 with a slight yaw as it leaves the flash suppressor 26.

Figure 16A:
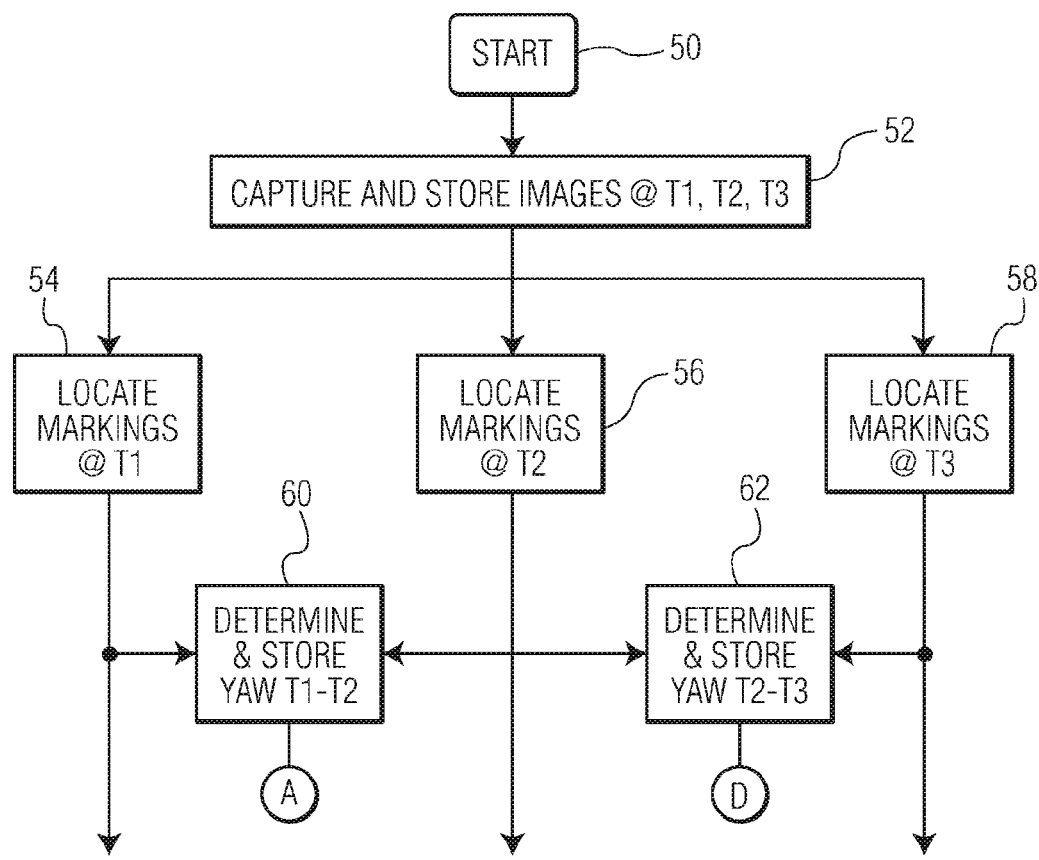
FIGS. 16A and 16B comprise a flow chart showing the operation of the system according to the present invention.
Figure 16B:
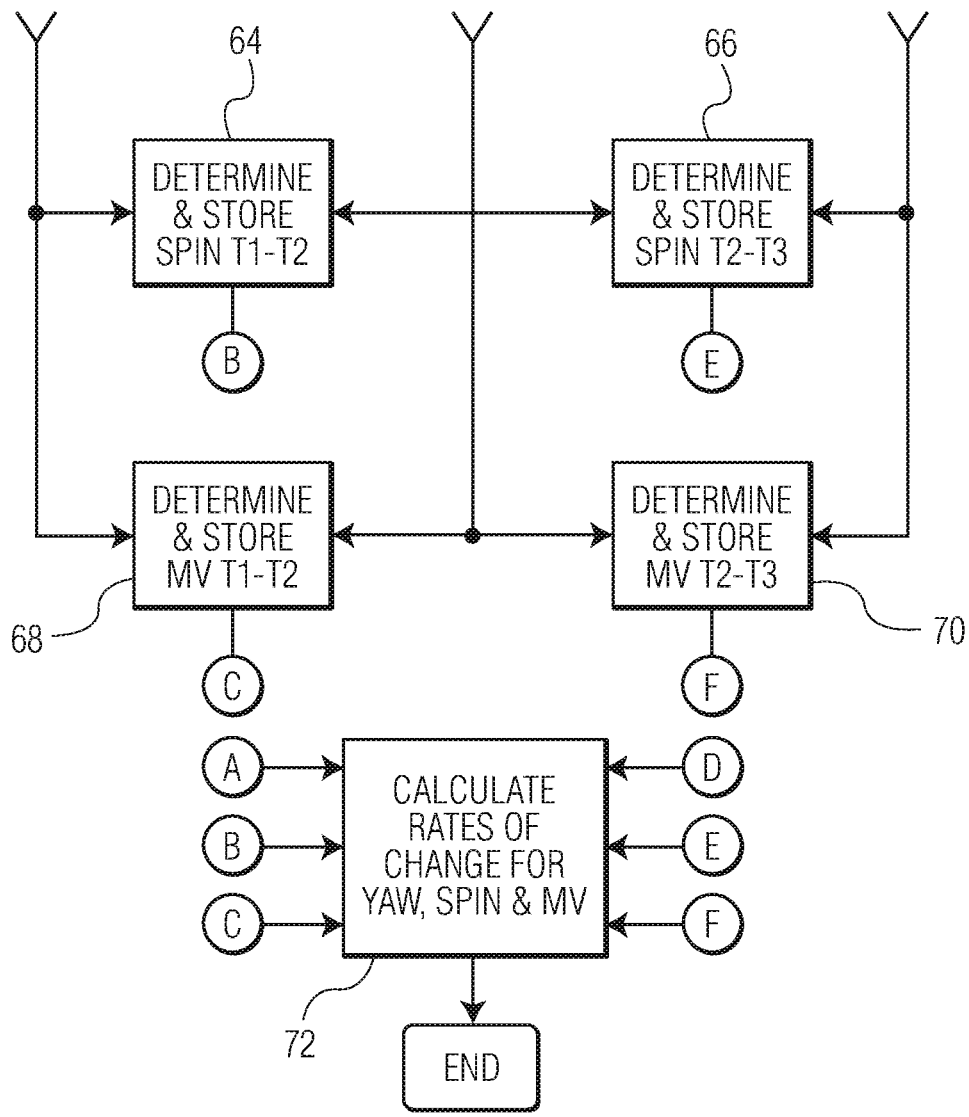

The computer 36, controlled by software, operates according to an algorithm as represented by the flow chart of FIGS. 16A and 16B. The program starts at block 50 upon receipt of a trigger signal that fires the projectile 10 at time T0. Three successive images of the projectile are captured by flash photography and stored in the memory 38 at times T1, T2 and T3, respectively (block 52). The computer processes the signals defining each image in turn (blocks 54, 56 and 58) to recognize the markings on the projectile and determine and store the coordinates of these markings as they appeared at times T1, T2 and T3. Once the locations of the markings are available, the computer calculates and stores the projectile's yaw, spin and muzzle velocity (MV), respectively, by determining changes in the marking locations, first between times T1 and T2 and then between times T2 and T3 (blocks 60-70). Once all these parameters are available (outputs A, B, C, D, E and F) the computer calculates the changes in yaw, spin and MV and determines their respective rates of change (block 72).

Kit for Programmable Airburst Ammunition:

A kit, added to or incorporated into a weapon, provides an apparatus and methodology to (1) measure a projectile in transit within the barrel or transiting a muzzle break, (2) where the apparatus receives electronically transmitted information from an external device with range information that is passed to (3) a ballistic calculator that calculates an optimum time-of-flight (TOF)—time or distance to burst (DTB)—for a projectile with that measured velocity which, in turn, (4) exits the muzzle break and reaches a programming station, where (5) an encoded time of flight instruction is transmitted to the projectile and the projectile follows its ballistic path and detonates at the prescribed flight time.

Figure 17:
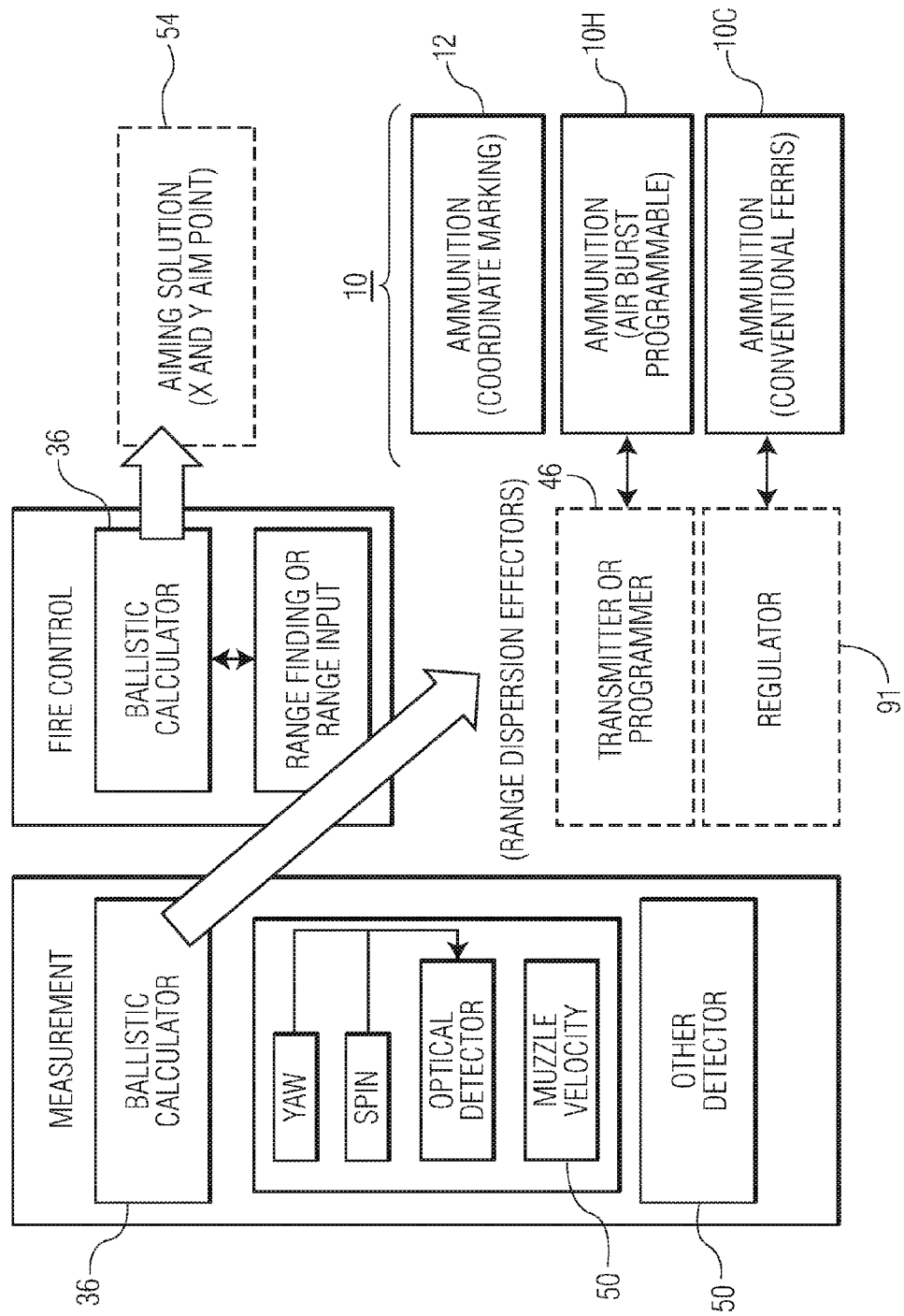
FIG. 17 is a block diagram illustrating key components that can, in various configurations, be incorporated into kits according to the invention.

FIG. 17 is a diagram depicting key inter-relationships among sub-systems that measure "muzzle exit conditions" and use a ballistic calculator to improve the horizontal (y) and vertical (x) range aiming, alternatively or in combination with sub-systems that use two different techniques to affect (1) conventional projectiles with a ferrous nature to control their speed, and/or (2) airbursting programmable projectiles to reduce shot-to-shot range (z) errors.

Figure 18A:
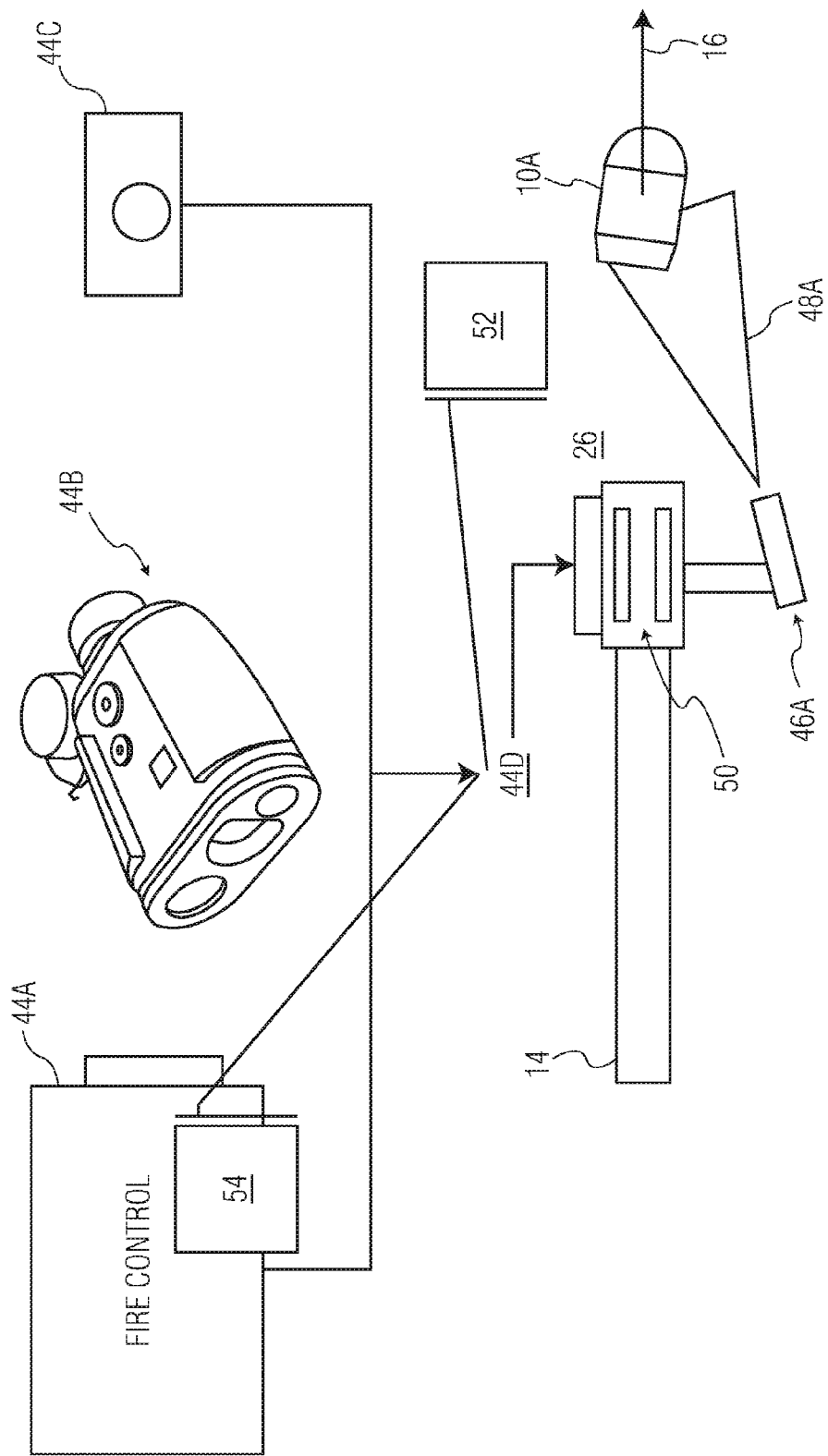
FIGS. 18A and 18B are detailed diagrams of the weapon system of FIG. 17 showing optical and RF transmission, respectively, to the projectile during flight.

FIG. 18A depicts a kit where range information is provided to a ballistic calculator and, upon firing a projectile, is measured using prior art techniques 28A or an optical measurement as disclosed hereinabove (not depicted in FIG. 18A). The figure also depicts an optical programmer 46A affixed to a muzzle break 26 attached to a barrel 14. The ballistic calculator is protected in a housing 52 fixed to the flash suppressor 26. An emitter or programmer 46A transmits and optical signal 48A to the projectile to program an optically programmed airburst projectile 10A.

Figure 18B:
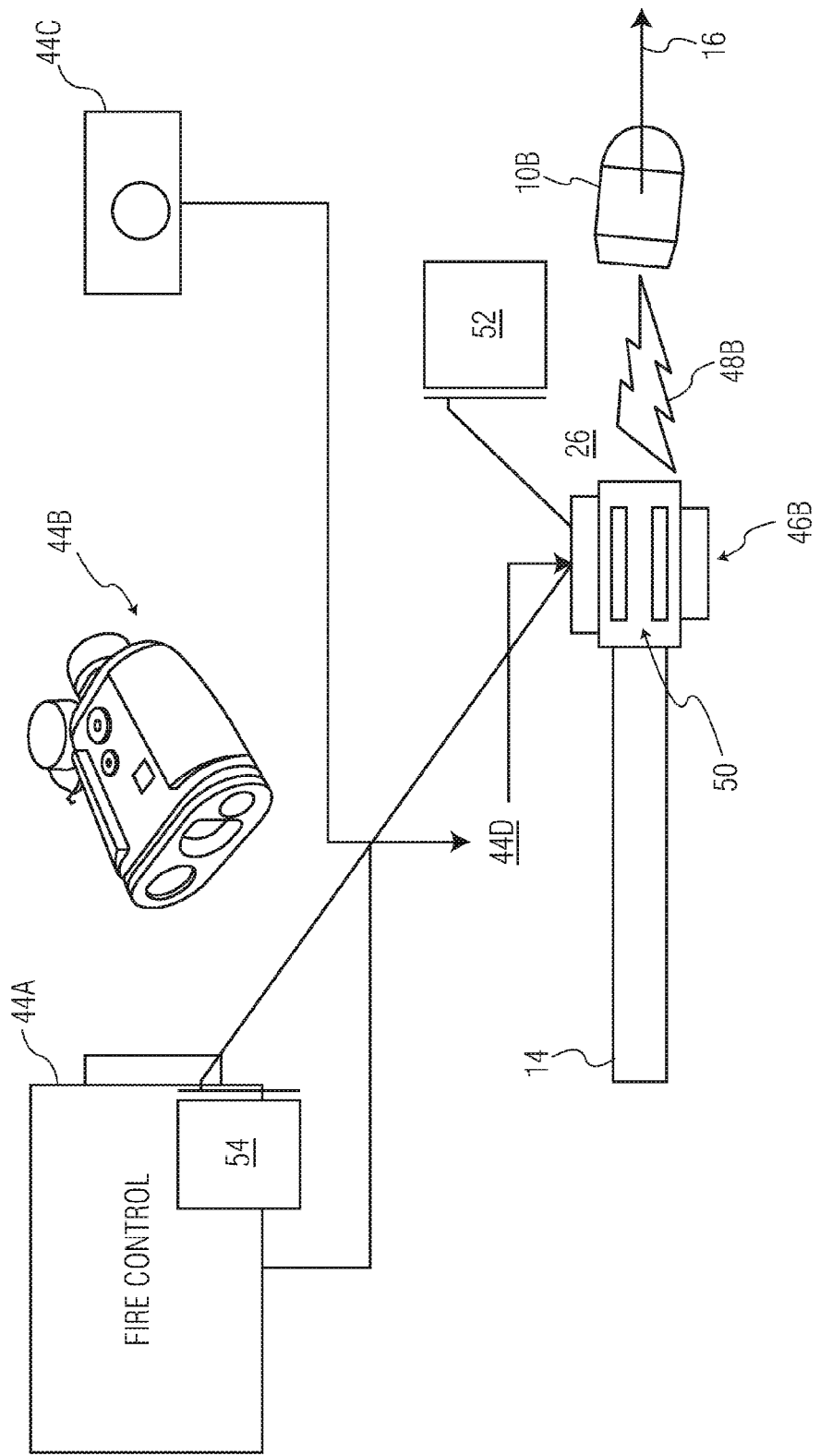

FIG. 18B depicts a kit where range information is provided to a ballistic calculator and, at firing, a projectile is measured using prior art techniques 28A or an optical measurement as disclosed hereinabove (not depicted in FIG. 18B). The drawing also depicts an RF programmer or transmitter 46A affixed to a muzzle break 26 attached to a barrel 10. The ballistic calculator is protected in a housing 52 affixed to the flash suppressor 26. An emitter or programmer 46B transmits an RF signal 48B to the projectile to program a programmed airburst projectile configured for RF programming 10B.

Figure 18C:
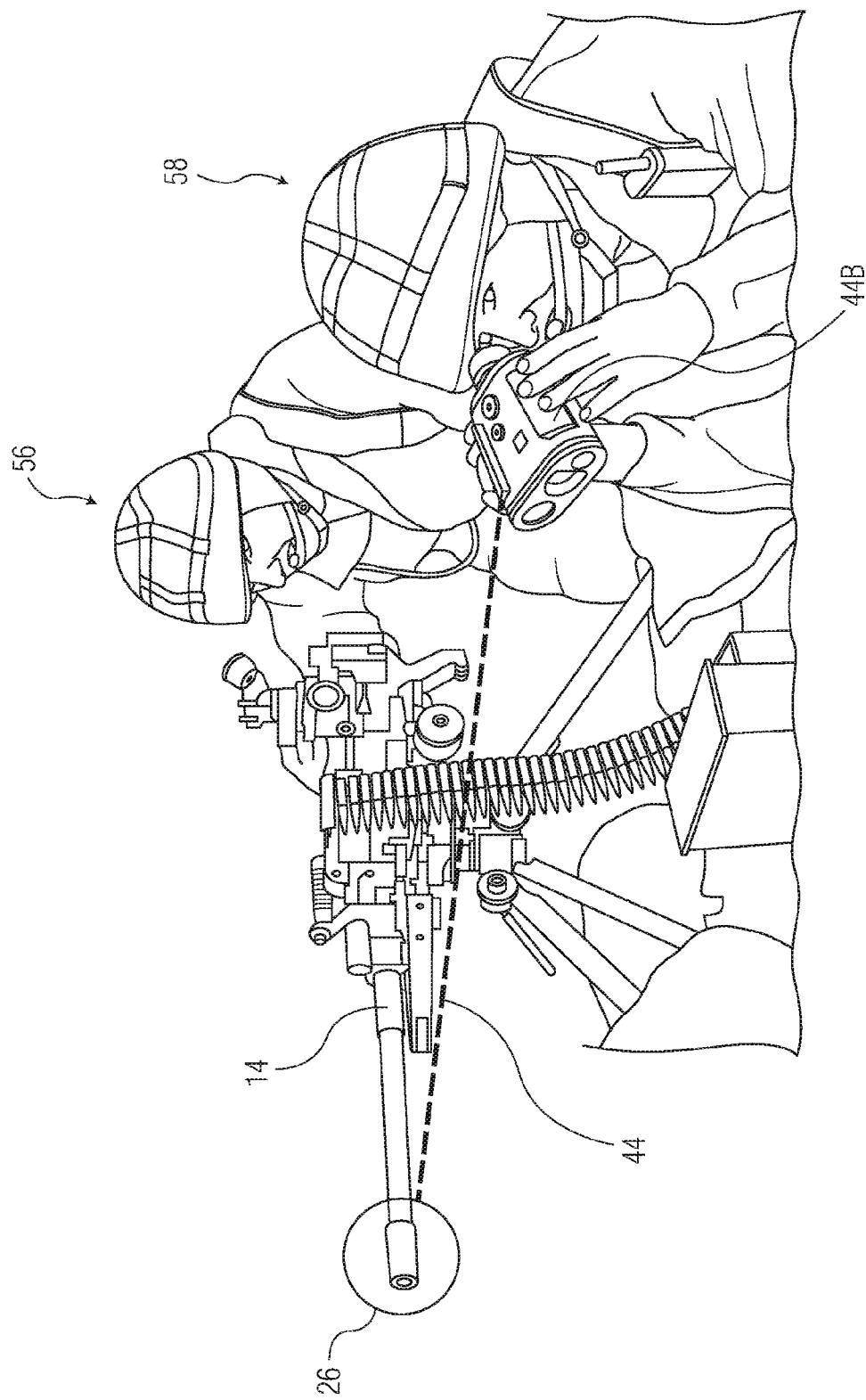
FIG. 18C illustrates the use of the system of FIG. 17 by a gunnery crew.

FIG. 18C depicts a weapon crew consisting of a gunner 56 and an assistant gunner 58 with a hand-held laser range finder 44B. In this configuration, the laser range finder transmits range-to-target information 44 via wireless or tethered galvanic contact to the ballistic calculator connected to or incorporated into a flash hider, flash suppressor or muzzle break 26.

FIG. 18D illustrates a muzzle velocity measurement 28 or 28A and transmitter (programming device) 46 where the measurement device is mounted on the flash suppressor, flash hider or muzzle break 26 and where the eXMI programmer 46C is fitted to the side of a barrel allowing for transmission of a signal to the projectile. This diagram also illustrates a key sequential step 52 where the device sequentially measures muzzle velocity 28 or 28A, a ballistic calculator 36 calculates the requisite time to target and, upon reaching a programming station 48, the ballistic calculator instructs an eXMI transmitter 46C to transmit a signal 48C to the projectile at the programming station 48.

Figure 18E:
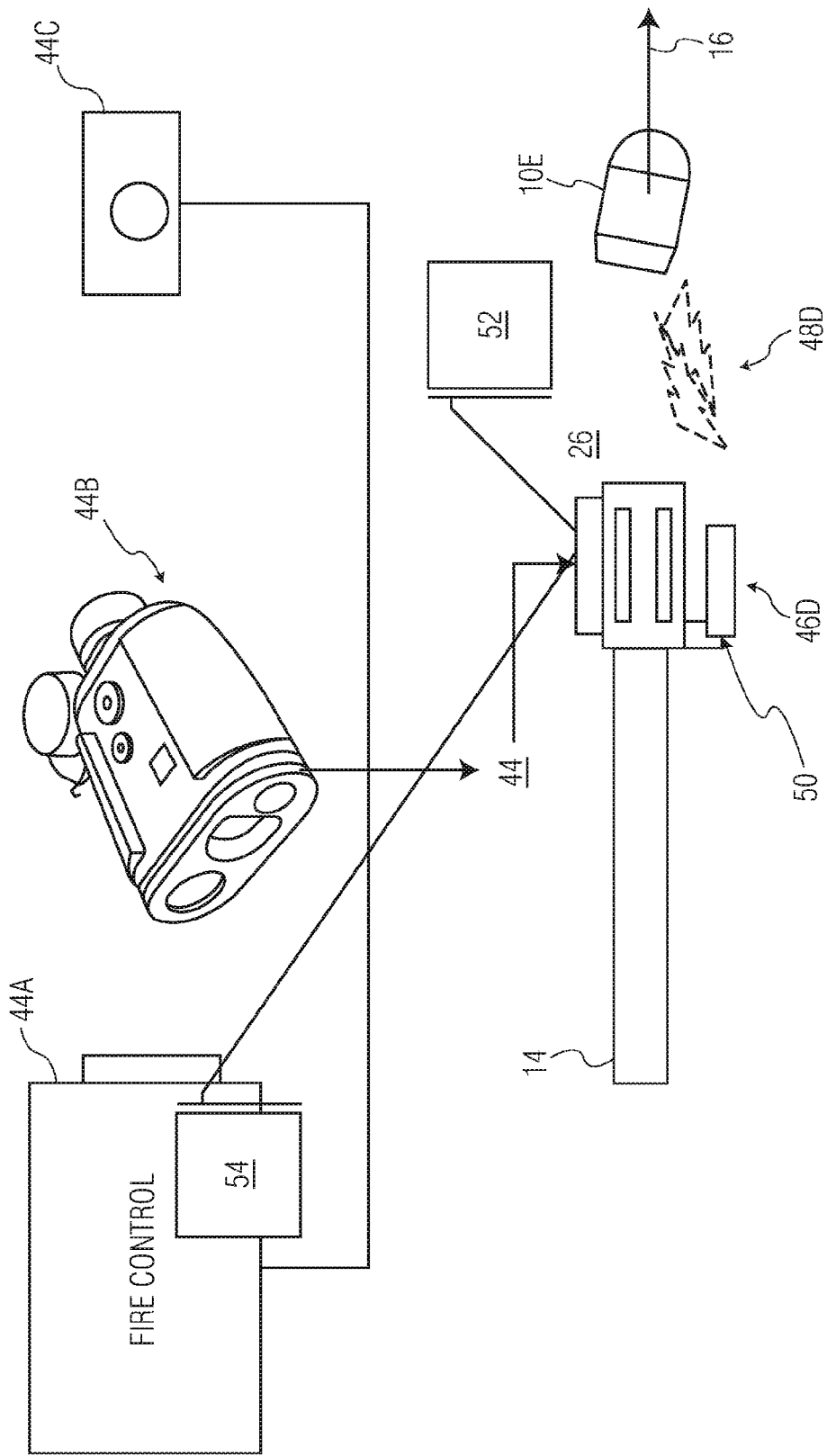
FIG. 18E depicts a kit with a Doppler radar measurement antenna and an antenna transmitting a programming signal to the projectile.

FIG. 18E illustrates a muzzle velocity measurement 28 or 28A and transmitter (programming device) 46 where the measurement device is mounted on the flash suppressor, flash hider or muzzle break 26 and where the 1-40 GHz microwave programmer 46D is fitted to the side of a barrel allowing for transmission of a signal to the projectile. This diagram also illustrates a key sequential step 52 where the device sequentially measures muzzle velocity 28 or 28A, a ballistic calculator 36 calculates the requisite time to target and, upon reaching a programming station 48, the ballistic calculator instructs 1-40 GHz microwave transmitter 46D to transmit a signal 48D to the projectile at the programming station 48.

Figure 18F:
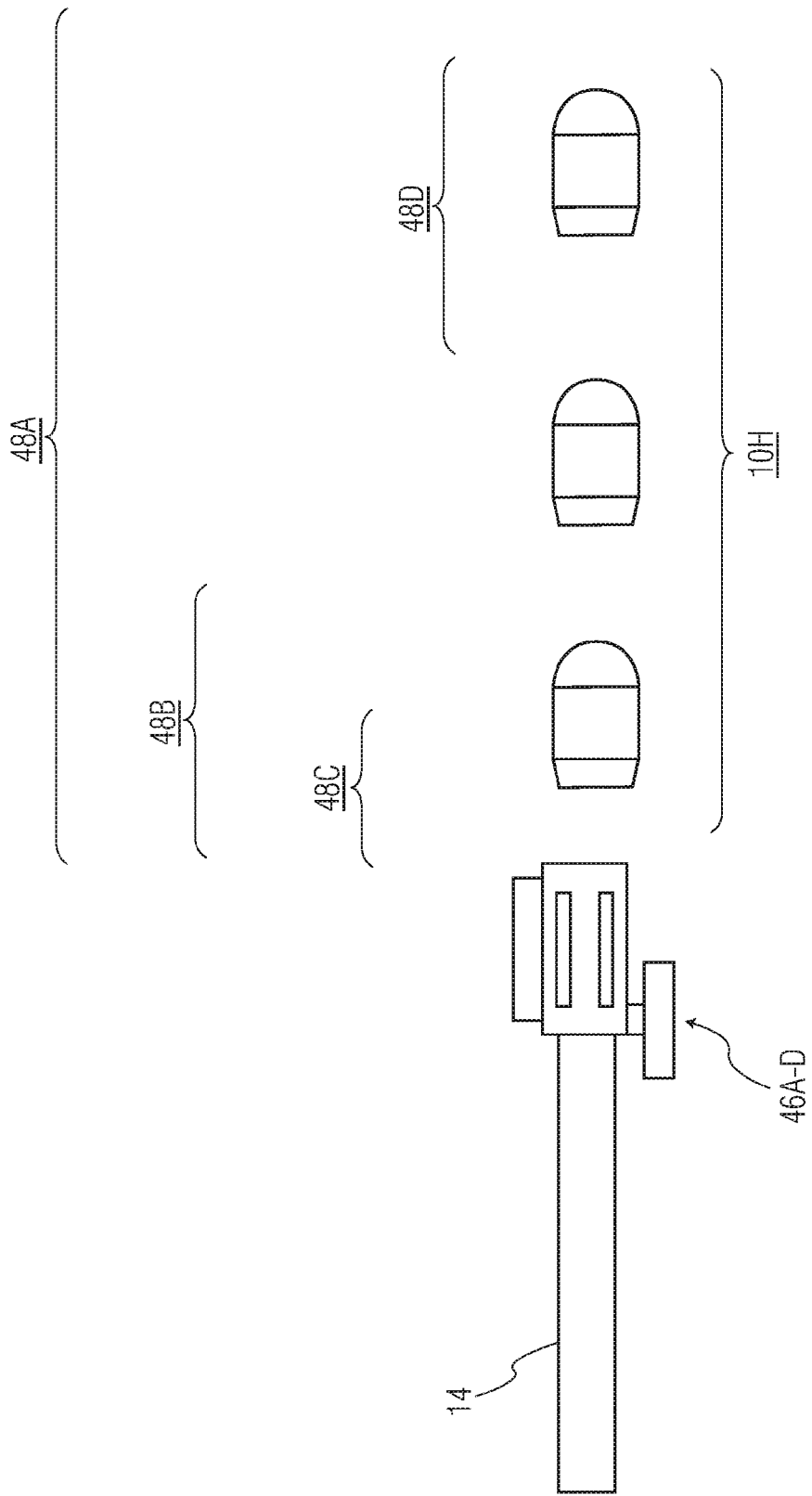
FIG. 18F depicts the various programming stations for each programming methodology.

FIG. 18F depicts the transit stations (with time delay not depicted) incorporated into the devices 46A-D where a programmable projectile 10A, 10B, 10D or 10E transits from the flash suppressor 26 on the barrel 14 to an optimized post-shot programming station 48 outside of the weapon. The optimized programming station for eXMI programming is depicted as 48C, the optimized programming station for RF is depicted as 48B, the optimized programming station for optical programming is depicted as 48A and the optimum programming position for microwave 1-40 GHz transmission is 48D. In all cases, The programming station 48 is in an area forward of the muzzle, flash hider or suppressor where the airburst projectile has an optimized reception of a programming signal. Upon flying into the programming station 48, the ballistic calculator 36 initiates transmission of either a programming signal in the direction of the programmable ammunition 10A, 10B, 10D or 10E such that the ammunition receives a programming signal with the requisite time-of-flight or distance to burst.

FIG. 18G depicts a eXMI programmer 46C fitted to an in-bore muzzle safety and measurement device as disclosed in US Patent Publication 2015/0330732 A1 is fitted with an eXMI programmer. The eXMI programmer 46C transmits a post-shot programming signal 48C to a projectile (not shown).

Figure 18H:
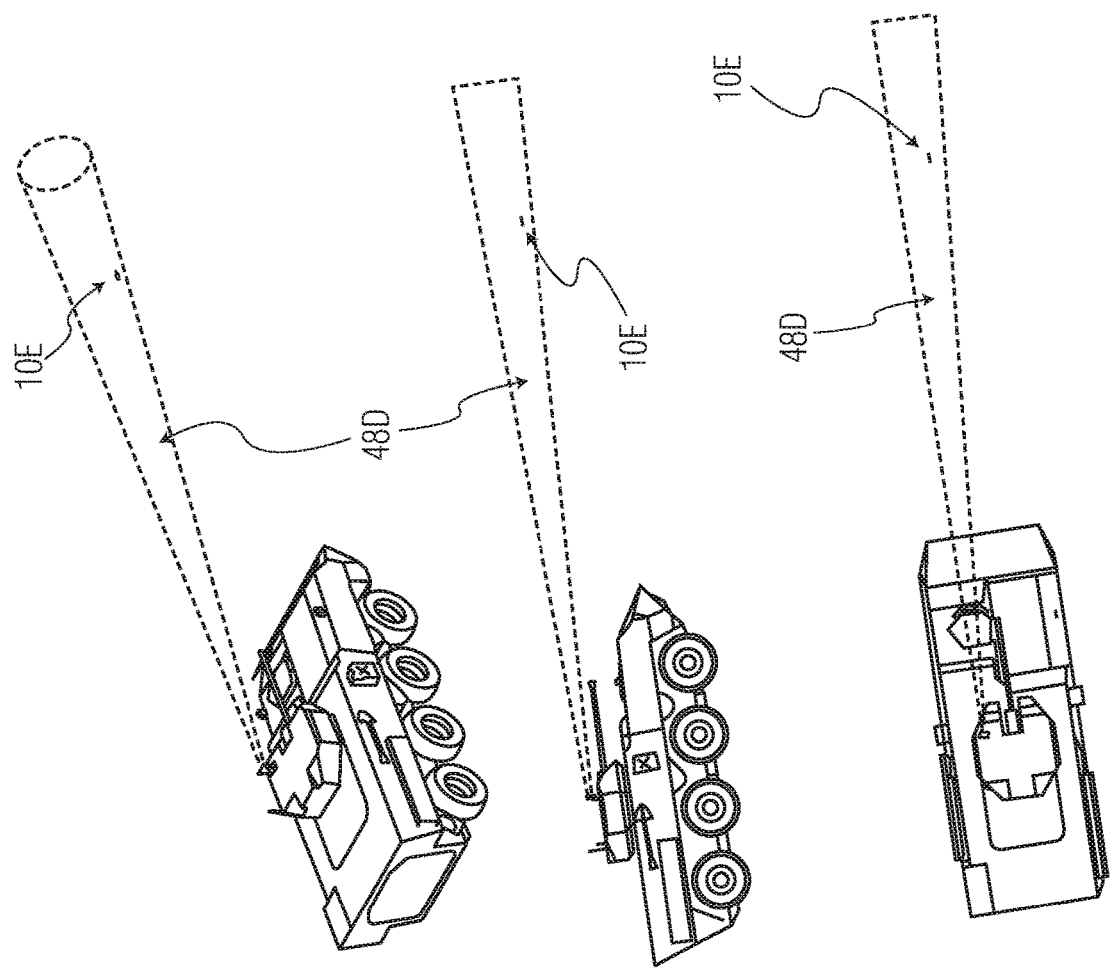
FIG. 18H shows a microwave 1-40 GHz programmer mounted on a turret and aligned with the gun where a Doppler radar first measures muzzle velocity and then transmits a programming signal to a projectile.

FIG. 18H depicts a cannon and turret fitted with Doppler radar emitting a 1-40 GHz radar emission 48D intersecting with a projectile programmable with able to receive programming signals in the 1-40 GHz band.

Figure 19:
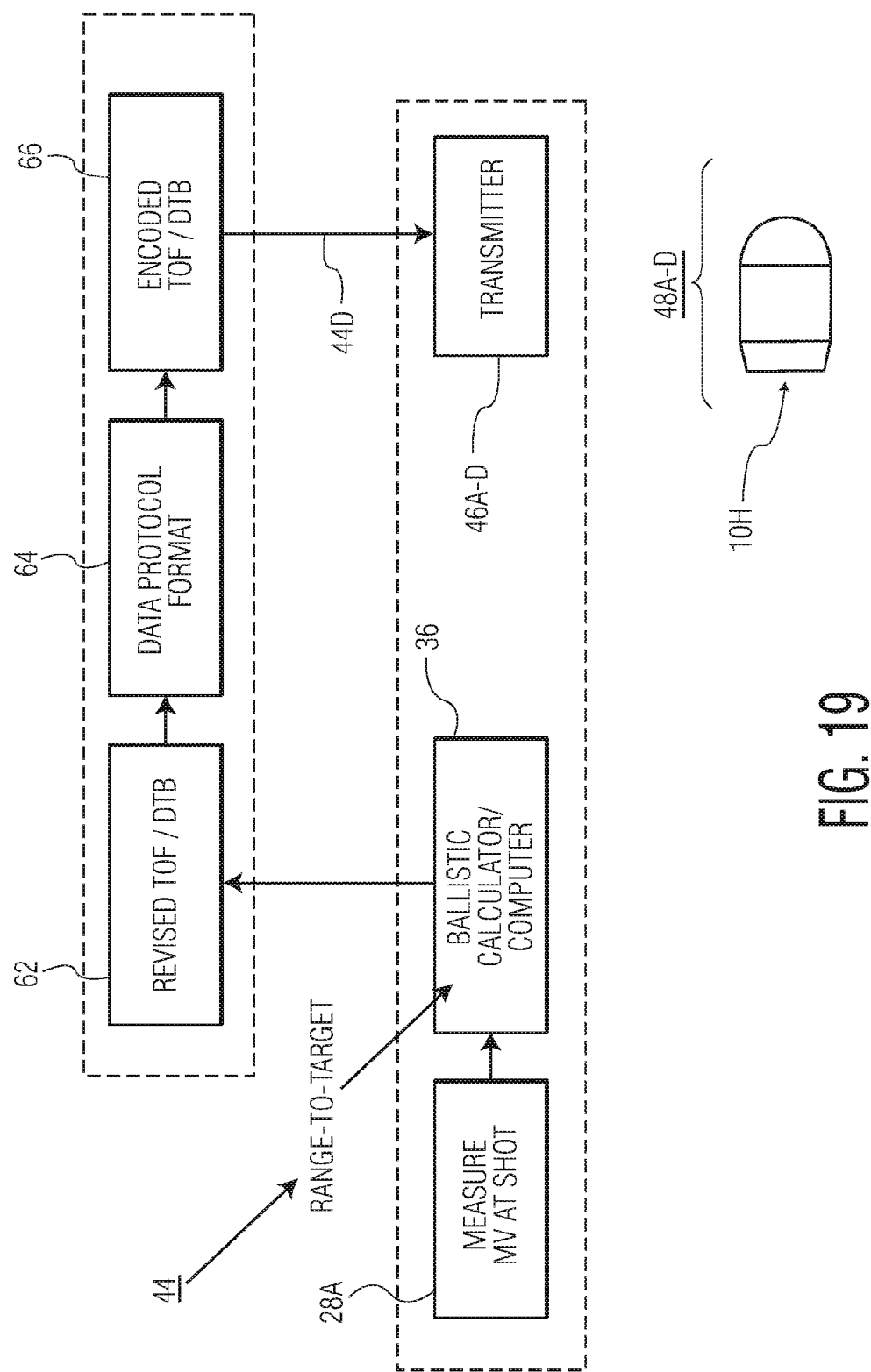
FIG. 19 is a block diagram illustrating steps and methodology used in the system of FIG. 17 and incorporated into kits of FIG. 18A-H.

FIG. 19 depicts the methodology 52 to first measure a projectile transiting a barrel, muzzle break or exiting a barrel using either an optical programming technique 28 disclosed hereinabove or a technique using a prior art device such as a Doppler radar 28A. A ballistic calculator 36, then calculates a revised TOF or DTB 62, which is then formatted into a data protocol 64 which may be further encoded 66 and converted to a wave form 44D for transmission by a transmitter 46A-D and a signal (not shown) focused towards a programming station 48A-D and transmitted to a programmable projectile 10H.

FIG. 20A illustrates a muzzle velocity measurement 28 or 28A and transmitter (programming device) 46 where the measurement device is mounted on the flash suppressor, flash hider or muzzle break 26 and where the optical programmer 46A is fitted to the side of a barrel allowing for transmission of a signal to the projectile. This diagram also illustrates a key sequential step 52 where the device sequentially measures muzzle velocity 28 or 28A, a ballistic calculator 36 calculates the requisite time to target and, upon reaching a programming station 48, the ballistic calculator instructs an optical transmitter 46B to transmit a signal 48A to the projectile at the programming station 48.

FIG. 20B illustrates a muzzle velocity measurement 28 or 28A, and transmitter 46A where the measurement device is mounted on the muzzle break and where the RF programmer 48B is fitted to the flash suppressor, flash hider or muzzle break 26. The diagram also illustrates the key sequential step 52 where the device sequentially measures muzzle velocity 28 or 28A, a ballistic calculator 36 calculates the requisite time to target and a optical transmitter 46B transmits and signal 48A to a projectile at the programming station 48.

Figure 20C:
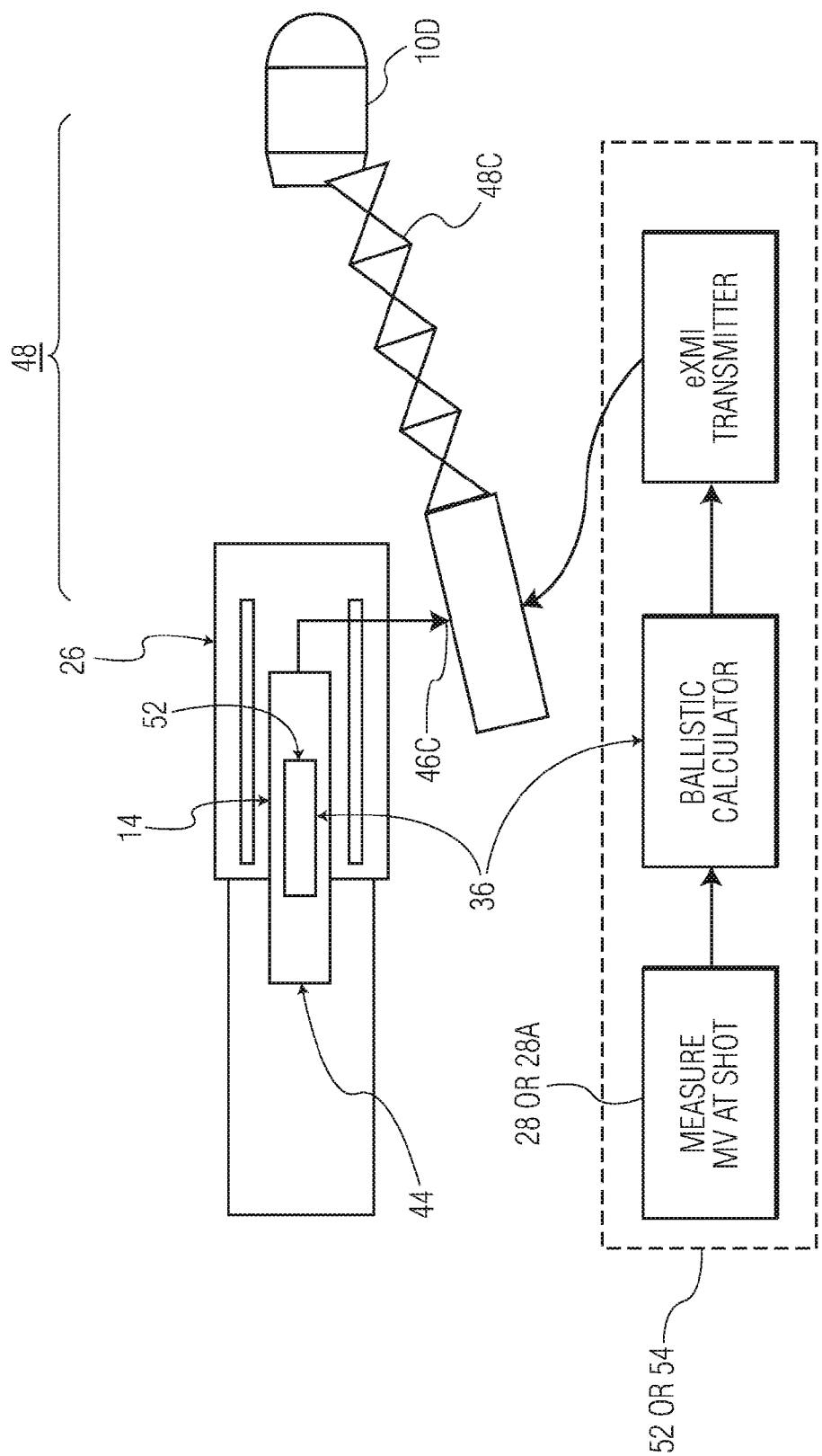
FIG. 20C depicts a methodology to measure muzzle velocity (MV) of a projectile and emit a post shot eXMI programming signal to an airburst projectile.

FIG. 20C illustrates a muzzle velocity measurement 28 or 28A, and transmitter 46A where the measurement device is mounted on the muzzle break and where the RF programmer 48B is fitted to the flash suppressor, flash hider or muzzle break 26. The diagram also illustrates the key sequential step 52 where the device sequentially measures muzzle velocity 28 or 28A, a ballistic calculator 36 calculates the requisite time to target and an eXMI transmitter 46C transmits and signal 48C to a projectile at the programming station 48.

FIG. 20D illustrates a muzzle velocity measurement 28 or 28A, and transmitter 46A where the measurement device is mounted on the muzzle break and where the microwave 1-40 GHz programmer 48E is fitted to the flash suppressor, flash hider or muzzle break 26, breach or turret (not depicted). The diagram also illustrates the key sequential step 52 where the device sequentially measures muzzle velocity 28 or 28A, a ballistic calculator 36 calculates the requisite time to target and a microwave transmitter 46D transmits and signal 48D to a projectile at the programming station 48.

Effective Airburst Non Linear Programming Algorithms:

It is useful to adjust the burst location relative to the target such that fragments are ejected from the airburst projectile to the target. It is especially useful to eject fragments in defilade above targets in protective positions. It is useful to consider FIGS. 21A-C and 28A and B to appreciate how precision adjustments of an airburst projectile's terminal burst location can optimize effectiveness in incapacitating targets. This can be especially useful when firing high apogee projectiles such as a 40 mm×53 high velocity projectile, where it is especially useful to utilize non-linear algorithms at targets at ranges past 850 meters.

Figure 21A:
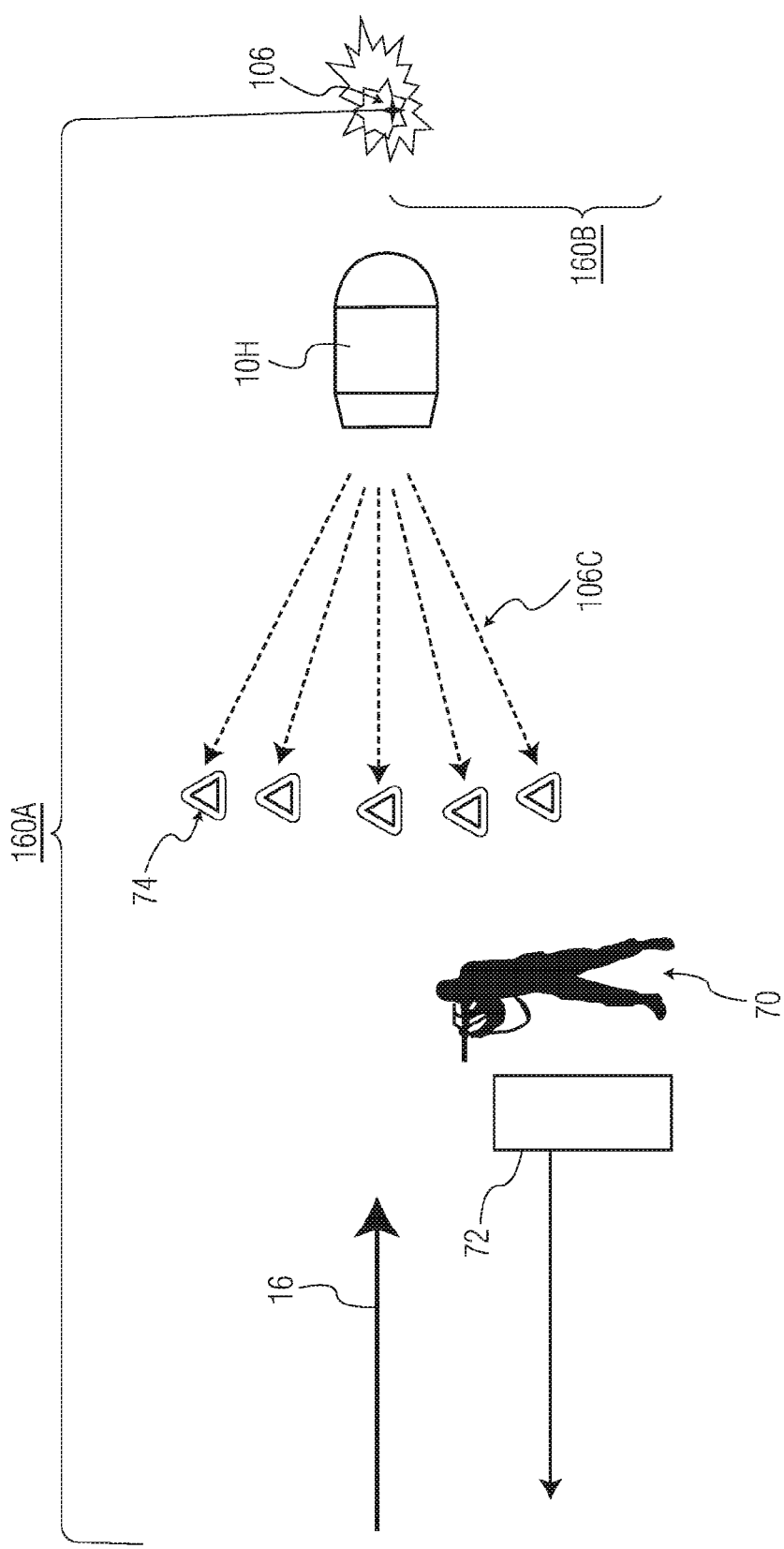
FIGS. 21A, 21B and 21C are representational diagrams showing the airburst detonation of a projectile in relation to targets.

FIG. 21A depicts a programmable projectile 10H that is fired from a ground platform where the projectile detonates after passing a target 70 and where the fragments 74 spread rearward at a high velocity to impact the target. In this case a kit's ballistic algorithm prescribes a post shot TOF to DTB 160A the results in an effective airburst 106 at a HOB 106B such that fragments are ejected 106C to a target 70.

Figure 21B:
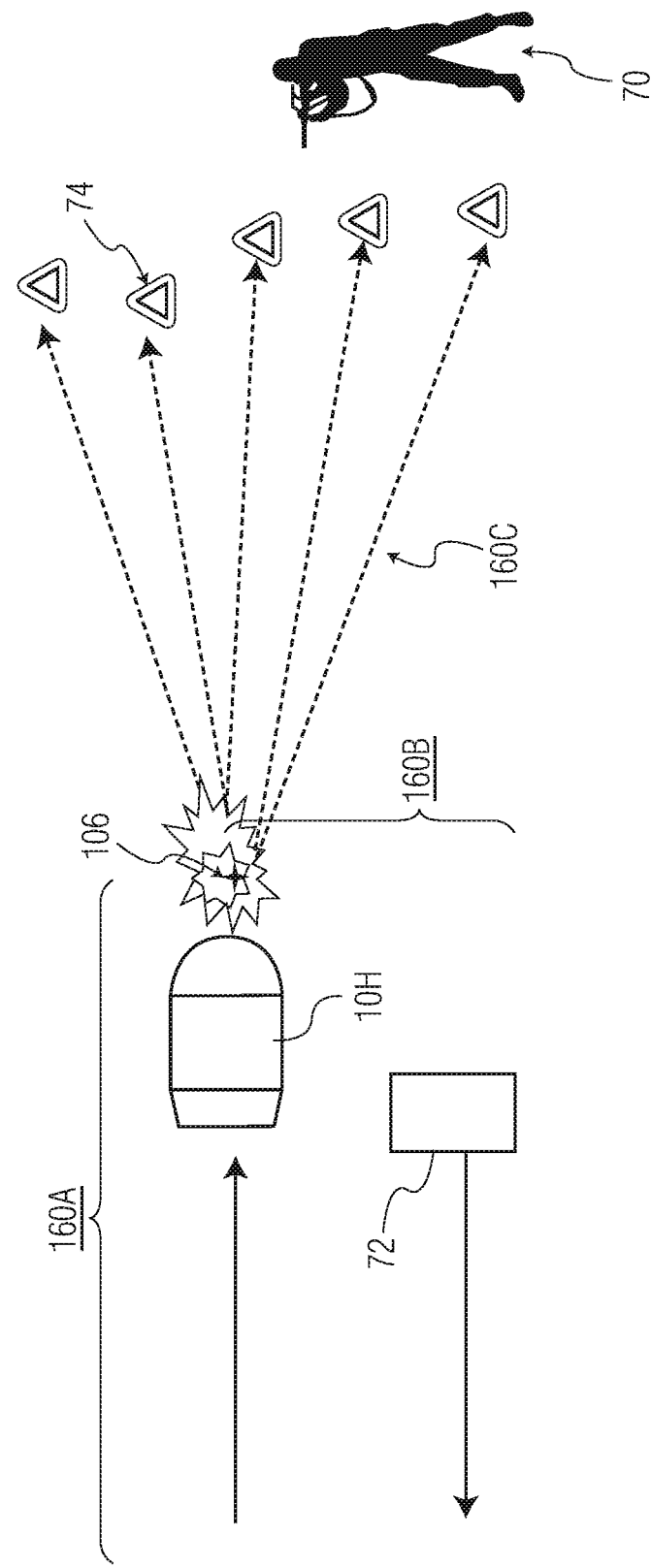

FIG. 21B depicts a programmable projectile 10H that is fired from a ground platform where the projectile detonates short of the target 70 and where the fragments 74 spread forward at a high velocity to impact the target 70. In this case a kit's ballistic algorithm prescribes a post shot TOF to DTB 160A with an effective airburst 106 at a HOB 106B such that fragments are ejected 106C to a target 70.

Figure 21C:
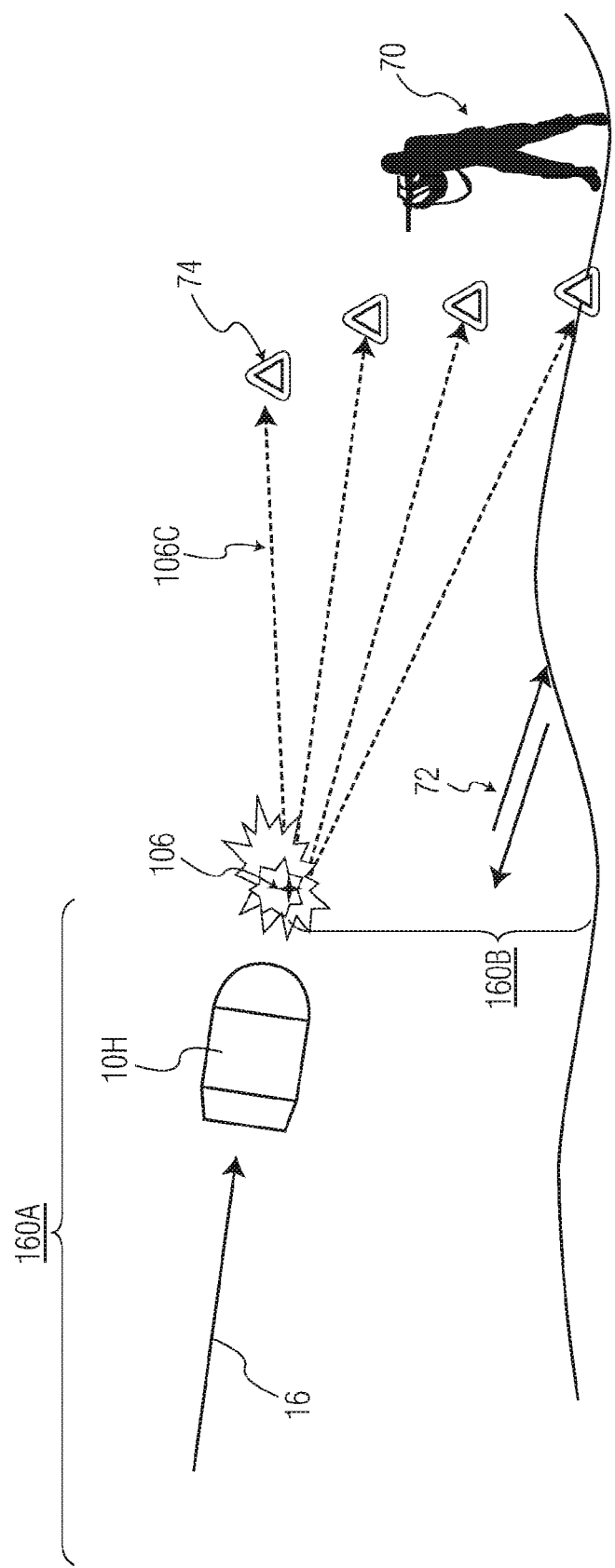

FIG. 21C depicts a programmable projectile 10H that is fired from a ground platform where the projectile detonates short of the target 70 and where the fragments 74 spread forward at a high velocity to impact the target 70. In this case a kit's ballistic algorithm prescribes a post shot TOF to DTB 160A with an effective airburst 106 at a HOB 106B such that fragments are ejected 106C to a target 70.

Figure 31A:
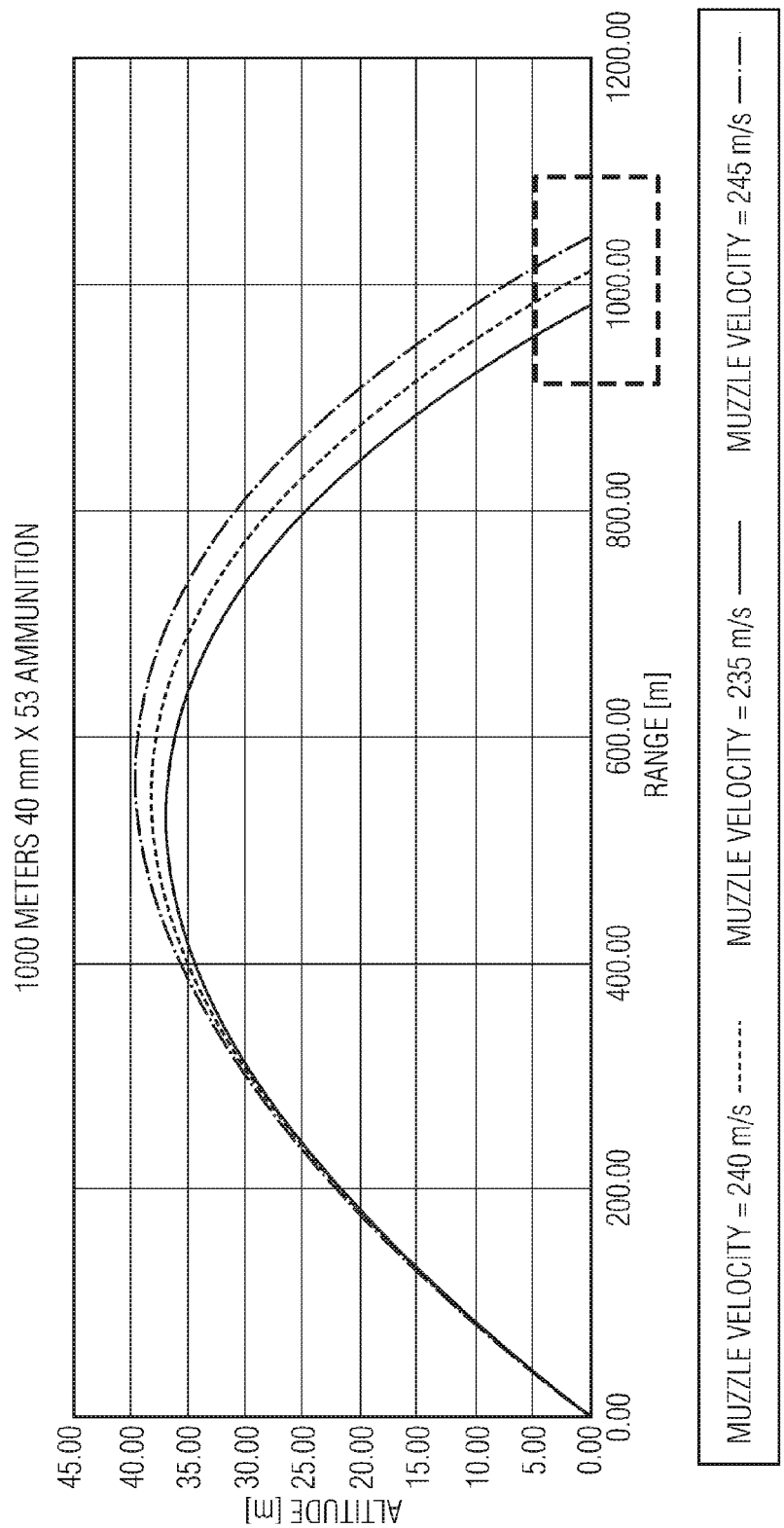
FIG. 31A depicts the Trajectory Plot (range versus altitude) for a 40 mm×53 projectile fire to 1000 meters.
Figure 31B:
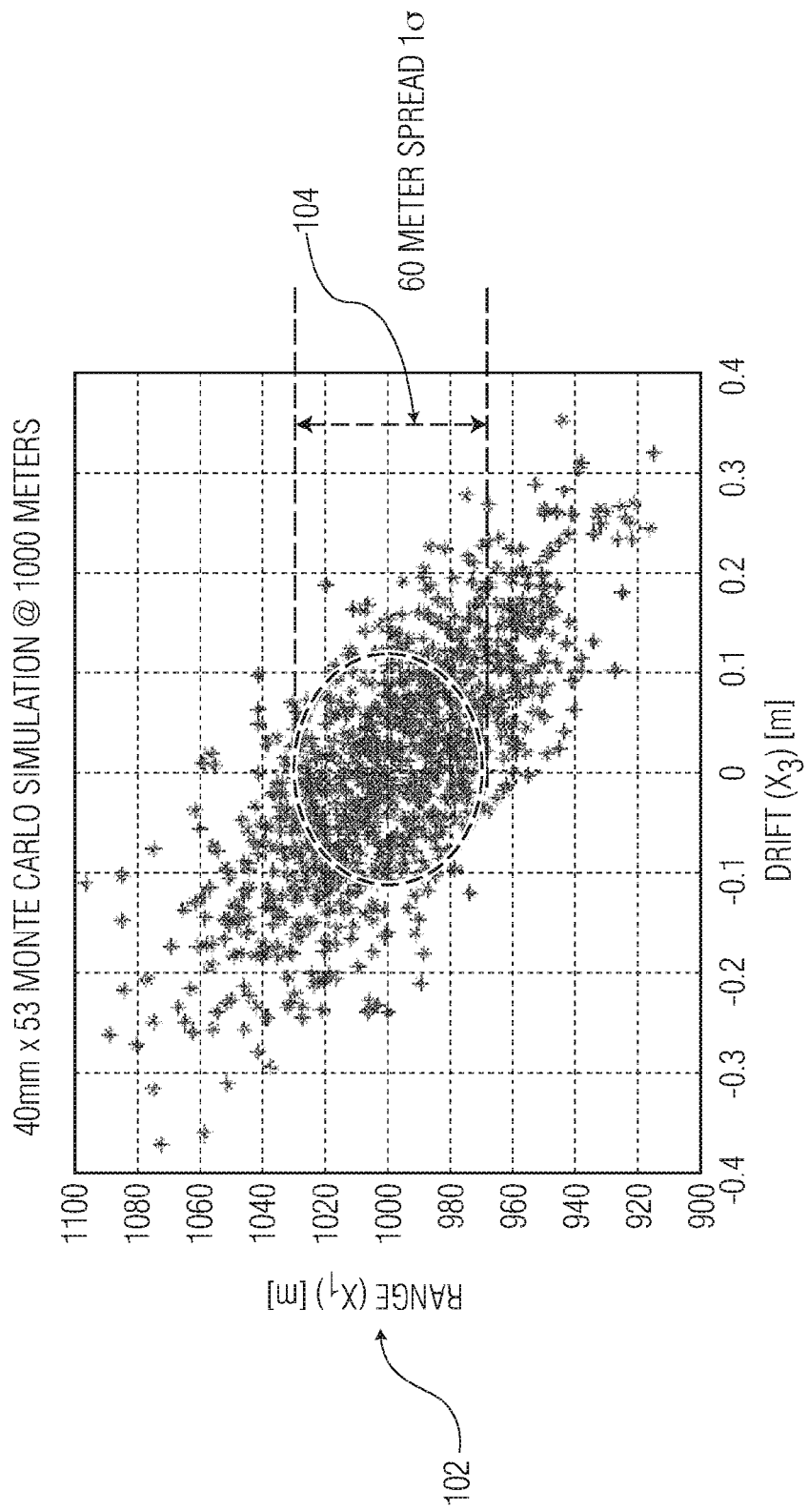
FIG. 31B depicts a Monte Carlo Simulation of the burst location of 40 mm×53 projectiles fired to 1000 meters without muzzle velocity measurement and post-shot programming.
Figure 31C:
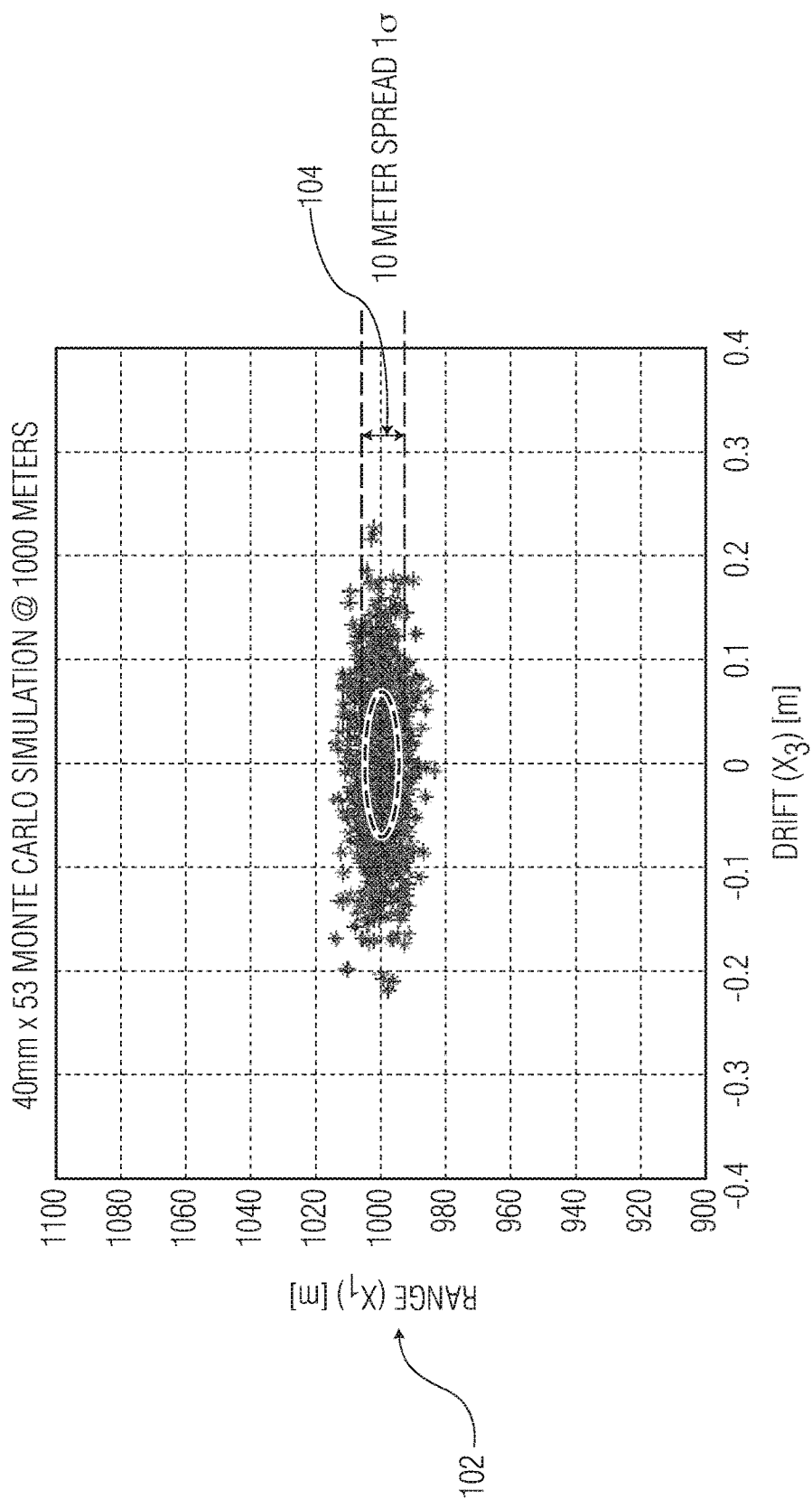
FIG. 31C depicts a Monte Carlo Simulation of the burst location of 40 mm×53 projectiles fired to 1000 meters with muzzle velocity measurement and post-shot programming.
Figure 31D:
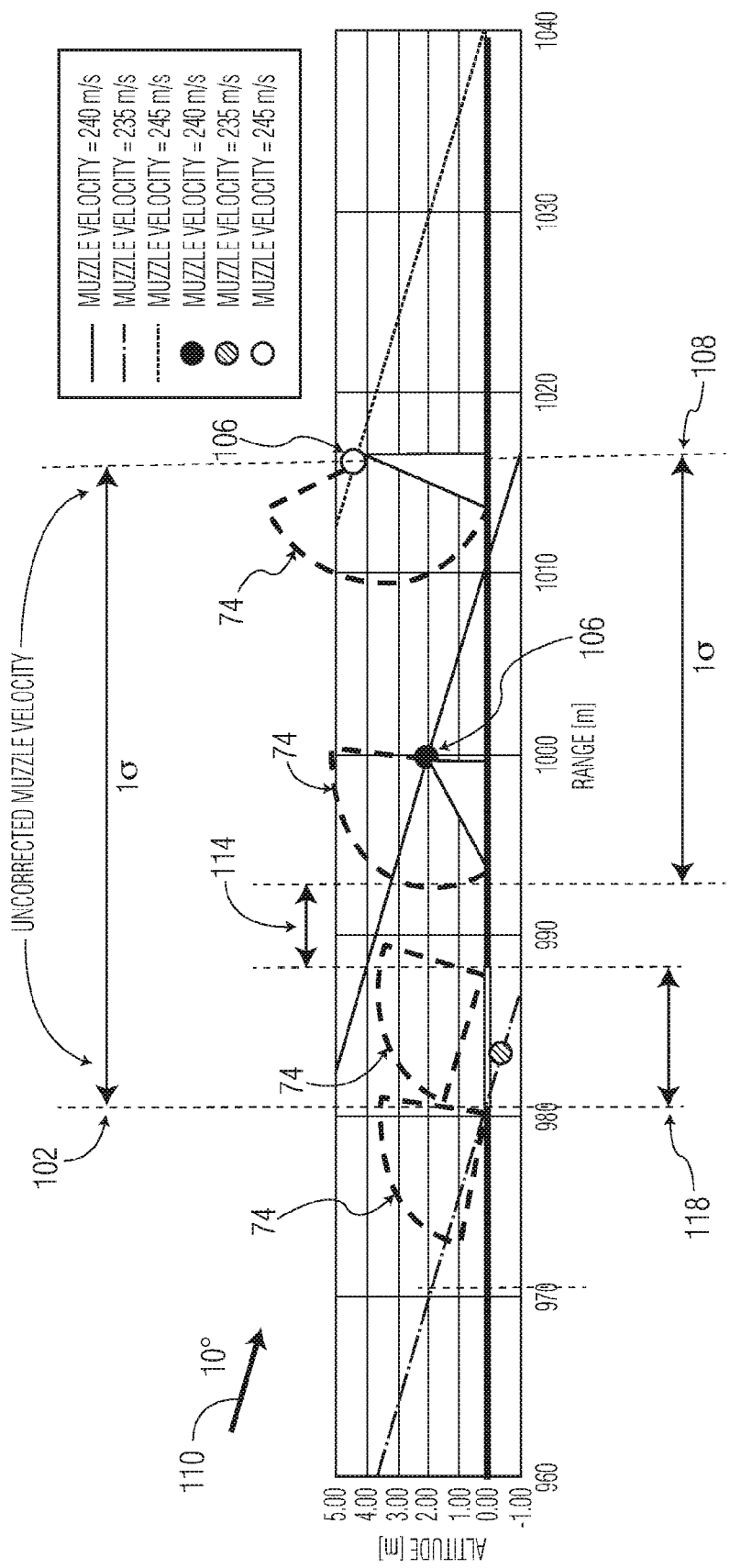
FIG. 31D depicts the trajectory and defilade Fragment Plot of a 40 mm×53 projectile fired to 1000 meters with an uncorrected TOF or DTB.
Figure 33A:
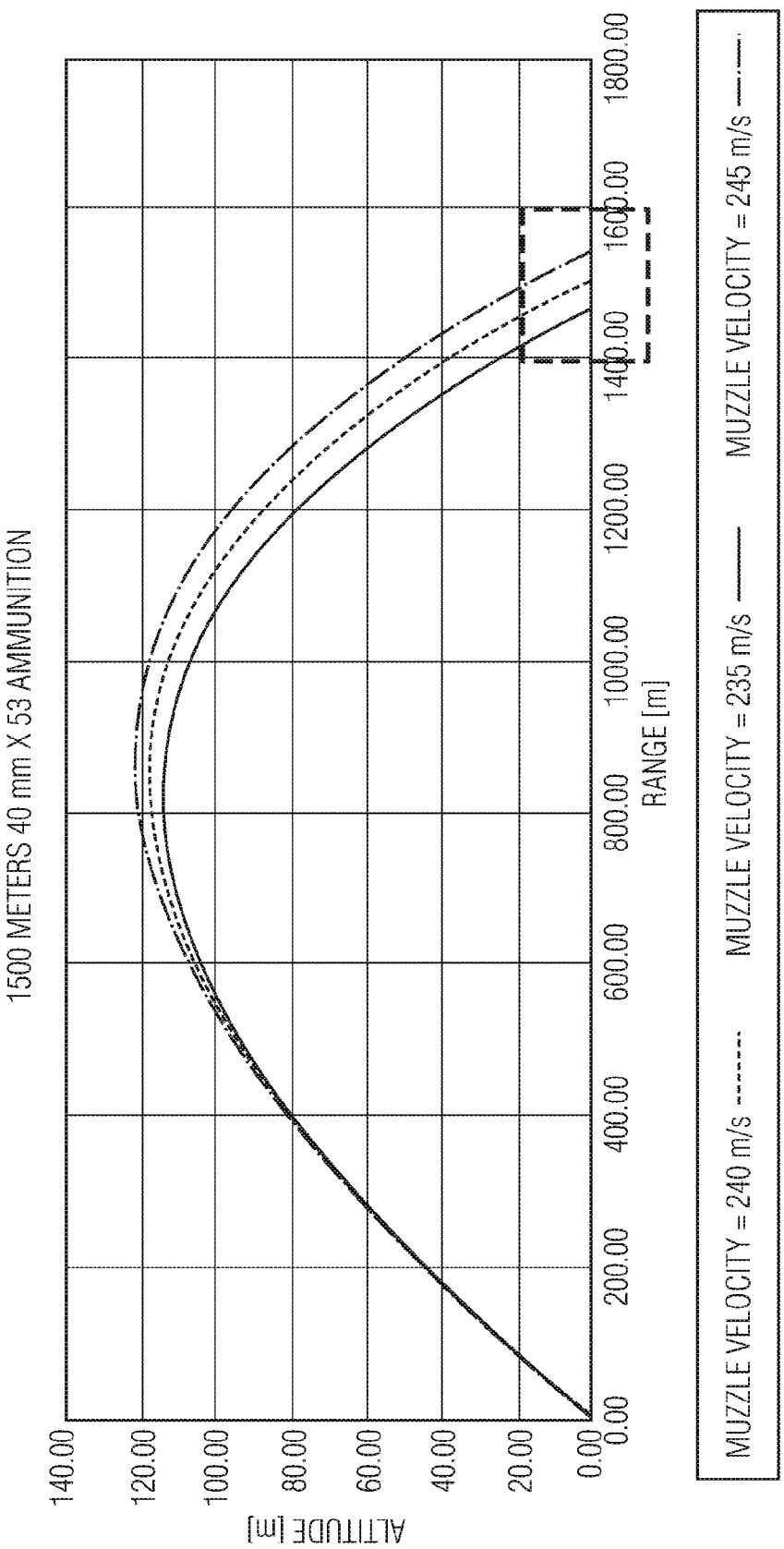
FIG. 33A depicts the Trajectory Plot (Range versus Altitude) for a 40 mm×53 projectile fire to 1500 meters.
Figure 33B:
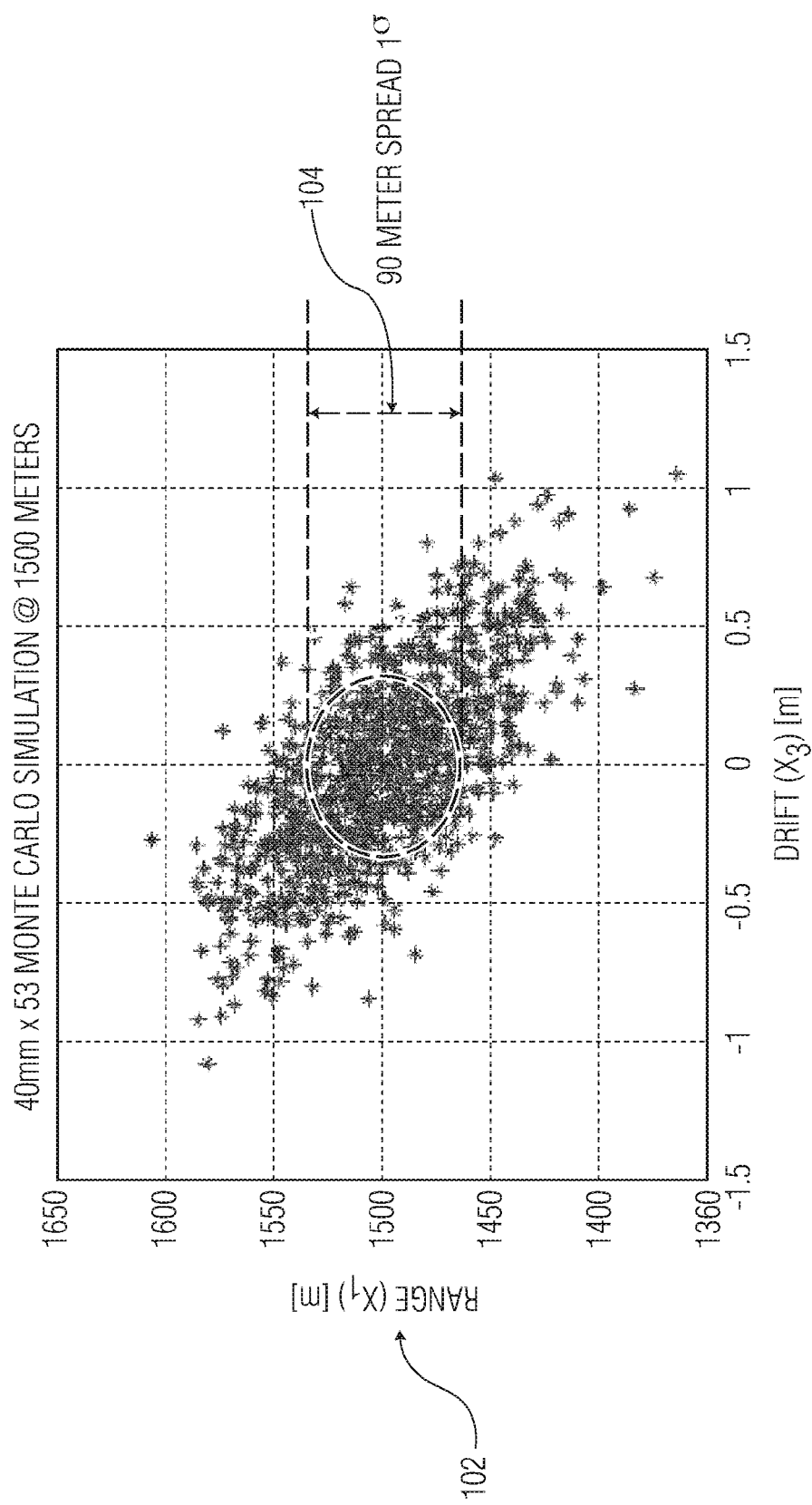
FIG. 33B depicts a Monte Carlo Simulation of the burst location of 40 mm×53 projectiles fired to 1500 meters without muzzle velocity measurement and post-shot programming.
Figure 33C:
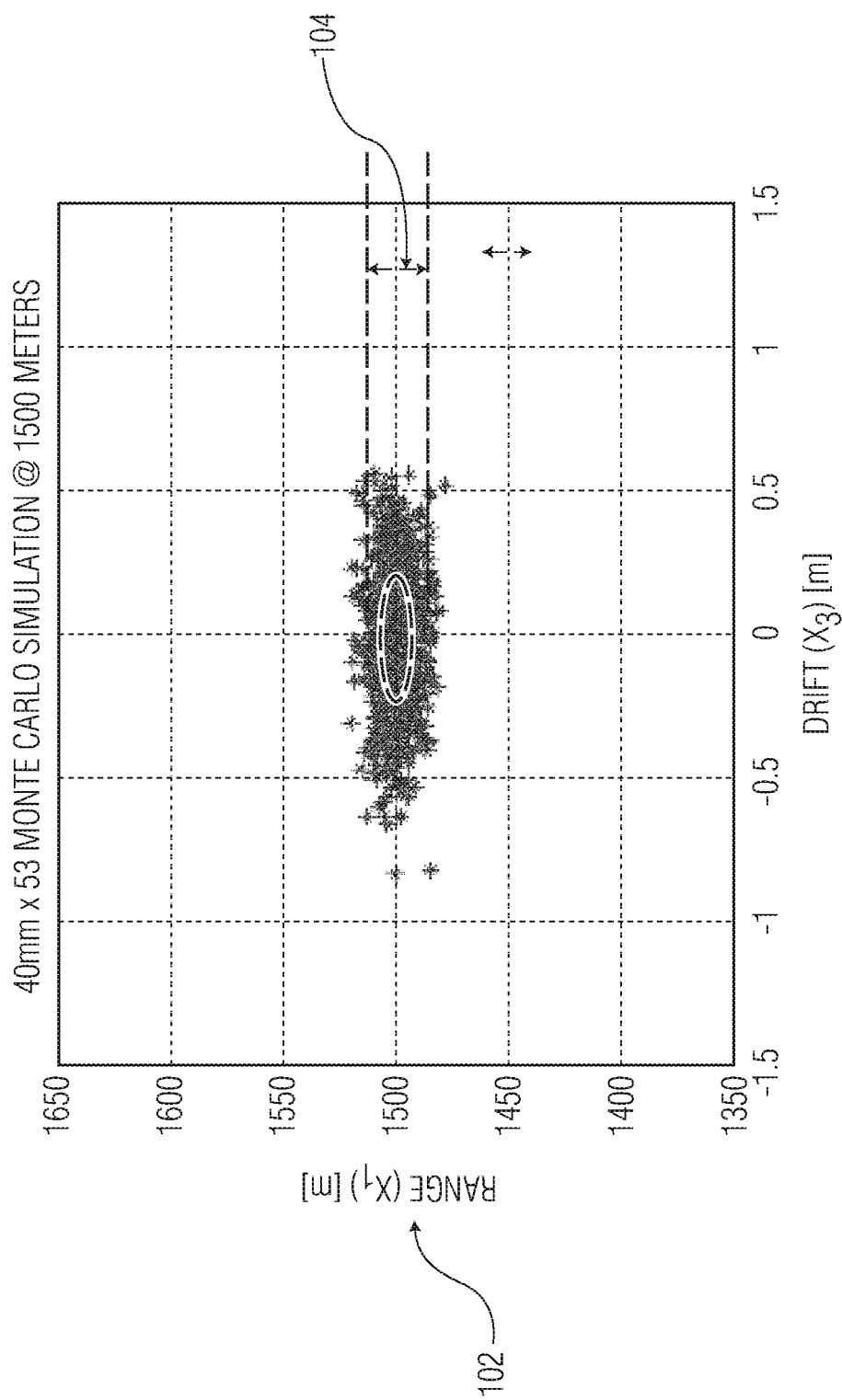
FIG. 33C depicts a Monte Carlo Simulation of the burst location of 40 mm×53 projectiles fired to 1500 meters with muzzle velocity measurement and post shot programming.
Figure 33D:
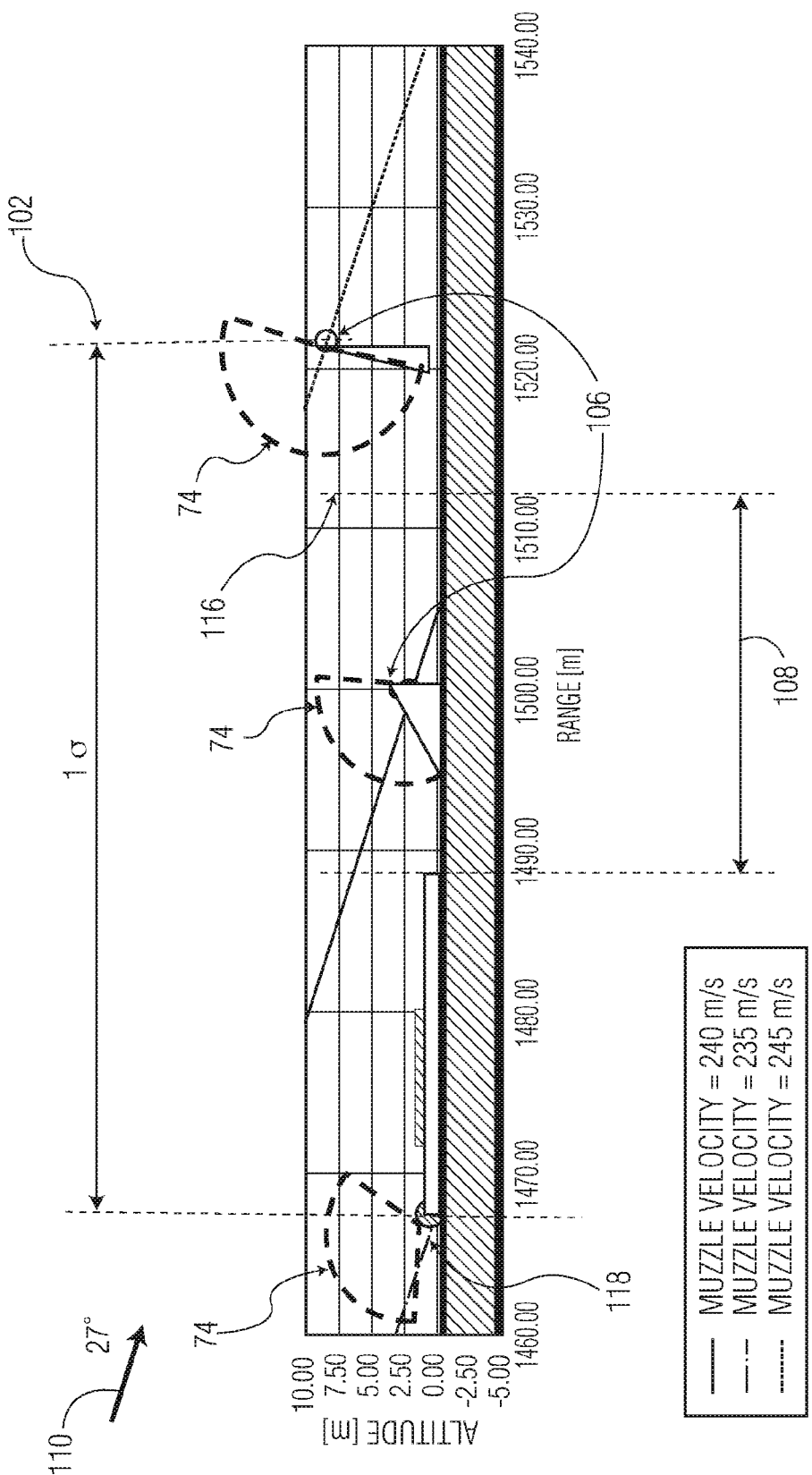
FIG. 33D depicts the trajectory and defilade Fragment Plot of a 40 mm×53 projectile fired to 1500 meters with an uncorrected TOF or DTB.

For weapons firing high apogee projectiles like the 40 mm×53 projectile reference to FIGS. 31D and 33D illustrate how a linear adjustment in TOF or DTB does not optimize performance as a large percentage of 40 mm×53 projectiles fired at ranges past 850 meter either impact short of the target with a sub-optimal ground burst 118 or, at longer range, an increasing percentage of 40 mm×53 volleys burst above targets 116 without effect. Accordingly, ballistic calculators should incorporate algorithms to further adjust the programmed TOF or DTB such that the projectile 10H detonates with an effect that ejects fragments 74 towards a target 70. In case of a 40 mm projectile with a nose fuze, it is useful to program a projectile 10H to burst above or past a target 70 as depicted in FIG. 21 A. In case of certain 30 mm projectiles 10H it is useful to initiate detonation short of the target allowing the resulting fragments to spread downward and forward from the bust point as depicted in FIG. 21 B.

Muzzle Velocity Measurement and Regulation Kit:

The system utilizes a methodology to (1) measure a projectile in transit within the barrel or transiting a muzzle break, (2) where an external source allows for selection of a type of ammunition with a corresponding magnetic profile, and (3) where a calculator identifies and controls a force profile that is applied to a projectile to slow the projectile, such that (4) the projectile exits a muzzle at a repeatable, consistent muzzle velocity.

The device may harvest energy from the slowing projectiles to charge a capacitor and thus recycle electrical power in the device.

FIG. 22 depicts a normal distribution 82 of muzzle velocities that corresponded to a projectile's normally identified muzzle velocity variation normally expressed in feet per second.

FIG. 23 depicts a ferrous projectile 10C traversing in a barrel a flash suppressor, muzzle break, flash hider where the muzzle velocity is measured at 28 or 28A and the muzzle velocity measurement is transmitted to a ballistic calculator.

Figure 24:
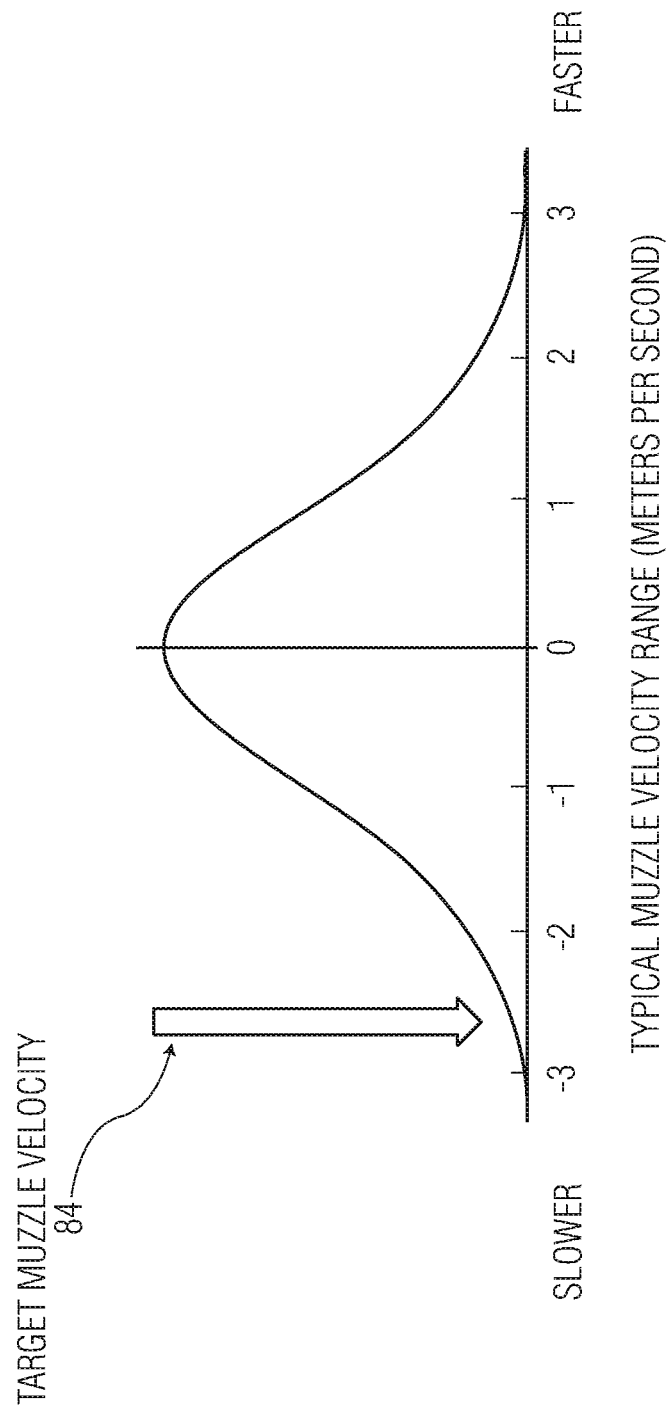
FIG. 24 is a graph showing a typical distribution of muzzle velocities for projectiles upon reaching a target.

FIG. 24 depicts a target muzzle velocity set to slow or to accelerate projectiles so as to leave the muzzle at a precise velocity. This illustration depicts a system designer's selection of a target velocity 84 at the lower end of the normal distribution where the device will slow all exiting projectiles so that the projectiles have a consistent velocity.

Figure 25:
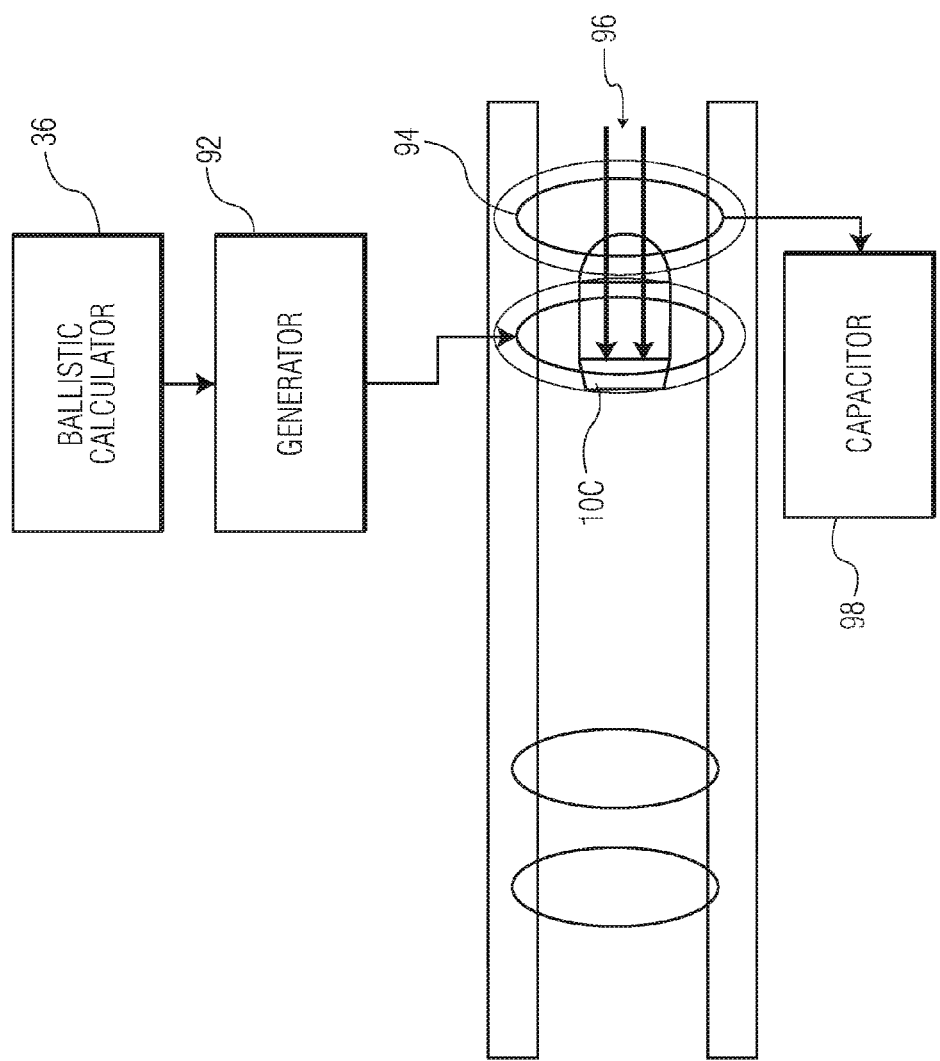
FIG. 25 is a representational diagram showing the use of magnetic coils to retard the speed of a projectile.

FIG. 25 depicts a ballistic calculator 36 that controls a generator 92 which applies a force 96 to a ferrous projectile 10C.

Figure 26:
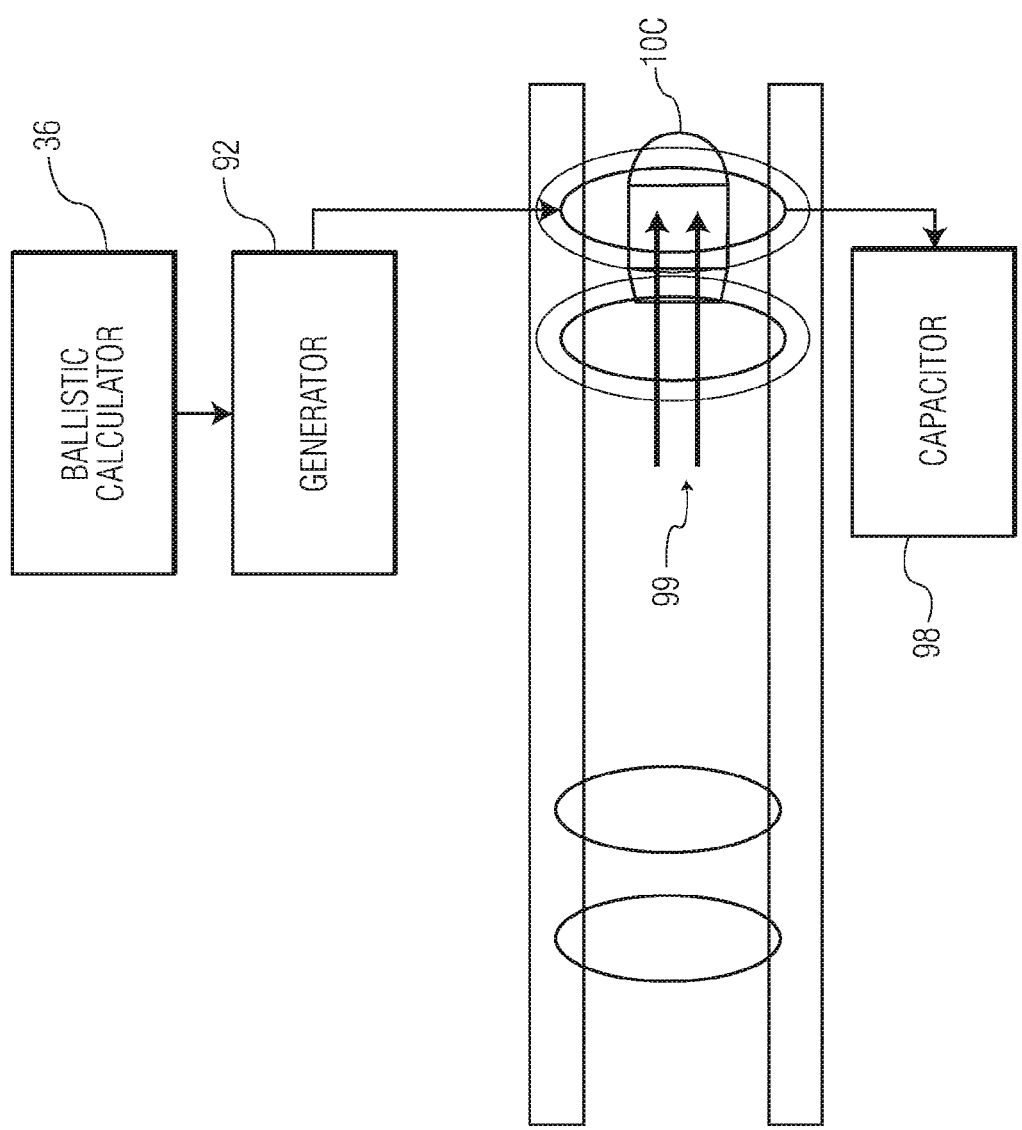
FIG. 26 is a representational diagram showing the use of magnetic coils to convert mechanical energy from a speeding projectile into electrical energy for capacitive storage.

FIG. 26 depicts the coils reducing the exit velocity of a ferrous projectile 10C, where the slowing projectile generates magnetic force 99 and an electrical current that is stored in a capacitor 98 to recycle the energy for electronic devices associated with the weapon.

Figure 27:
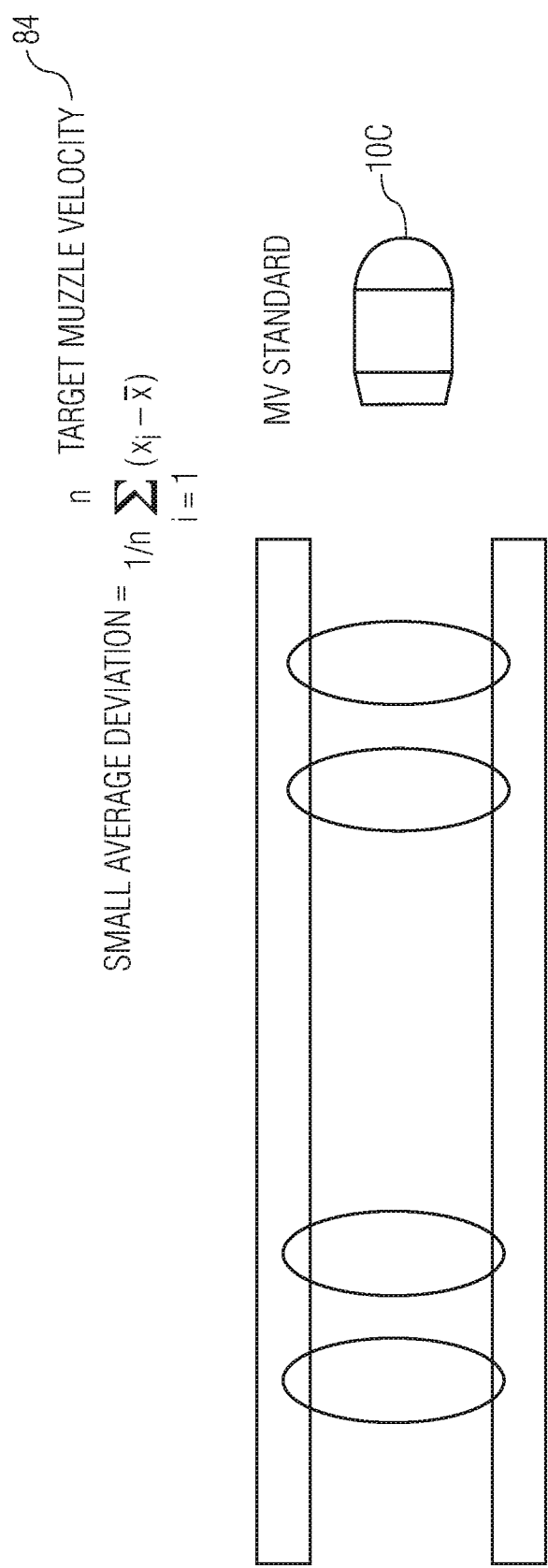
FIG. 27 is a representational diagram showing the use of magnetic coils to minimize the shot-to-shot variation of muzzle velocity.
Figure 28B:
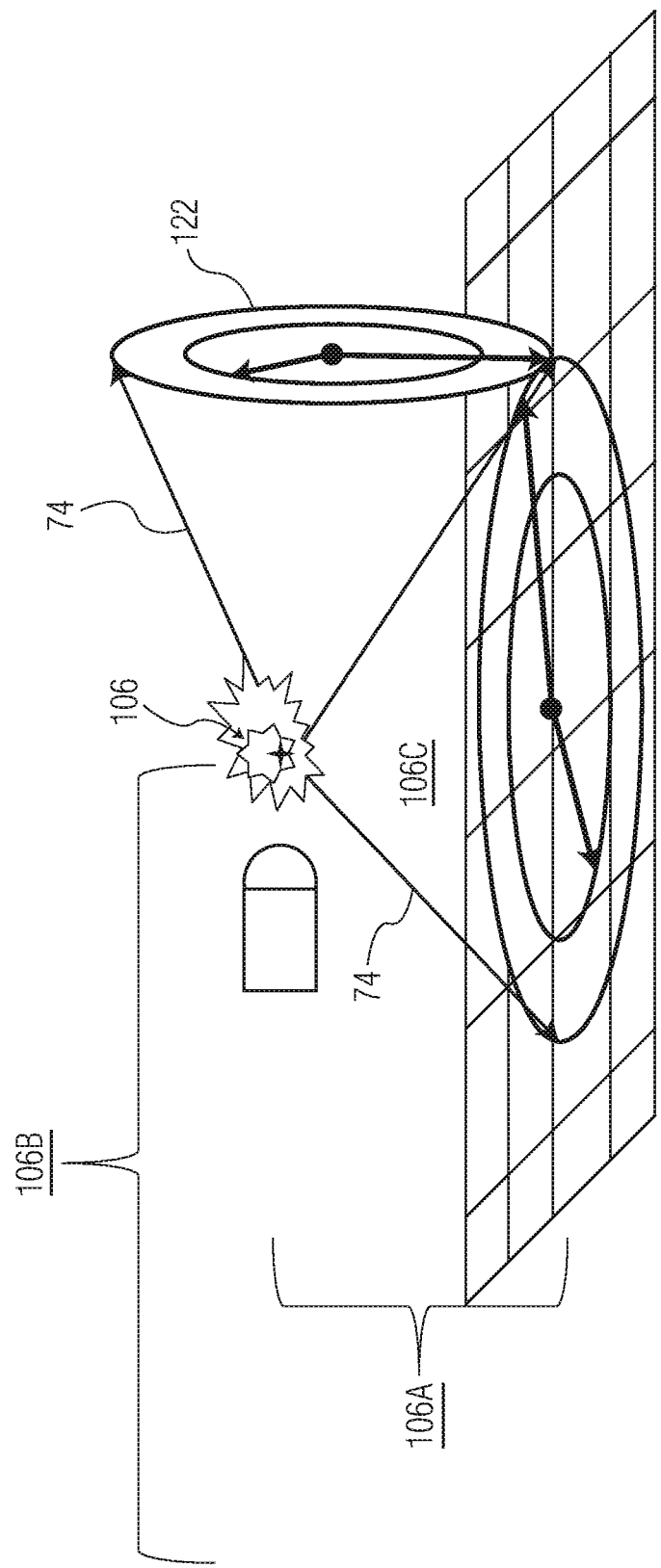
Figure 29A:
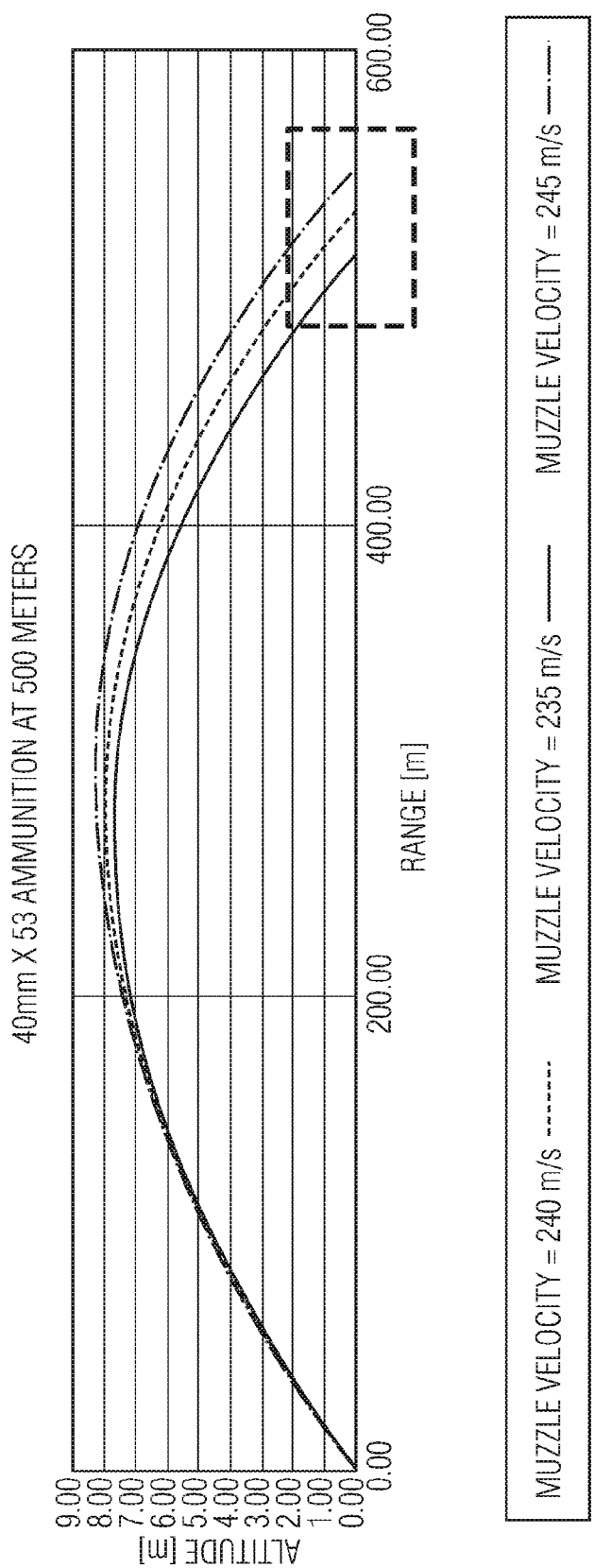
FIG. 29A depicts the Trajectory Plot (range versus altitude) for a 40 mm×53 projectile fire to 500 meters.
Figure 29B:
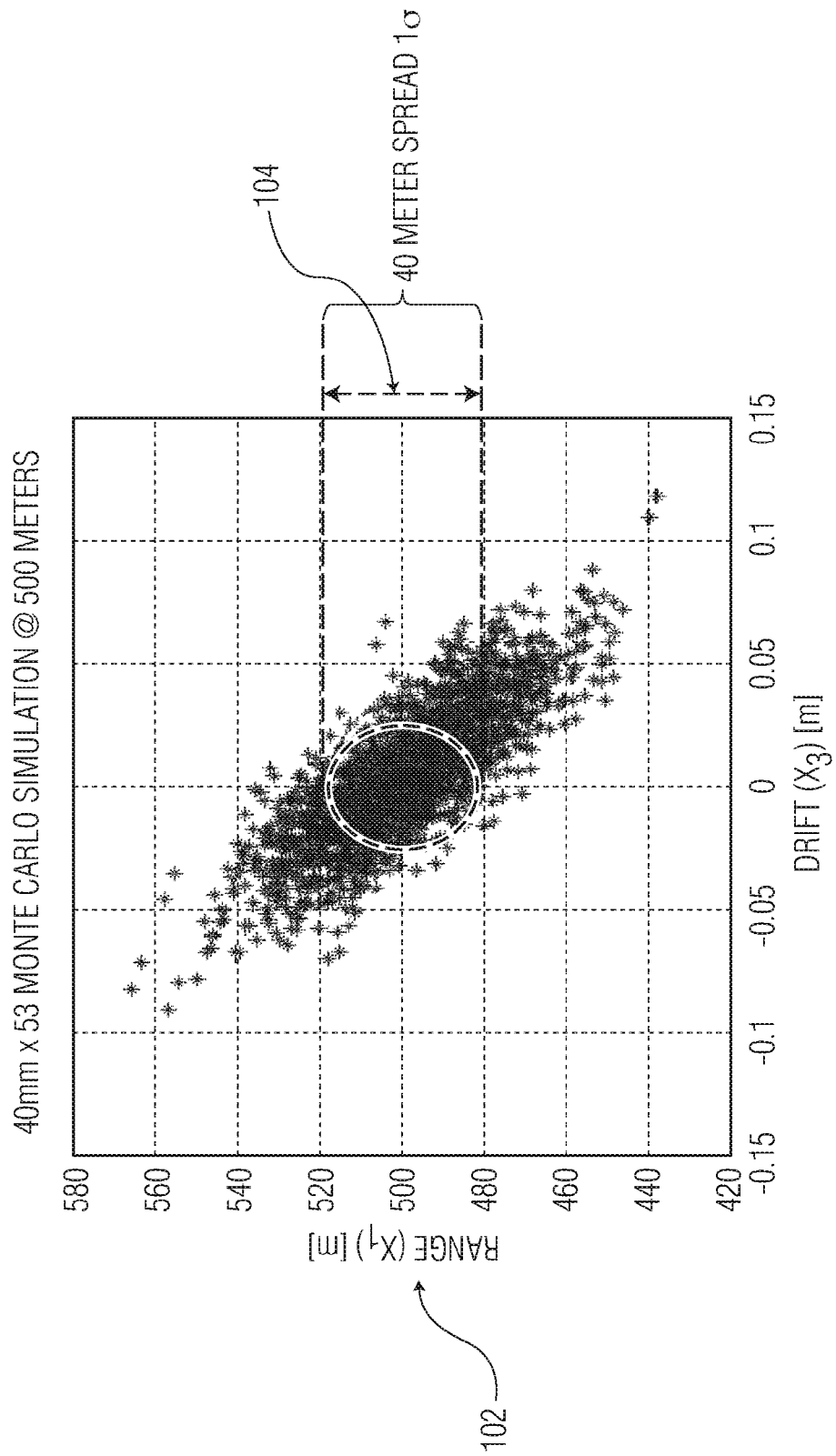
FIG. 29B depicts a Monte Carlo Simulation of the burst location of 40 mm×53 projectiles fired to 500 meters without muzzle velocity measurement and post shot programming.
Figure 29D:
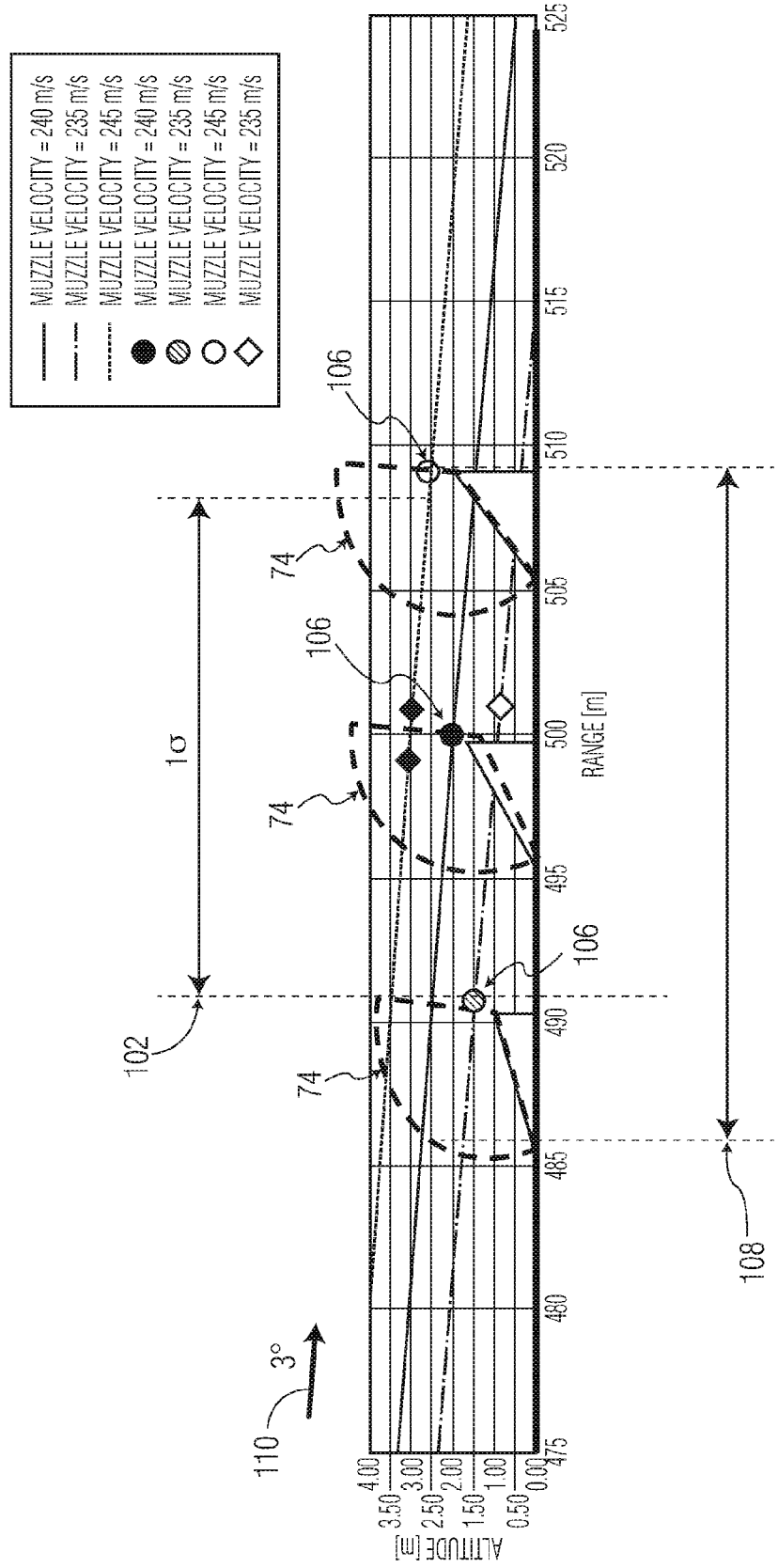
FIG. 29D depicts the trajectory and defilade Fragment Plot of a 40 mm×53 projectile fired to 500 meters with an uncorrected TOF or DTB.
Figure 29E:
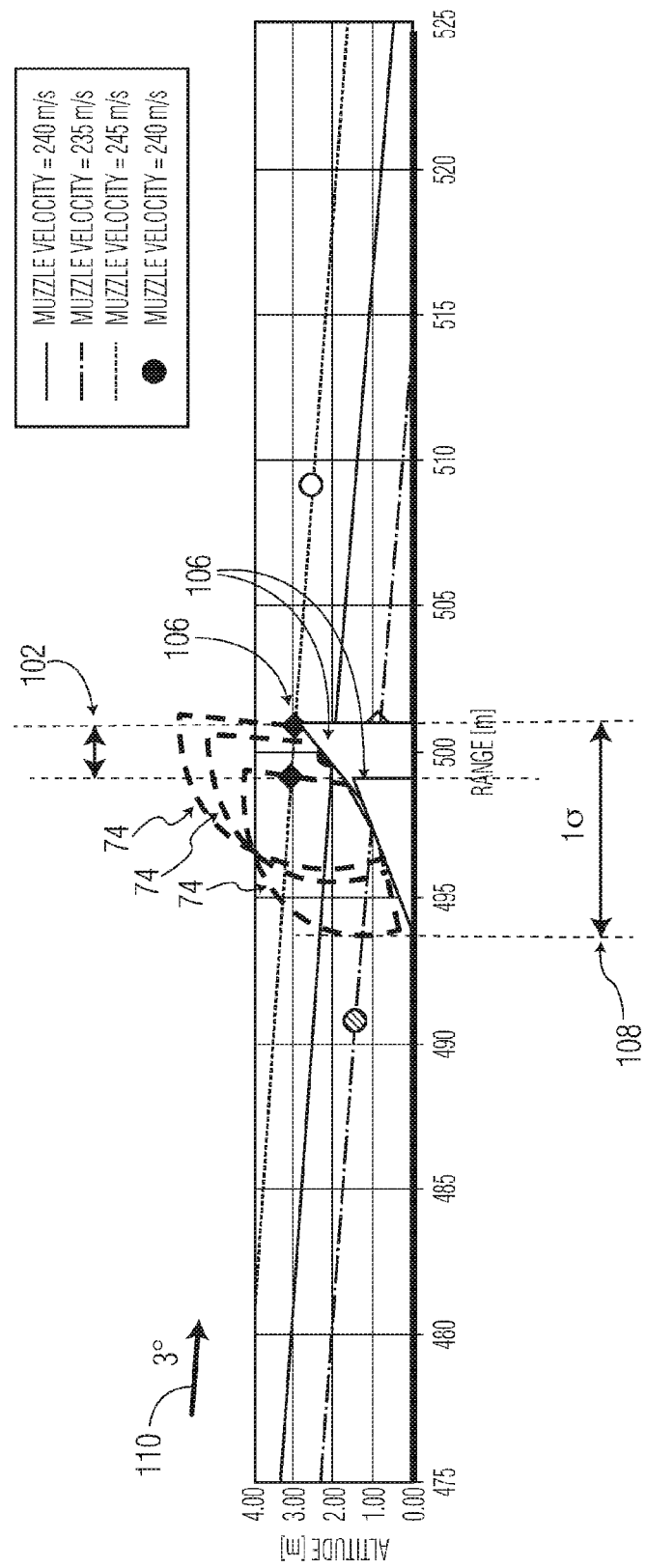
FIG. 29E depicts the trajectory and Defilade Fragment Plot of a 40 mm×53 projectile fired to 500 meters with an uncorrected TOF or DTB.
Figure 30A:
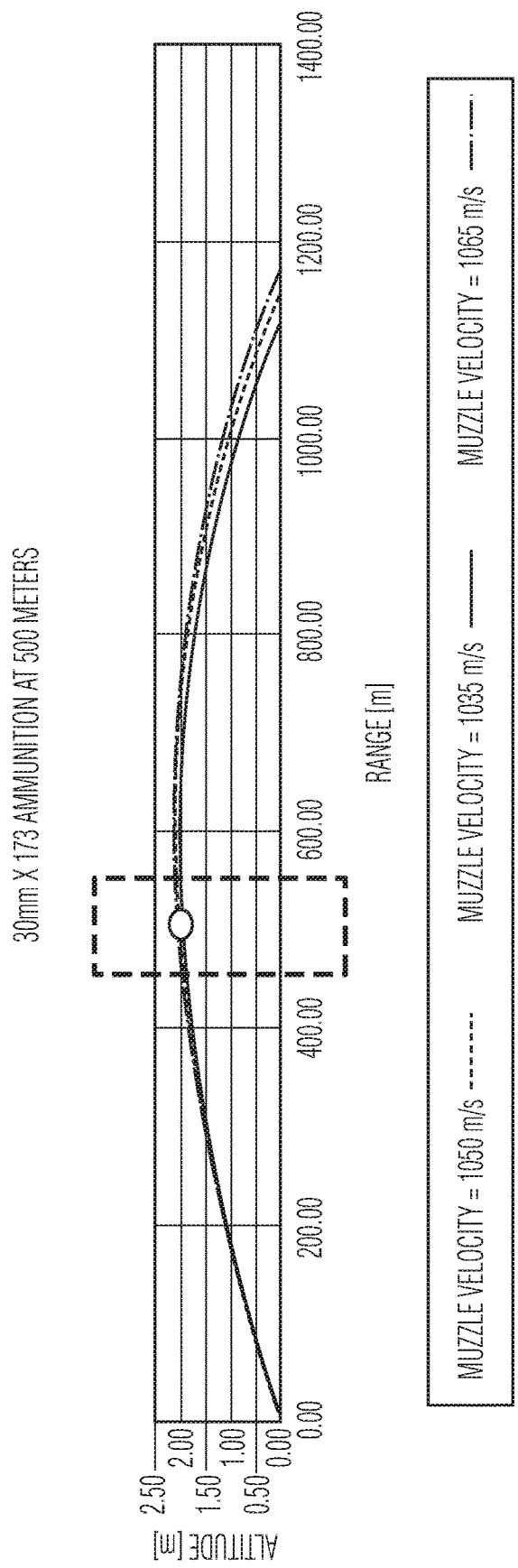
FIG. 30A depicts the Trajectory Plot (range versus altitude) for a 30 mm×173 projectile fire to 500 meters.
Figure 30B:
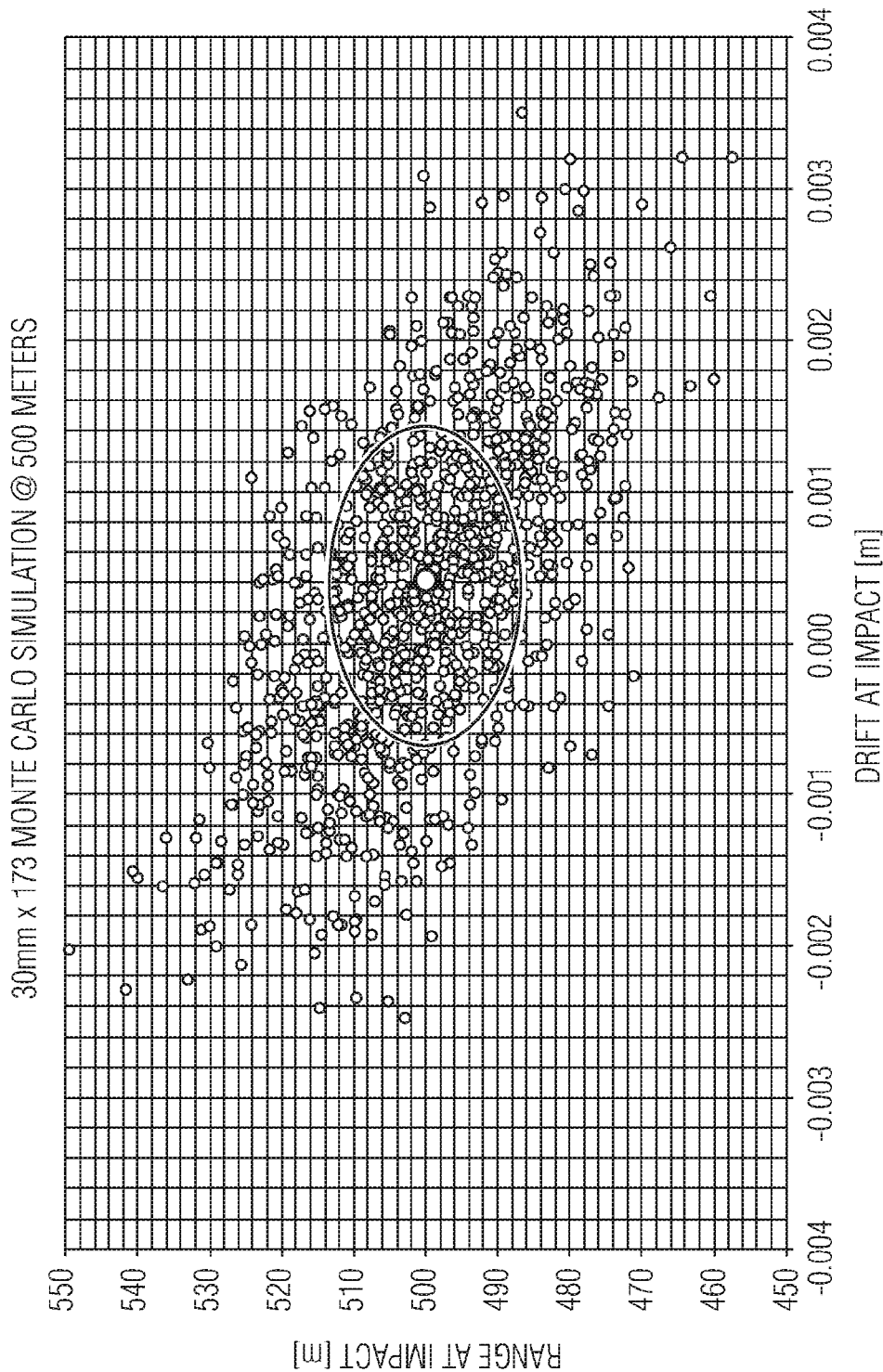
FIG. 30B depicts a Monte Carlo Simulation of the burst location of 30 mm×173 projectiles fired to 500 meters without muzzle velocity measurement and post shot programming.
Figure 30C:
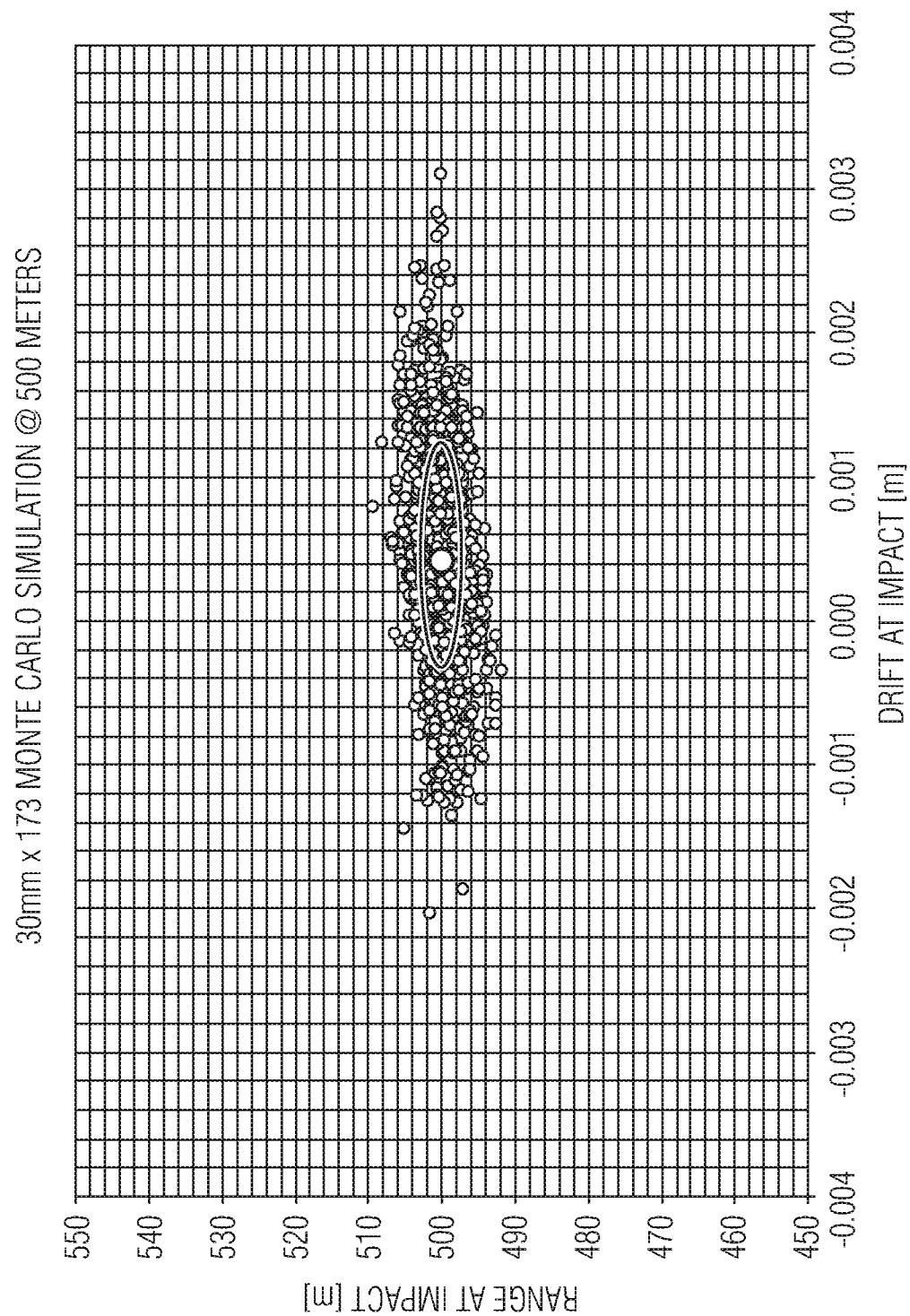
FIG. 30C depicts a Monte Carlo Simulation of the burst location of 30 mm×173 projectiles fired to 500 meters with muzzle velocity measurement and post shot programming.
Figure 30D:
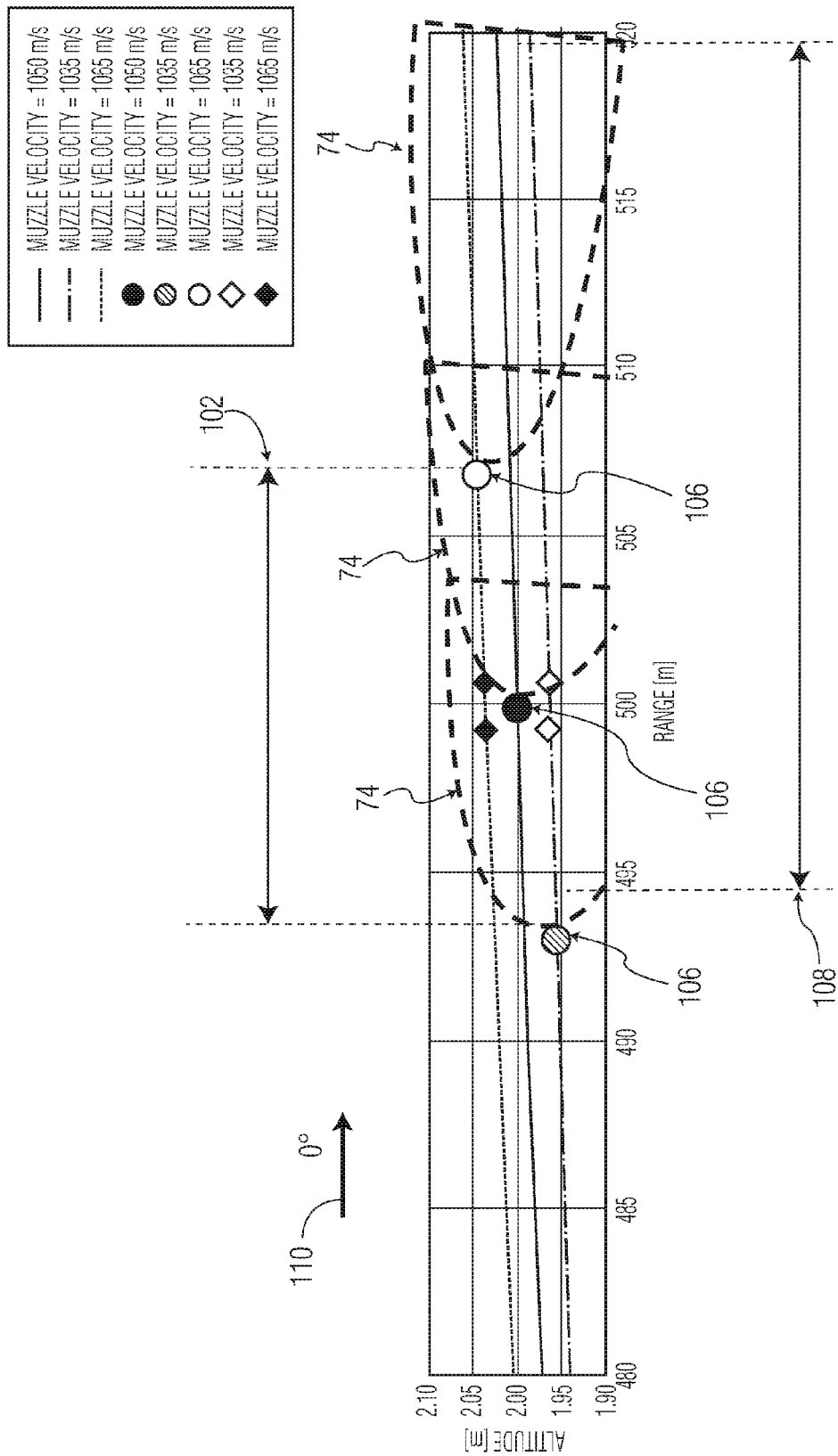
FIG. 30D depicts the trajectory and defilade Fragment Plot of a 30 mm×173 projectile fired to 500 meters with an uncorrected TOF or DTB.
Figure 30E:
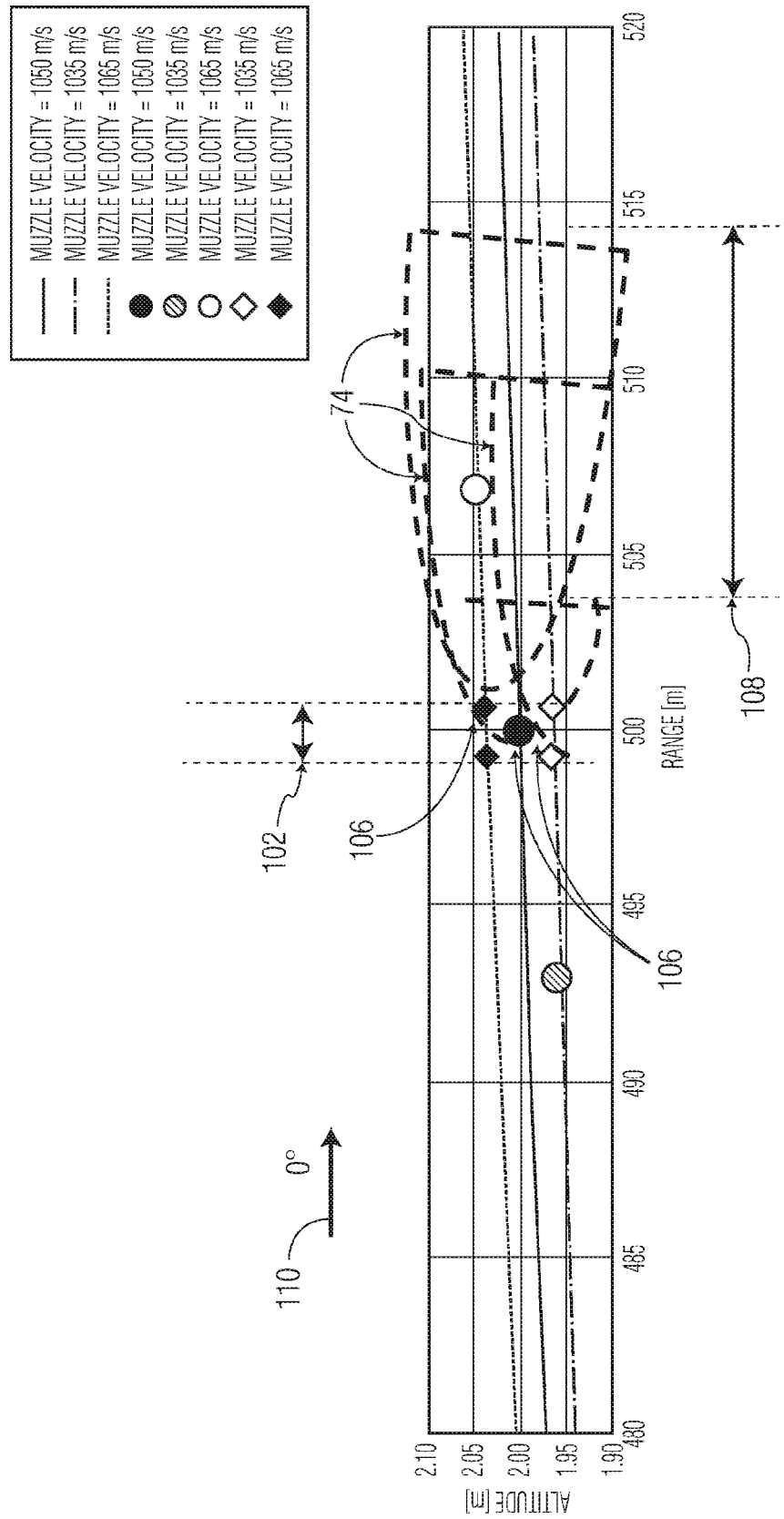
FIG. 30E depicts the trajectory and Defilade Fragment Plot of a 30 mm×173 projectile fired to 500 meters with an uncorrected TOF or DTB.

FIG. 27 depicts a ferrous projectile 10C departing the device at a precise muzzle velocity.

Figure 31E:
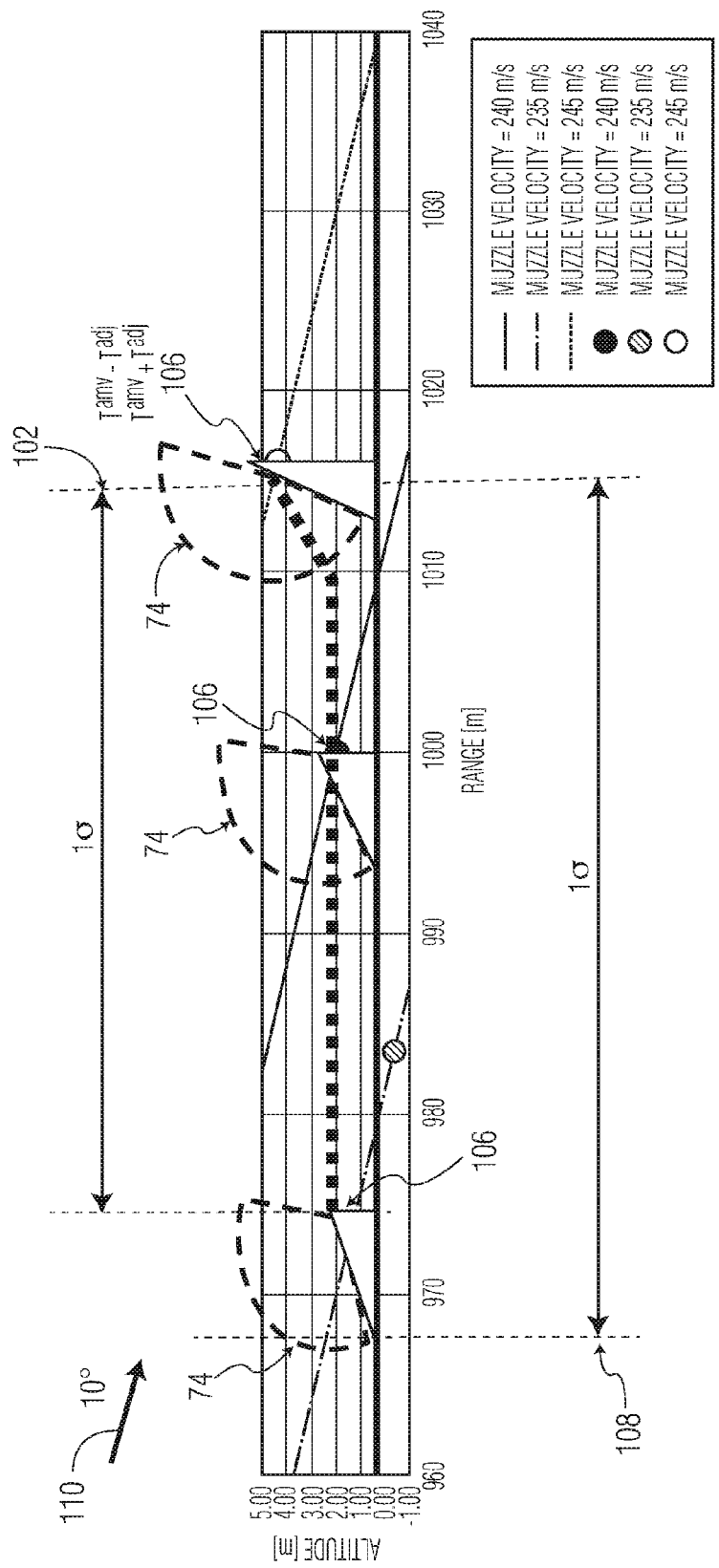
FIG. 31E depicts the trajectory and Defilade Fragment Plot of a 40 mm×53 projectile fired to 1000 meters with an uncorrected TOF or DTB.
Figure 32A:
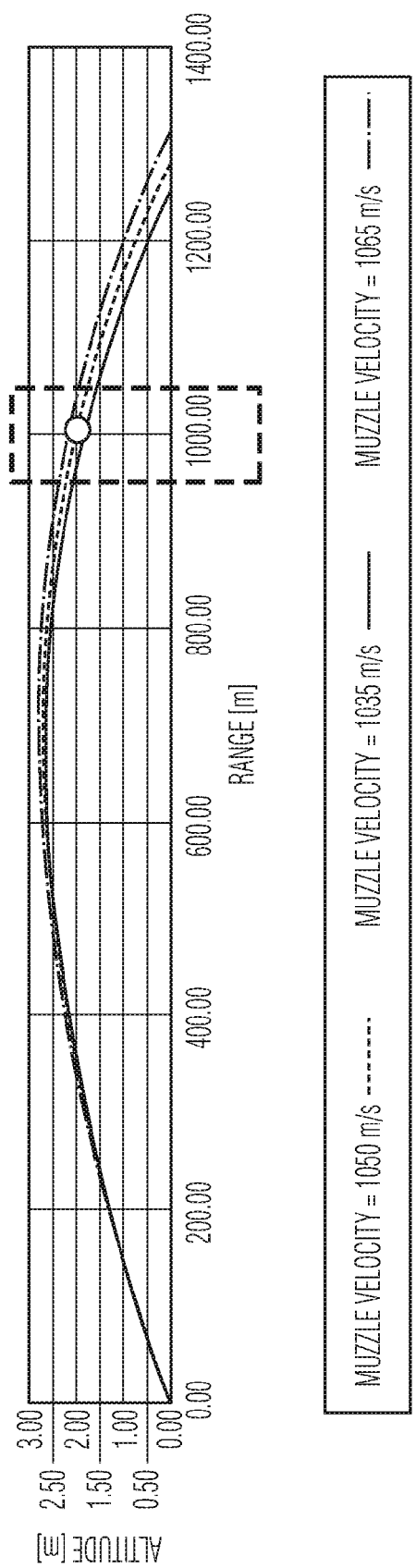
FIG. 32A depicts the Trajectory Plot (range versus altitude) for a 30 mm×173 projectile fire to 1000 meters.
Figure 32B:
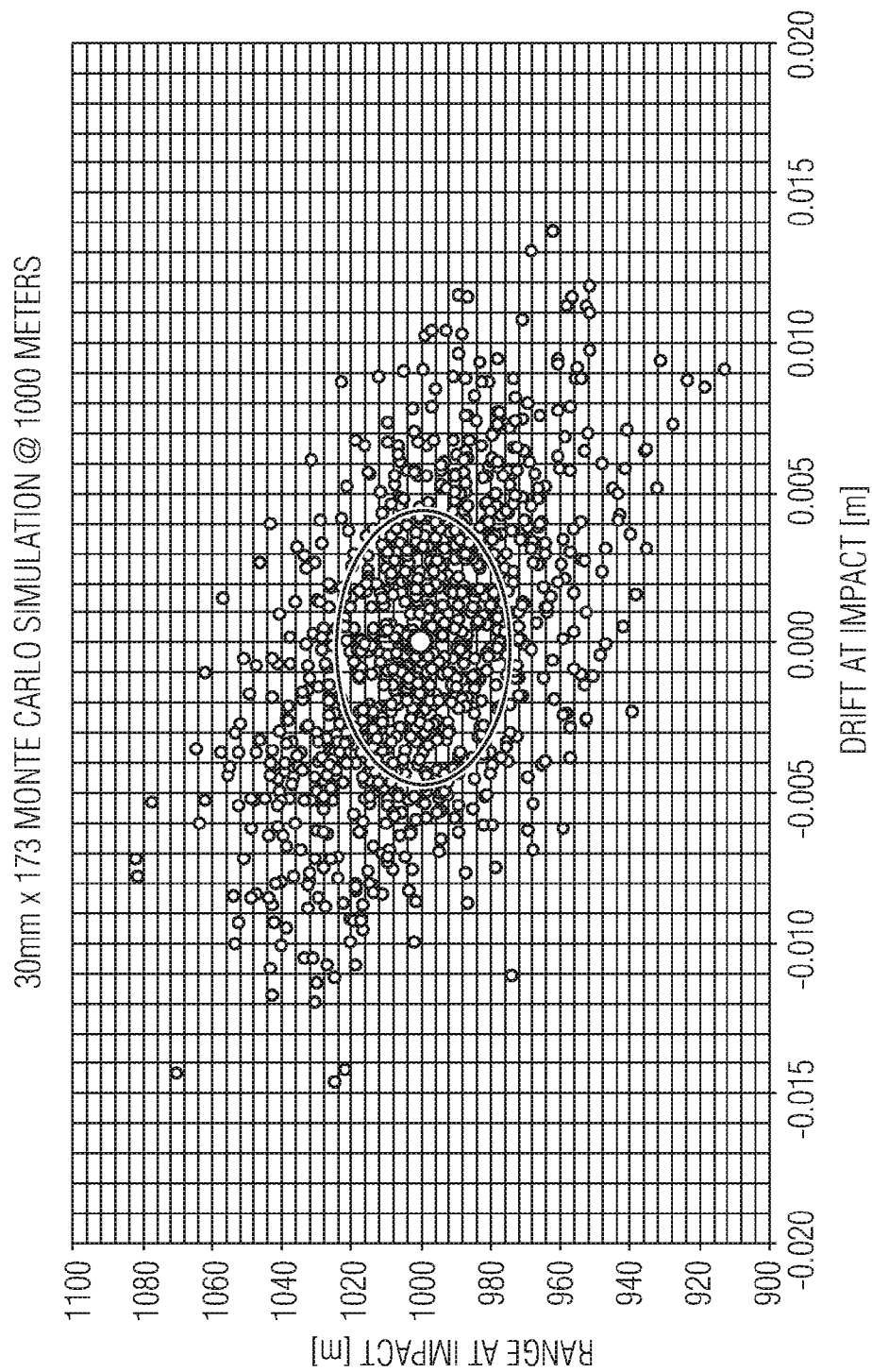
FIG. 32B depicts a Monte Carlo Simulation of the burst location of 30 mm×173 projectiles fired to 1000 meters without muzzle velocity measurement and post-shot programming.
Figure 32C:
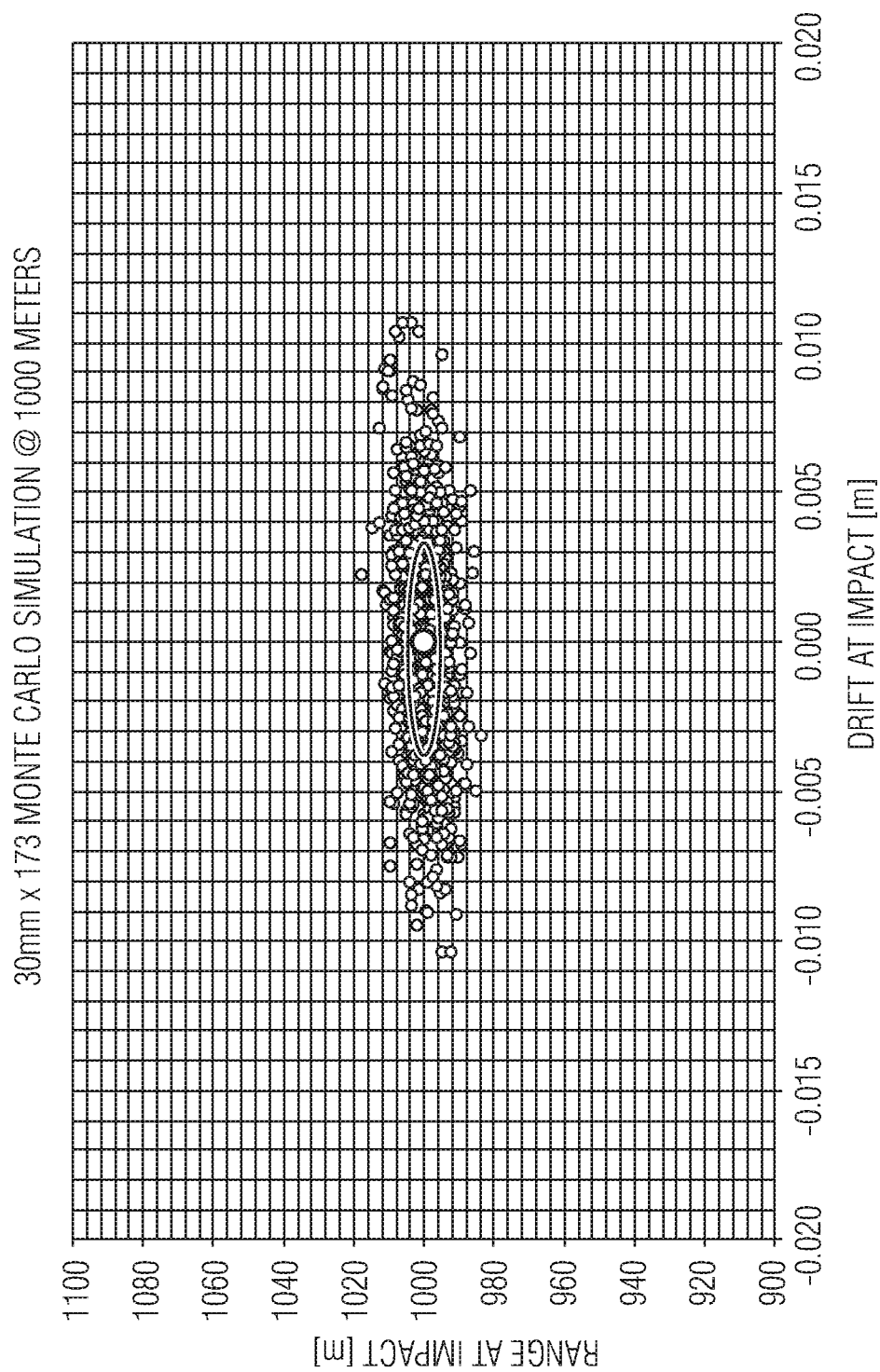
FIG. 32C depicts a Monte Carlo Simulation of the burst location of 30 mm×173 projectiles fired to 1000 meters with muzzle velocity measurement and post-shot programming.
Figure 32D:
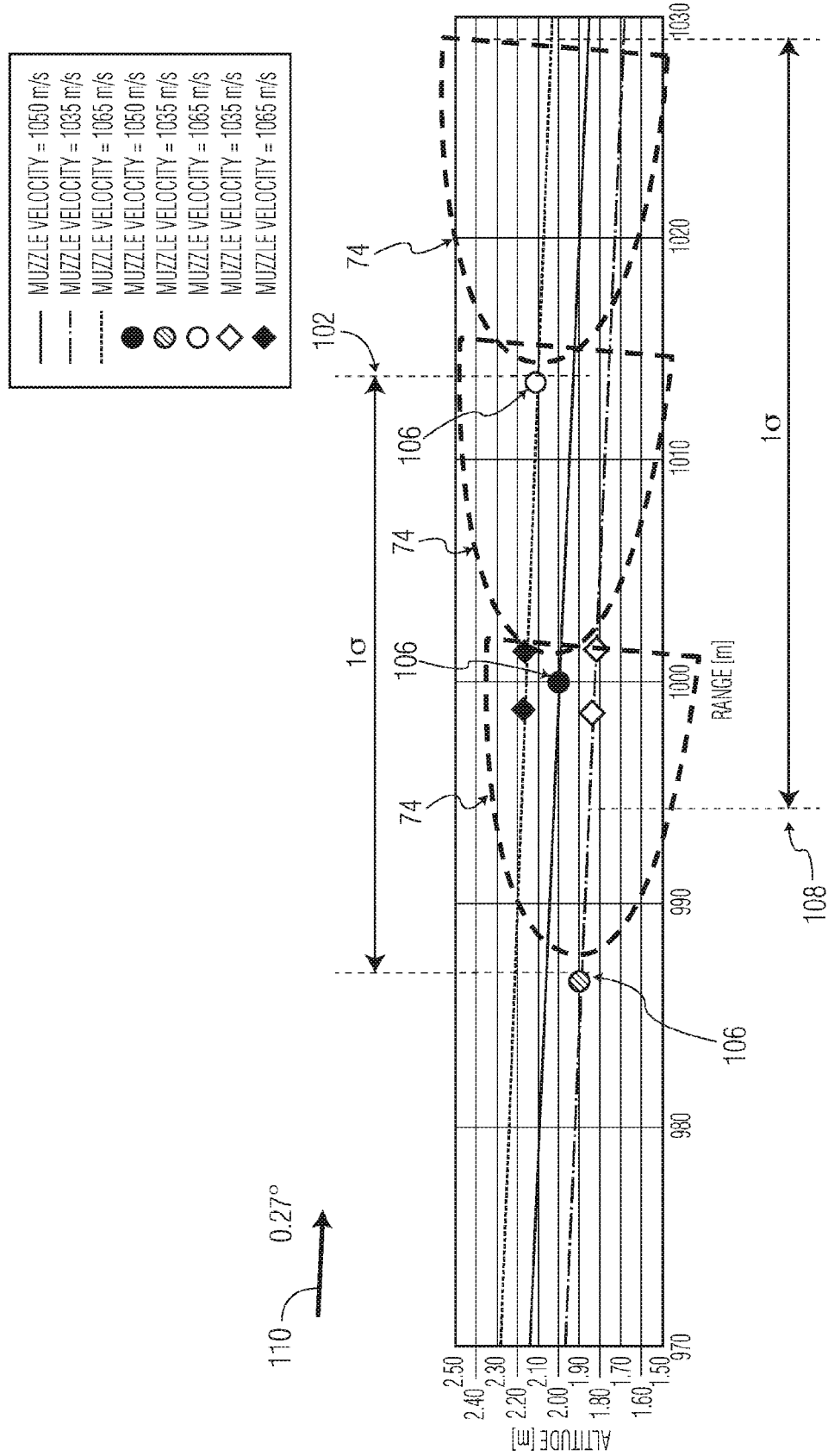
FIG. 32D depicts the trajectory and defilade Fragment Plot of a 30 mm×173 projectile fired to 1000 meters with an uncorrected TOF or DTB.
Figure 32E:
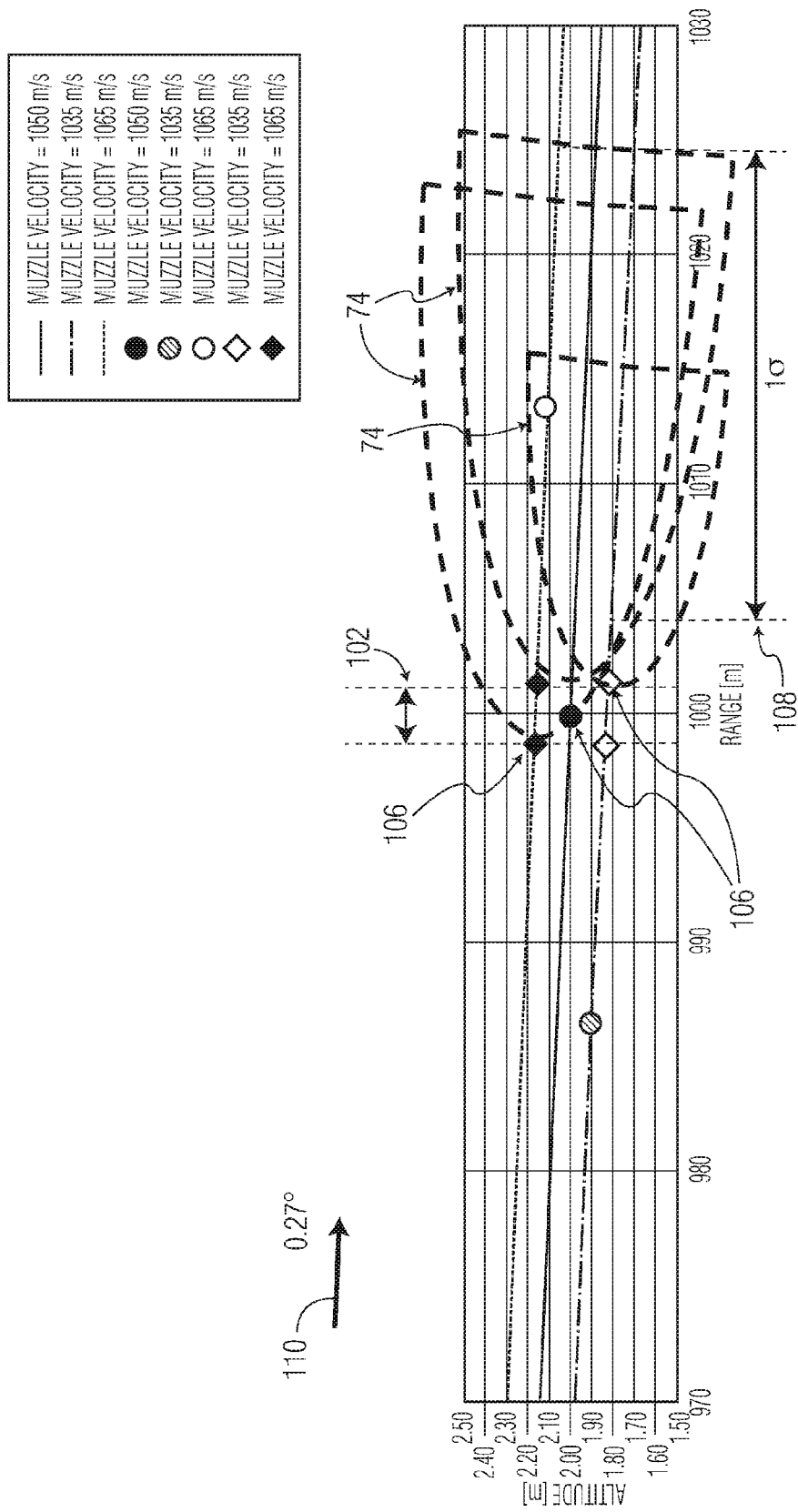
FIG. 32E depicts the trajectory and Defilade Fragment Plot of a 30 mm×173 projectile fired to 1000 meters with an uncorrected TOF or DTB.
Figure 33E:
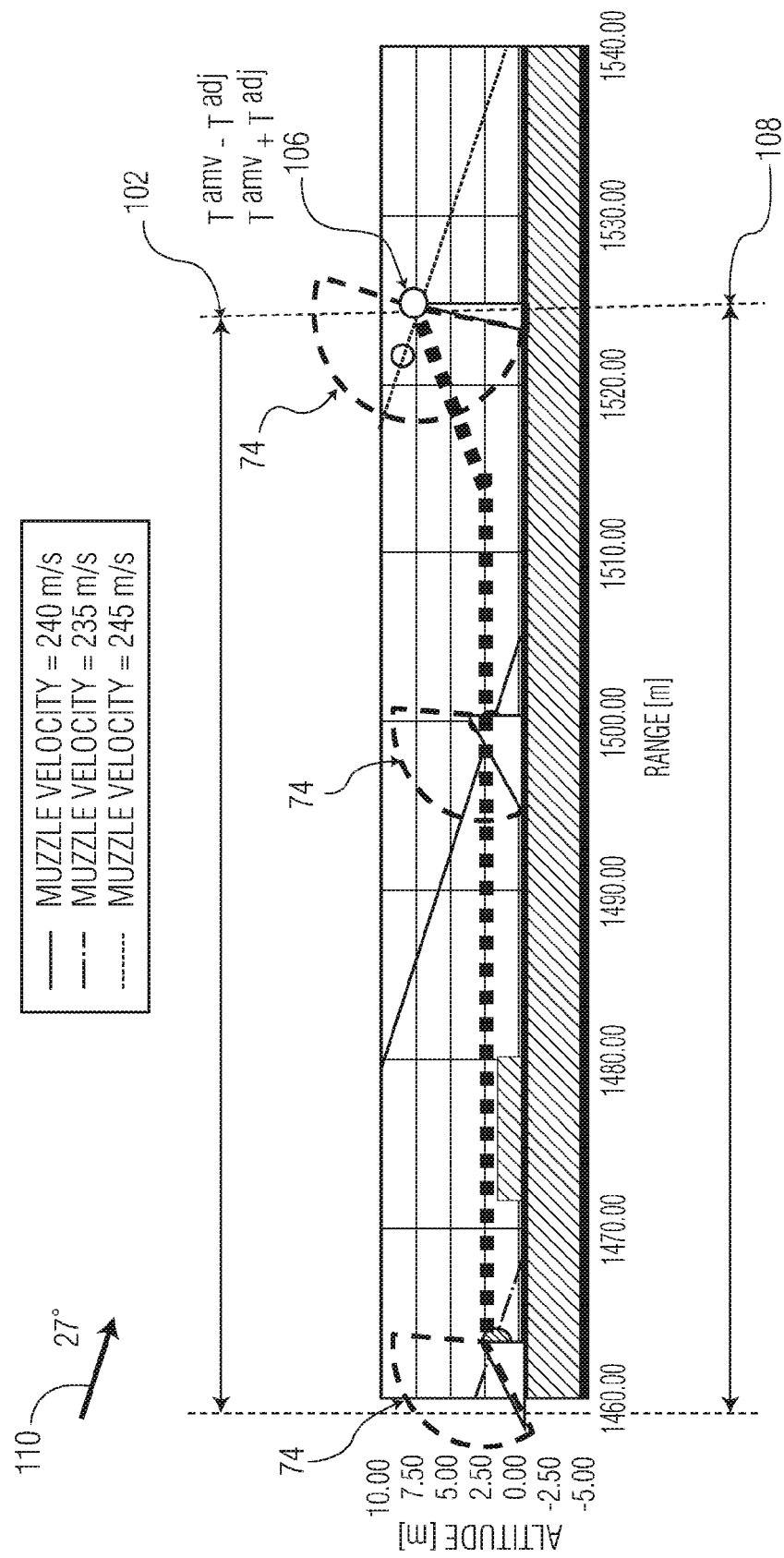
FIG. 33E depicts the trajectory and Defilade Fragment Plot of a 40 mm×53 projectile fired to 1500 meters with an uncorrected TOF or DTB.
Figure 34A:
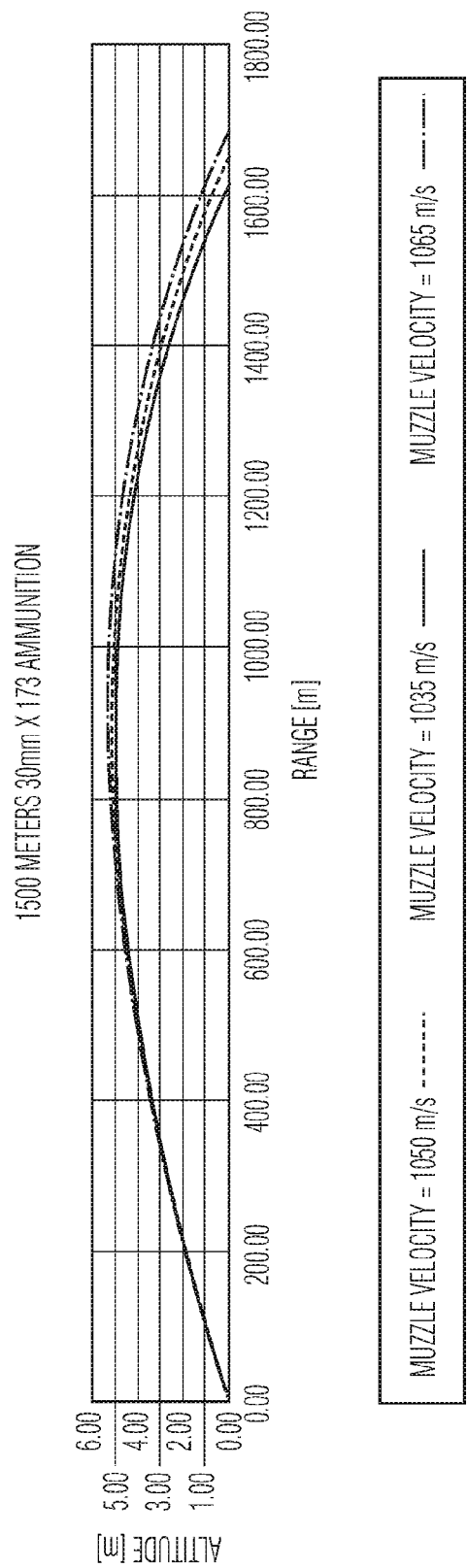
FIG. 34A depicts the Trajectory Plot (Range versus Altitude) for a 30 mm×173 projectile fire to 1500 meters.
Figure 34B:
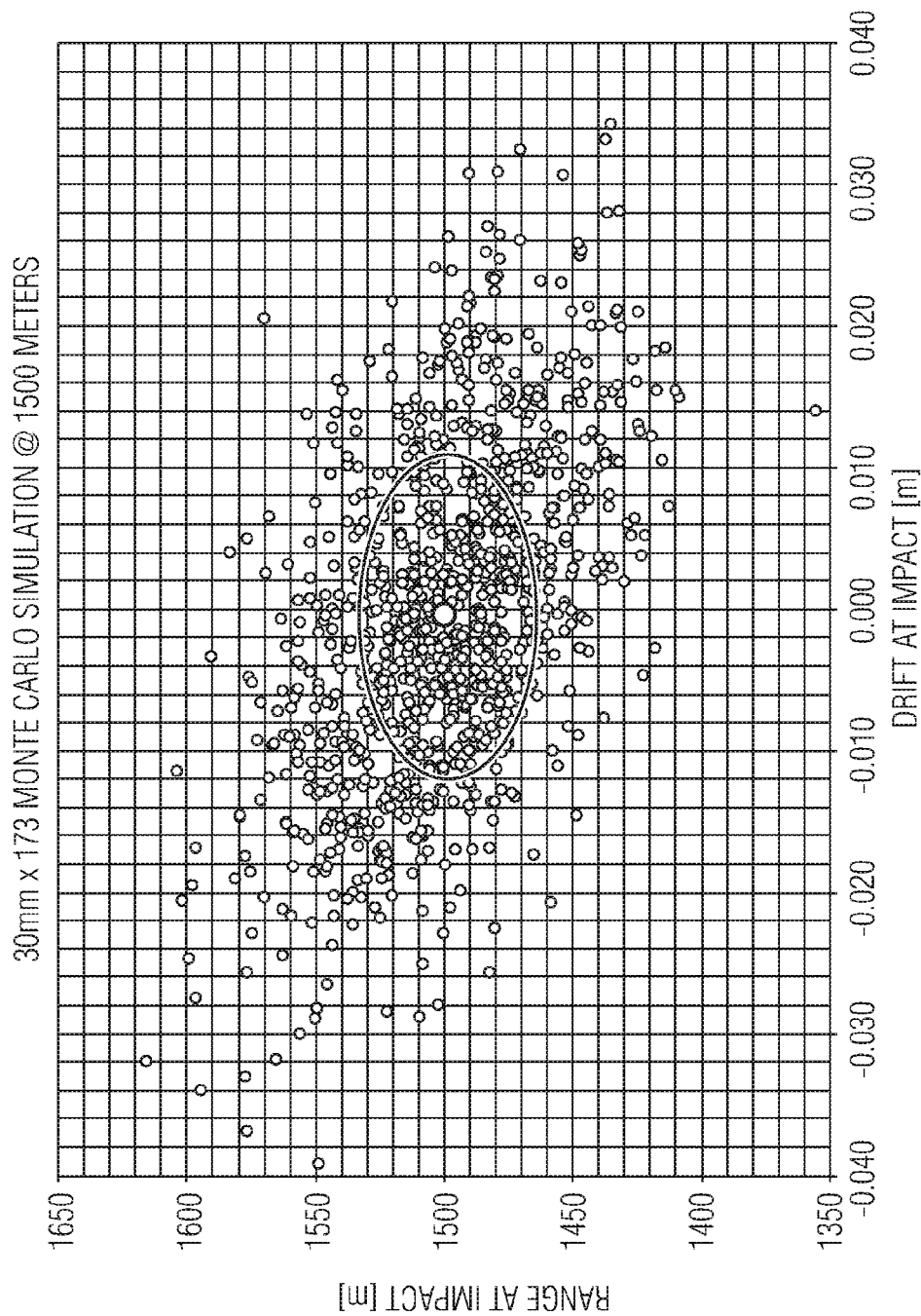
FIG. 34B depicts a Monte Carlo Simulation of the burst location of 30 mm×173 projectiles fired to 1500 meters without muzzle velocity measurement and post-shot programming.
Figure 34D:
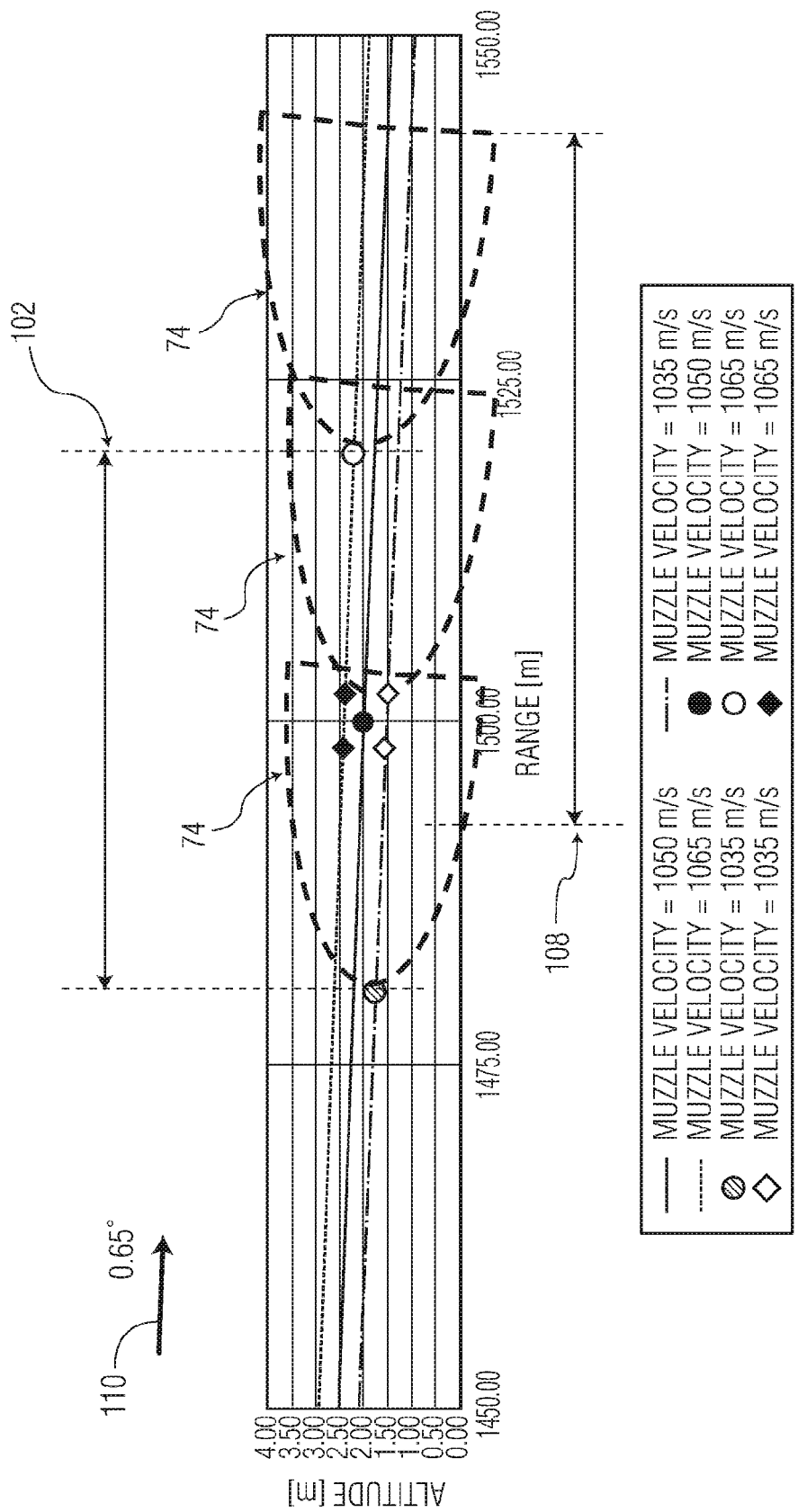
FIG. 34D depicts the trajectory and defilade Fragment Plot of a 30 mm×173 projectile fired to 1500 meters with an uncorrected TOF or DTB.

Programming with a Precise, Non-Linear TOF or DTB Signal:

A number of post-shot programming technologies are now available to militaries. A system that reduces range dispersion enhances the terminal effect of airburst munitions will prove useful. While wind will still degrade the performance and terminal effect of ammunition, FIGS. 28B-34B illustrate the current nominal performance of weapon systems using airburst munitions. FIGS. 29B-34B illustrate Monte Carlo analysis for 40 mm×53 and 30 mm×173 airburst function where muzzle velocity is not corrected. FIGS. 29C-34C illustrate Monte Carlo analysis for airburst function where muzzle velocity for both 40 mm×53 and 30 mm×173 is corrected. FIGS. 29D-34D illustrate the burst location (side view) where muzzle velocity is not measured and the programmed TOF or DTB is not corrected. FIGS. 29E-34E illustrate the burst location where muzzle velocity is known and the programmed TOF or DTB is corrected. FIGS. 31E and 33E also depict adjusted burst points 106, where the fire control adjusted the TOF or DTB using a non-linear algorithm. The dispersion of burst locations is reduced 104 and the ejection of effective fragments to defilade 108 is improved.

There has thus been shown and described a novel system for measuring the exit conditions of projectiles and kits of various configurations to update aiming ballistics and program, post shot, different airburst projectiles with increased precision and optimized terminal effect. The system with various sub-systems and configurations fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

REFERENCE NUMBERS

10 Projectile
10A Optically programmable airburst projectile
10B RF programmable airburst projectile
10C Projectile with ferrous material
10D eXMI programmable airburst projectile
10E Programmable airburst projectile Transmission 1-40 GHz (L, S, C, X or K Band)
10H Programmed Air Burst (AB) Projectile (10A, 10B, 10D or 10E)
12 Marking on a projectile
14 Barrel
16 Direction of fire
18 Indexed projectile in spin
20 Indexed projectile in spin
22 Yaw measurement
24 Yaw measurement
26 Flash suppressor
28 In muzzle emitter (MV measurement)
28A Other in muzzle velocity measurement technique (Prior Art)
30 Light from in-muzzle break emitter
32 In-muzzle break optical detector
32 Projectile image
34 Connection to computer
36 Ballistic calculator or computer
38 Memory
40 Optical detectors (in muzzle break, flash hider or flash suppressor)
42 Mortar muzzle break
44 Range information
44A Fire control with a range finder
44B Hand-held laser range finder
44C Dial a range
44D Wave form with an encoded TOF or DTB (Air Burst Detonation)
46 Programming unit
46A Optical transmitter (or programmer)
46B RF transmitter (or programmer)
46C eXMI programmer
46D Narrow beam Doppler Radar modified to incorporate a post measurement data transmission
48 Programming station
48A Optical programming signal
48B RF programming signal
48C eXMI Programming Signal 48D Doppler Radar and subsequent Programming Signal (1-40 GHz)
48E TOF or DTB Encoded Signal (in a wave form)
50 MV measurement device
52 Ballistic calculator or computer (housed in a flash suppressor, flash hider or muzzle break)
54 Ballistic Calculator (muzzle velocity measurement and correction) housed in a Fire Control
56 Gunner (operator) of a crew served weapon
58 Assistant (Operator) or gunner of a crew served weapon
62 Revised TOF or DTB (re-calculated TOF with measured MV)
64 Revised TOF or DTB information is formatted to a data protocol
66 An encoded TOF or DTB formatted into a wave form
70 Target
72 LRF reflection
74 Fragmentation from a detonating projectile
82 Normal dispersion of muzzle velocity
84 Target velocity within normal distribution
86 Effected impact dispersion (beaten zone)
90 System diagram
92 Generator
94 Coil generating a magnetic force
96 Force applied to slow projectile
98 Capacitor storing residual energy produced by Coil
102 Range dispersion
104 1 sigma range dispersion
106 Bust Point
106A Height of Burst (HOB)
106B Time of Flight (TOF)/Distance to Burst (TED)
108 Effective Defilade Fragmentation
110 Angle of Fall
112 Ground Impacts
114 Inadequate Height of Burst
116 In-effective High Altitude Burst
118 Ground Impact (Sub Optimal Fragmentation)
120 Effective Fragmentation (Defilade Impacts)

What is claimed is:

1. A projectile configured to be fired from a gun barrel of a weapon, said projectile having a cylindrical body defining a central longitudinal axis, the improvement comprising a plurality of marks on said projectile arranged in at least one circular row around said body, with said row extending perpendicular to said longitudinal axis, said marks being of such character and configuration as to be seen by an optical detector while exiting from the barrel and enable measurement of spin and velocity of the projectile.

2. The projectile recited in claim 1, wherein at least some of the marks have distinctive patterns, such that the optical detector can discriminate between marks with different patterns.

3. The projectile recited in claim 1, wherein at least some of the marks have distinctive colors, such that the optical detector can discriminate between marks with different colors.

4. The projectile recited in claim 1, wherein at least some of the marks are luminescent.

5. The projectile recited in claim 1, wherein at least some of the marks are of a different shape than others.

6. The projectile recited in claim 1, wherein all of the marks have the same shape.

7. The projectile recited in claim 6, wherein at least some of the marks are in the shape of a cross.

8. The projectile recited in claim 1, further comprising an explosive charge and a programmable device for detonating said explosive charge while said projectile is in flight.

\* \* \* \* \*